United States Patent [19]
Craven et al.

[11] Patent Number: 5,649,171
[45] Date of Patent: Jul. 15, 1997

[54] ON-LINE VIDEO EDITING SYSTEM

[75] Inventors: Ian Craven, Belmont; Bruce Logan Hill; Lance E. Kelson, both of Redwood City; Robert Rose, San Jose; Stephen J. Rentmeesters, Dublin, all of Calif.

[73] Assignee: Accom, Inc., Menlo Park, Calif.

[21] Appl. No.: 531,095

[22] Filed: Sep. 20, 1995

Related U.S. Application Data

[63] Continuation of Ser. No. 781,481, Oct. 21, 1991, abandoned, which is a continuation-in-part of Ser. No. 684,700, Apr. 12, 1991, abandoned.

[51] Int. Cl.$^6$ ............................................. G06F 13/00
[52] U.S. Cl. ................ 395/500; 395/806; 364/DIG. 1; 364/DIG. 2
[58] Field of Search ........................ 395/154, 500, 395/700, 275; 348/722

[56] References Cited

U.S. PATENT DOCUMENTS

| | | | |
|---|---|---|---|
| 4,868,785 | 9/1989 | Jordan et al. | 395/140 |
| 4,965,771 | 10/1990 | Morikawa et al. | 395/275 |
| 5,146,566 | 9/1992 | Hollis, Jr. et al. | 395/275 |
| 5,237,689 | 8/1993 | Behnke | 395/700 |
| 5,247,468 | 9/1993 | Henrichs et al. | 395/500 |
| 5,261,079 | 11/1993 | Celi, Jr. | 395/500 |
| 5,265,252 | 11/1993 | Rawson, III et al. | 395/700 |
| 5,283,900 | 2/1994 | Frankel et al. | 395/700 |
| 5,307,456 | 4/1994 | Mackay | 395/154 |
| 5,331,417 | 7/1994 | Soohoo | 348/584 |
| 5,440,683 | 8/1995 | Nally et al. | 395/162 |
| 5,448,315 | 9/1995 | Soohoo | 348/722 |

*Primary Examiner*—Parshotam S. Lall
*Assistant Examiner*—Zarni Maung
*Attorney, Agent, or Firm*—Flehr Hohbach Test Albritton & Herbert LLP

[57] ABSTRACT

An on-line video editing system includes interface software containing in preferably text file format protocol information and a mapping of the architectural functions of peripheral devices that a user can control via the editor. This software allows the present invention to readily control all functions of which a peripheral device is capable, and to issue commands in a synchronized, distributed manner in the proper protocol for the peripheral device. The system permits simultaneous control of up to 48 serial devices (all of which may be switchers) as well as 8 GPI controlled devices, and permits multiple users or multiple simultaneous edits. Further, the interface software enables a user to input (preferably in text file form) a desired edit effect, whereupon the system will make design decisions and construct the desired effect using such devices as are available to the system. Applicants' hardware and EDL software permit the system to maintain a virtual hierarchical historical record of unlimited size containing every step of every edit made with the system, allowing a user to later recreate or partially or completely undue visual effects, including layered effects. In addition to conventional timecode data, the system EDL can provide user output in graphic or visual form, and will allow a user to actually see a still frame from a desired video edit point. The system includes a motorized control that automatically reflects the state of a video source under control while providing absolute or relative positional control.

7 Claims, 34 Drawing Sheets

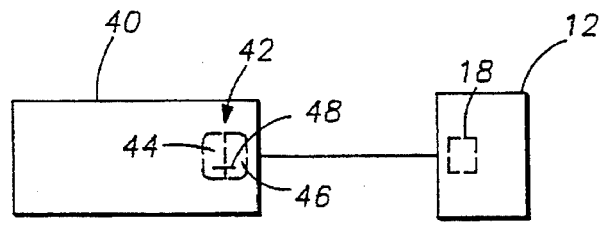
(PRIOR ART)
FIG.—2A
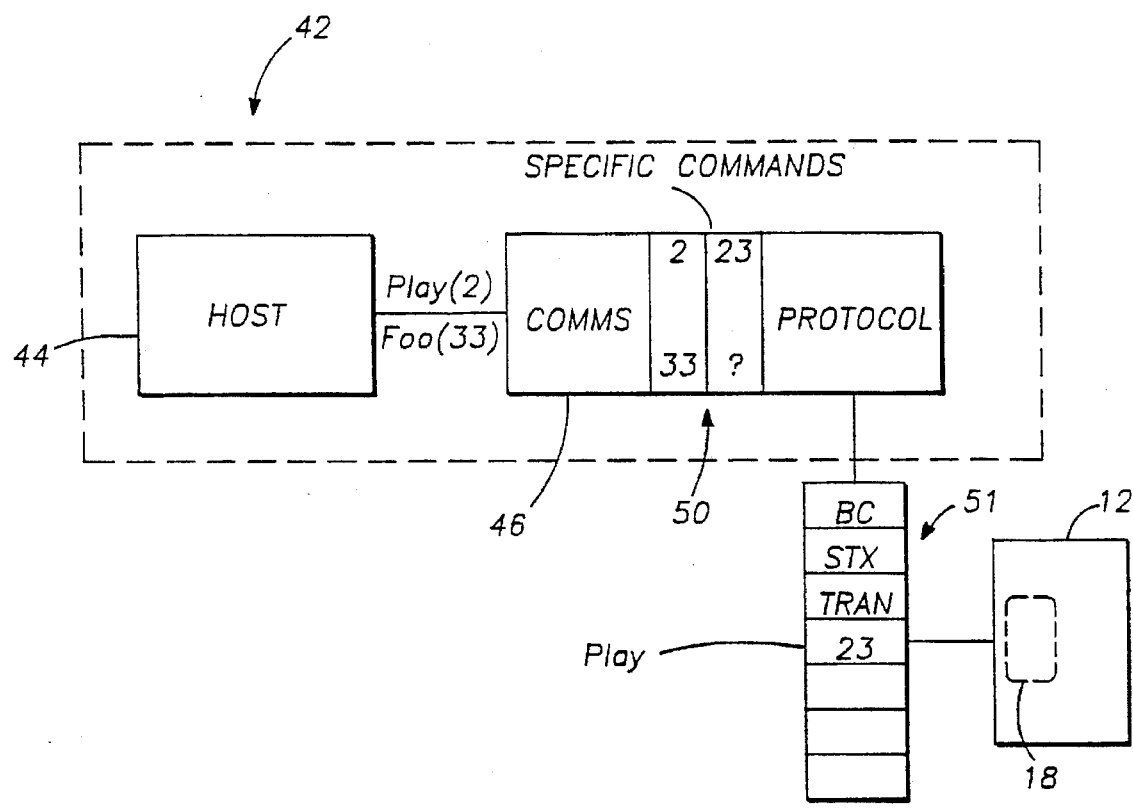
(PRIOR ART)
FIG.—2B

COMMUNICATIONS PROCESSOR
SCHEDULING TABLE

| COMMAND | DELAY | STICKY | PRIORITY | Cmd LEVEL | HOUSE KEEPING | SENT | nth Cmd |
|---|---|---|---|---|---|---|---|
| READ TIME CODE | 0 | 1 | 3 | 0 | Load (2) | 1 | |
| SCANNER OFF | 0 | 0 | 4 | 1 | Load (2) | 1 | |
| PLAY | 99 | 0 | 0 | 1 | Load (2) | 0 | |
| | | | | | Clear (1) | | |
| | | | | | Clear Cmd (3) | | |
| nth COMMAND | | | | | | | |

FIG. -4

EDL1          Pg 4    Ln    37 Col   1 (0.00")           Insert  Horiz 164   1       V       C              01:16:45:20    01:17:09:04    01: 04:45:21   01: 05: 09:05
GPI   DFX     PULSE                  003  RI       +00:00:15:16
GPI   GVGFTB  PULSE                  003  RI       +00:00:22:00
165   SCRIBE  V       C              00:00:36:24    00:00:42:18    01: 02:54:08   01: 03: 00:02
166   BL      B       C              00:00:00:00    00:00:00:00    01: 10:44:25   01: 10: 44:25
166   1       B       C    W019 020  01:06:30:00    01:07:04:16    01: 10:44:25   01: 11: 19:11
167   1       B       C              01:05:00:00    01:06:20:07    01: 11:18:25   01: 12: 39:02
168   1       V       C              01:06:20:07    01:06:25:24    01: 12:34:08   01: 12: 39:25
GPI   DFX     PULSE                  003  RI       -00:00:00:04
169   1       B       C              01:08:00:00    01:09:14:00    01: 12:38:13   01: 13: 52:13
170   MUSIC   A2      C              01:38:05:01    01:38:11:04    01: 13:51:28   01: 13: 58:01
171   1       B       C              01:20:00:00    01:21:05:06    01: 13:58:01   01: 15: 03:07
172   SCRIBE  V       C              00:00:42:18    00:00:49:13    01: 13:51:09   01: 13: 58:04
173   MUSIC   A2      C              01:42:39:03    01:42:44:28    01: 15:02:24   01: 15: 08:19
174   1       B       C              01:21:05:02    01:21:10:11    01: 15:03:02   01: 15: 08:11  *
GPI   DFX     PULSE                  003  RI       +00:00:00:11
175   1       B       C              01:18:00:00    01:19:45:09    01: 15:08:00   01: 16: 53:09
176   1       B       C              01:03:00:00    01:04:15:14    01: 15:08:00   01: 16: 23:14
177   1       B       C              01:04:15:14    10:04:32:01    01: 16:23:14   01: 16: 40:01
178   1       V       C              01:04:31:22    01:04:33:11    01: 16:39:21   01: 16: 41:10
GPI   DFX     PULSE                  003  RI       -00:00:00:03
179   1       B       C              01:18:00:00    01:19:44:24    01: 16:40:00   01: 18: 24:24
GPI   DFX     PULSE                  003  RI       -00:00:00:04

FIG. -6

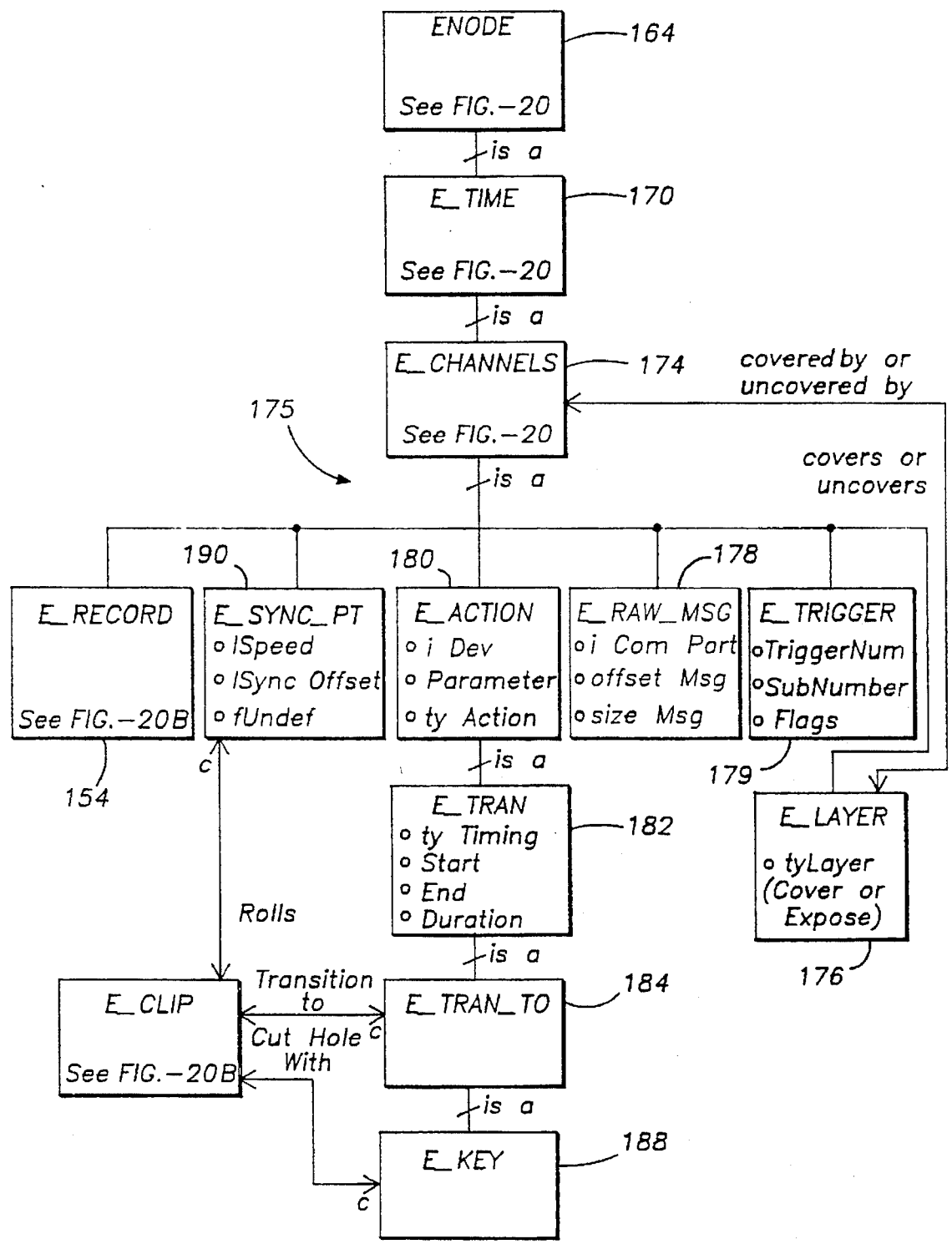
FIG.—11C

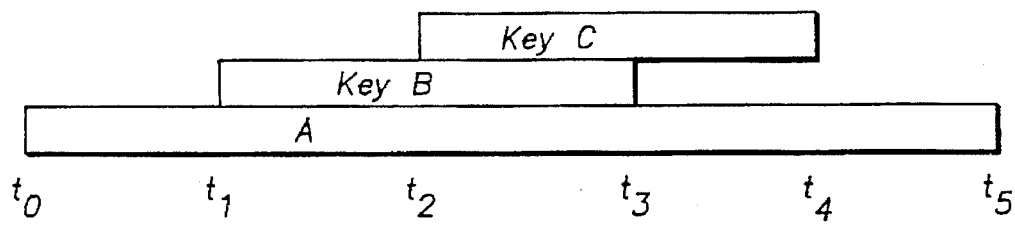
FIG.—12A
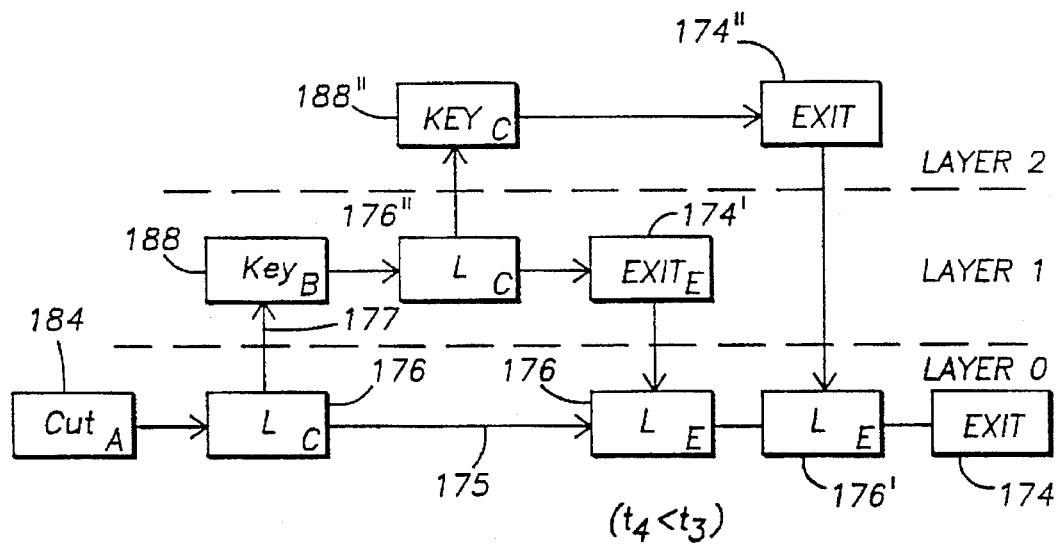
FIG.—12B
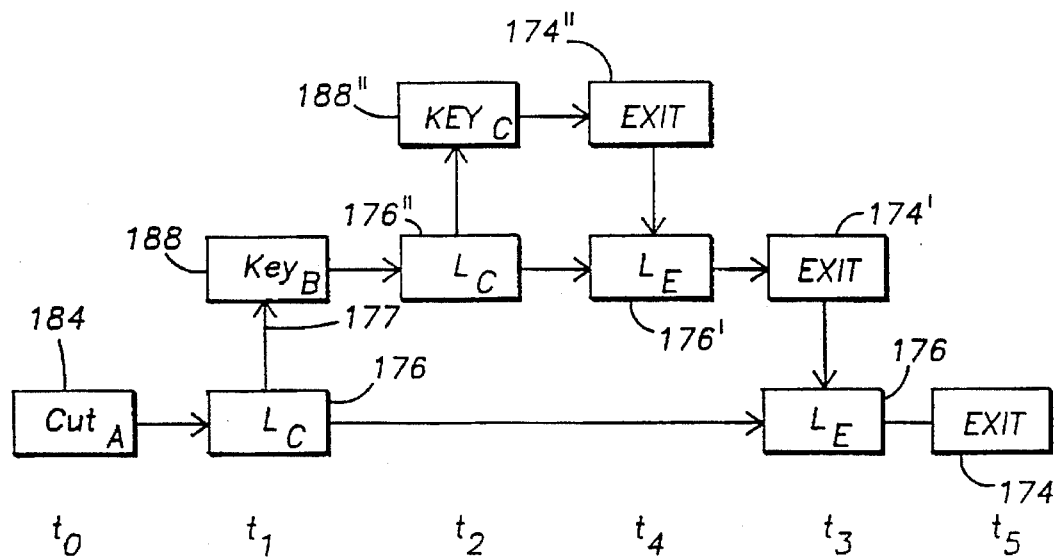
FIG.—12C ($t_4 < t_3$)

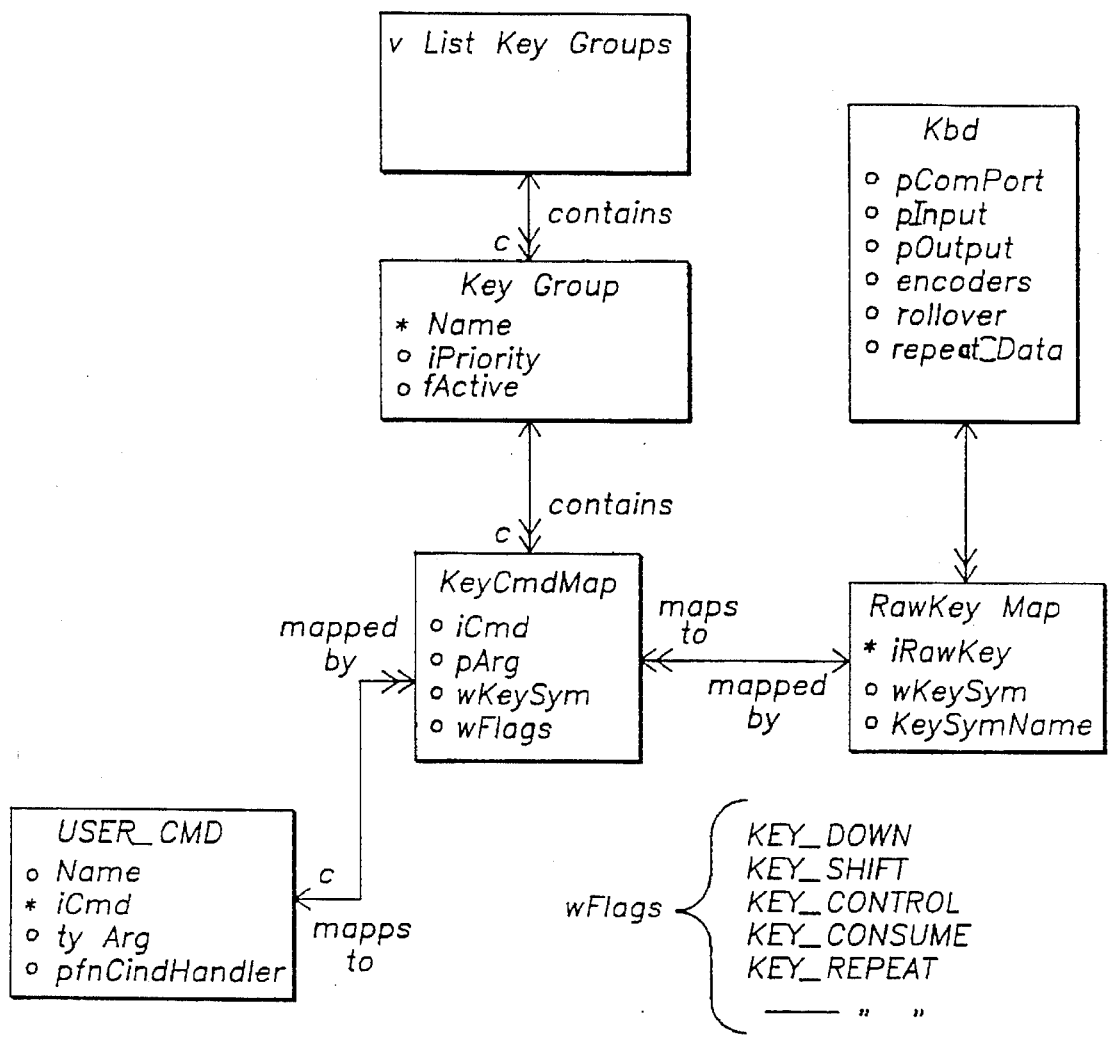
FIG.—14A
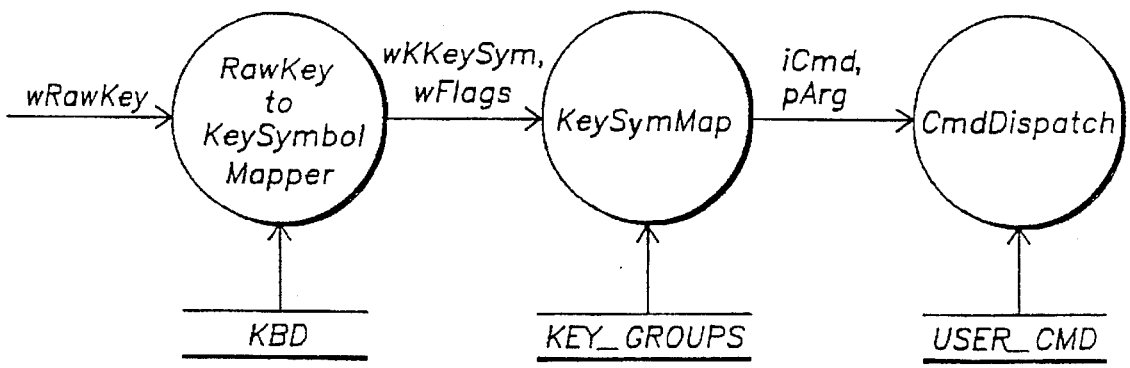
FIG.—14B

FIG.—20

```
DEVICE
{
    TYPE              TRANSPORT
    MODEL             BVW75
    MANUFACTURER      SONY
    COM_TYPE          SMPTE
    PROTOCOL          SONY
    N_CH_VIDEO        1
    N_CH_AUDIO        2
    FIELD_REPORT      FIELD1
    #
    #Device Types
    #    BVW-10-NTSC 20 00          BVW-10-PAL 21 00
    #    BVW-11-NTSC 20 00          BVW-11-PAL 21 02
    #    BVW-15-NTSC 20 03          BVW-15-PAL 21 03
    #    BVW-35-NTSC 20 10          BVW-35-PAL 21 10
    #    BVW-40-NTSC 20 01          BVW-40-PAL 21 01
    #    BVW-60-NTSC 20 20          BVW-60-PAL 21 20
    #    BVW-65-NTSC 20 21          BVW-65-PAL 21 21
    #    BVW-70-NTSC 20 24          BVW-70-PAL 21 24
    #    BVW-75-NTSC 20 25          BVW-75-PAL 21 25
    #    BVW-95-NTSC 20 22          BVW-95-PAL 21 22
    #    BVW-96-NTSC 20 23          BVW-96-PAL 21 23
    VALUES
    {
    # Name    Default    Min    Max
    #    GENERIC VALUES
    #    System Values (overwritten by system)
    #    Position = Field offset from anchor
```

FIG. - 22a

```
Position        { INT 125 0x80000000 0x7FFFFFFF SCALE 10:1}
    # Speed = -60x to 60x play speed
Speed           { INT 65536 -3932160 3932160 SCALE 128:1}
    # JogFields = number of fields to jog using JogFields command
DmcSpeed        { INT 65536 -65536 131072}
JogFields       { } not supported
Entry           { UINT 21600 0 5184000 } # 1hr, 0, 24hrs (used with ToPreset)
Exit            { UINT 21600 0 5184000 } # not currently used by specific command

# ChPreset = Channels involved in the edit
    # 0x00000001 = Video
    # 0x00000100 = Audio 1
    # 0x00000200 = Audio 2
    # 0x00000400 = timecode (never enabled during insert)
ChPreset        { UINT 0x301         0 0x00000301 } # V12
    # EditMode = type of edit (internal value)
    # Value used by ChPreset command
    # 0 = off
    # 1 = insert
    # 2 = assemble
    # 3 = preview
    # 4 = crash record
EditMode        { UINT 0x3           0 0x4         } # preview
ChOld           { UINT 0x0           0 0x00000301 }
ChNew           { UINT 0x0           0 0x00000301 }

#       User Configuration Values
    # Channel Record Enable
ChRecEnable     { UINT 0x301         0 0x00000301 } # V12
    # VerySlowSpeed = How fast to go for SlowFwd and SlowRev
```

*FIG. - 22b*

```
VerySlowSpeed    { UINT 1966 655 6553 SCALE 128:1 } # 3%, 1%, 10%
#SlowSpeed = How fast to go for SlowFwd and SlowRev
SlowSpeed       { UINT 6553 3276 19660 SCALE 128:1 } # 10%, 5%, 30%
#ScanSpeed = How fast to go for ScanFwd and ScanRev
ScanSpeed       { UINT 131072 65536 3276800 SCALE 128:1 } # 2X, 1X, 5X
#WarpSpeed = How fast to go for FastFwd and Rewind
WarpSpeed       { UINT 3932159 655360 3932160 SCALE 128:1 } # 60X, 10X, 60X
# ChTimecode = channel timecode is recorded on
# 0x20000000 = VITC
# 0x00000001 = Video
# 0x00000100 = Audio 1
# 0x00000200 = Audio 2
# 0x00000400 = timecode # Audio 3 on other device families
# 0x00000800 = Audio 4    # not applicable for BVW series
#                         # A3 & A4 are helical tracks!
ChTimecode      { UINT 0 0 0x20000400 } # VITC and AUDIO_3
# PrerollMin = minimum preroll allowed for device
# applies to auto assembly only
PrerollMin      {UINT 180 0 900 } # 3 sec, range 0 to 15 seconds

Device Characteristics

# Speed Limits    (Used to set up speed table)

# EXAMPLE SPEED TABLE:
# If a cmd isn't supported on a device, the limit for the prior cmd
# in the table is extended to cover the missing cmd.
# i.e. If a device doesn't have a SHUTTLE cmd,
#      VAR_PLAY forward would cover from     VAR_FWD_LIMIT, and
#      (65536 + TSO_LIMIT)            to
```

*FIG.-22c*

```
#                       FAST_FWD would cover from
#                              VAR_FWD_LIMIT        to      (64 * 65536)

#       Rewind          -(64*65536)                 to      -ShuttleLimit
#       Shuttle         -ShuttleLimit               to      VarRevLimit
#       VarPlay         VarRevLimit                 to      -SlowLmit
#       Slow            -SlowLmit                   to      0
#       Still           0                           to      1
#       Slow            1                           to      SlowLmit
#       VarPlay         SlowLmit                    to      65536 - TSOLimit
#       TSO             65536 - TSOLimit            to      65536
#       Play            65536                       to      65536 + 1
#       TSO             65536 + 1                   to      65536 + TSOLimit
#       VarPlay         65536 + TSOLimit            to      VarFwdLimit
#       Shuttle         VarFwdLimit                 to      ShuttleLimit
#       FastFwd         ShuttleLimit                to      64 * 65536

            # ShuttleLimit = Maximum shuttle speed
ShuttleLimit        { UINT 1572864 327680 1572864 } # 24X, 5X, 24X
            # VarFwdLimit = Maximum speed at which to use VarPlay
VarFwdLimit         { INT 131072 65536 131072 } # 2X, 1X, 2X
            # VarRevLimit = Maximum speed (-) at which to use VarPlay
VarRevLimit         { INT -65536 -65536 0 } # -1X, -1X, 0
            # SlowLimit = Maximum speed at which to use Slow command
SlowLimit           { UINT 16711 0 65536 } # 1X, 0, 1X
            # TSOLimit = Maximum deviation from play allowed in TSO
TSOLimit            { UINT 16712 66 65535 } # 25.5%, 0.1%, 99.9%
            #AstFwdLimit = Maximum Auto Scan Tracking/Dynamic Tracking speed
AstFwdLimit         { INT 131072 0 131072 } # 2X
```

*FIG.- 22d*

```
           AstRevLimit = Maximum Auto Scan Tracking/Dynamic Tracking (-) speed
AstRevLimit      { INT -65536 -65536 0 } # -1X
           # SearchRange = the distance away at which to execute the machines search command
SearchRange      { UINT 3600 10 36000 } # 1, 0, 10 (minutes)
           # MaxFwdSpeed = Max forward speed device is capable of
MaxFwdSpeed      { INT 3932160 196608 3932160 65536 SCALE 128:1 } # 60X, 3X, 60X
           # MaxRevSpeed = Max reverse speed device is capable of
MaxRevSpeed      { INT -3932160 -3932160 -65536 SCALE 128:1 } # -60X, -60X, -1X
           # FastResponse = the minimum time to give the machine to change speed
FastResponse     { UINT 4 2 20 }
           # SlowResponse = the normal time to give the machine to change speed
SlowResponse     { UINT 10 2 80 }
           # MinResponse = the maximum time to give the machine to change speed
MinResponse      { UINT 100 2 200 }

# Don't add MaxAccel unless you have a good value for its default.
           #
MaxAccel    { INT 0x300000 0 0x300000 } # 1 fld to change speed 60X
ParkOffset  { INT   6   0    16       }  # Park offset before syncing
SignalDelay { INT   0   0    1        }  # Signal delay thru device

# Timecode compensation values
ToOffsetFixed         {  INT 0  0    5184000 }  # Allow up to 24hr of offset
ToOffsetPlay          {  INT 2  0    2       }  # Assume dev doesn't adjust
ToOffsetNonPlay       {  INT 2  0    2       }  # Assume dev doesn't adjust

#      SyncGrade
           #            0 = Require servo lock status from device
           #            1 = Consider it synced if position is within
           #                SyncTolerance fields
```

FIG.- 22e

```
#                         2 = No abort. Damn the torpedoes, full speed ahead!
SyncGrade            { INT 0 0    2    }
SyncTolerance        { INT 0 0    4    }

#       SPECIFIC VALUES
# Sony speed value = 32 * log10(Speed) + 64
# Use lookup table for high byte of value and interpolate low byte
#       (That's what the Sony manual specifies)
PREROLL    { UINT 180 0 180 } # value used for specific PREROLL cmd
TC_IN_A    { UINT 0x01000000 0 0x23595929 }
TC_OUT_A   { UINT 0x01000100 0 0x23595929 }
}

COMMANDS
{

Name      Delay, MsgType, { Msg },

#      GENERIC COMMANDS
#      Transport Commands
Stop       2    COMMON     { 20 00 }
AllStop    2    COMMON     { 20 00 }
Play       2    COMMON     { 20 01 }
Record     2    COMMON     { 20 02 }
FastFwd    2    COMMON     { 20 10 }
Rewind     2    COMMON     { 20 20 }
Still      2    COMMON     { 21 11 00 } # Uses Slow 0
#  Freeze    2    COMMON     { 20 6A } not supported
#  UnFreeze  2    COMMON     { 20 6B } not supported
#  ScanFwd   2    COMMON     { 22 11 FETCH(ScanSpeed) # USE VARPLAY
                                       SPD_TO_SONY MSB_LSB}
```

*FIG.-22f*

```

#   ScanRev        2     COMMON      { 22 21 FETCH(ScanSpeed) # USE VARPLAY
                                       SPD_TO_SONY MSB LSB}

# TSO           if (Speed < 1 X Play Speed)
#                              { 21 39 SPD_TO_SONY_TSO }
#              else
#                              { 21 28 SPD_TO_SONY_TSO }
  TSO            2     COMMON      { 21 FETCH(Speed) DUP 65536
                                       < JNZ(1)
                                       38 JMP(2)
                                    @1  39
                                    @2  SWAP SPD_TO_SONY_TSO }

# Slow:         if ( Speed < 0 )
#                              { 22 21 Speed SPD_TO_SONY MSB_LSB }
#              else
#                              { 22 11 Speed SPD_TO_SONY MSB_LSB }
  Slow           2     COMMON      { 22 FETCH(Speed)
                                       DUP 0 <= JNZ(1)
                                       11 JMP(2)
                                    @1  21
                                    @2  SWAP SPD_TO_SONY MSB_LSB }

# VarPlay:      if ( Speed < 0 )
#                              { 22 22 Speed SPD_TO_SONY MSB_LSB }
#              else
#                              { 22 12 Speed SPD_TO_SONY MSB_LSB }
  VarPlay        2     COMMON      { 22 FETCH(Speed)
                                       DUP 0 <= JNZ(1)
                                       12 JMP(2)
                                    @1  22
                                    @2  SWAP SPD_TO_SONY MSB_LSB }
```

*FIG.-22g*

```
# Shuttle:     if ( Speed < 0 )
#                   { 22 23 Speed SPD_TO_SONY MSB_LSB }
#              else
#                   { 22 13 Speed SPD_TO_SONY MSB_LSB }
Shuttle      2   COMMON   { 22 FETCH(Speed)
                            DUP 0 <= JNZ(1)
                                       13 JMP(2)
                            @1     23
                            @2     SWAP SPD_TO_SONY MSB_LSB }

#  JogF                    { } not supported
#  JogR                    { } not supported
#  JogFF                   { } not supported
#  JogRF                   { } not supported
JogFields               { } not supported Search       2   COMMON   { 24 31 FETCH(Position)
                            FIELDS_TO_TC B3_B2_B1_B0 }

EEOff        2   COMMON   { 20 60 }
EEOn         2   COMMON   { 20 61 }
SelectEE     2   COMMON   { 20 63 }  # Use EditOff to disable
EditOff      6   COMMON   { 20 64 }
EditOn       6   COMMON   { 20 65 }
RecHead      2   COMMON   { 41 34 00 }
PlayHead     2   COMMON   { 41 34 01 }
ReadyOff     2   COMMON   { 20 00 20 04 }
ReadyOn      2   COMMON   { 20 05 }
Eject        2   COMMON   { 20 0F }
CfOff        2   COMMON   { 41 35 00 }
CfOn4        2   COMMON   { 41 35 02 }
```

FIG. - 22h

```
CfOn8                    2    COMMON    { 41 35 03 }

# ChPreset bit flags (Default = Insert V12)
#   Lsb 0:  A1
#   Bit 1:  A2
#   Bit 2:  TC
#   Bit 3:  -
#   Bit 4:  V
#   Bit 5:  Assemble
#   Bit 6:  Insert         Be sure insert bit is set for SelectEE
#   Msb 7:  -
ChPreset                 2    COMMON    { 41 30
                                          FETCH(ChPreset) CH_TO_SONY
                                          FETCH(EditMode) EDIT_MODE_TO_SONY | }

ChSet                    2    COMMON    { 41 30
                                          FETCH(ChNew)    CH_TO_SONY
                                          FETCH(EditMode) EDIT_MODE_TO_SONY | }

ToPreset                 2    COMMON    { 44 04 FETCH(Entry)FIELDS_TO_TC B3_B2_B1_B0 }
DmcCue                   2    COMMON    { 20 3C } # Cue to Entry - (DmcSpeed * Preroll)
DmcLearn                 2    COMMON    { 20 48 } # Cue and learn Play or VarPlay speed
DmcPreview               2    COMMON    { 20 4C } # Cue and play at "learned" speed
DmcPlay                  2    COMMON    { 20 0D } # Begin playing at "learned" speed
DmcSpeed                 2    COMMON    { 22 FETCH(DmcSpeed)
                                          DUP 0 <= JNZ(1)
                                                   5D JMP(2)
                                          @1       5C
                                          @2       SWAP SPD_TO_SONY MSB_LSB }

GetTcLtc                 2    COMMON    { 61 0C 01 }
GetTcVitc                2    COMMON    { 61 0C 02 }
```

*FIG. - 22i*

```
GetTcTT1         2   COMMON   { 61 0C 04 }
GetTcTT2         2   COMMON   { 61 0C 08 } # not supported by BVW series
GetUserBitsLtc   2   COMMON   { 61 0C 10 }
GetUserBitsVitc  2   COMMON   { 61 0C 20 }
GetTcAuto        2   COMMON   { 61 0C 03 }
GetStatusBasic   2   COMMON   { 61 20 05 }
GetStatusAll     2   COMMON   { 61 20 09 }
GetTimeRemain    2   COMMON   { 60 2B }
GetSpeed         2   COMMON   { 60 2E }

#     SPECIFIC COMMANDS
PREROLL          2   COMMON   { 44 31 FETCH(PREROLL) FIELDS_TO_TC B3_B2_B1_B0 }
CUE_TO_PREROLL2  2   COMMON   { 20 30 }
LOCAL_DISABLE    2   COMMON   { 00 0C }
REQ_TYPE         2   COMMON   { 00 11 }
LOCAL_ENABLE     2   COMMON   { 00 1D }
REQ_ERRORS       2   COMMON   { 00 F3 }
REQ_WARN         2   COMMON   { 01 F3 }

# Need to enter cmds { 2x 3x }, { 2x 4x }, { 2x 5x }
# Need to enter cmds { 44 0x }
RESET_TT1        2   COMMON   { 40 08 }
MK_IN_V          2   COMMON   { 40 10 }
MK_OUT_V         2   COMMON   { 40 11 }
MK_IN_A          2   COMMON   { 40 12 }
MK_OUT_A         2   COMMON   { 40 13 }
ENTRY            2   COMMON   { 44 14 FETCH(Entry) B3_B2_B1_B0 }
EXIT             2   COMMON   { 44 15 FETCH(Exit) B3_B2_B1_B0 }
SET_IN_A         2   COMMON   { 44 16 FETCH(TC_IN_A) B3_B2_B1_B0 }
```

*FIG.- 22j*

```
SET_OUT_A      2      COMMON    { 44 17 FETCH(TC_OUT_A) B3_B2_B1_B0 }

# Need to enter more cmds for { 4x 1x }
# LOST_LOCK_RESET 2 COMMON { 40 2D}
# }
# STICKY
# {
#   GET_TC_AUTO
#   GET_STATUS_BASIC
#   GET_SPEED
# }
INPUTS
{
VideoIn1    V1    EXTERNAL
Audio1In1   A1    EXTERNAL
Audio2In1   A2    EXTERNAL
Audio3In1   A3    EXTERNAL #A3 & A4 are helical tracks
Audio4In1   A4    EXTERNAL #they cannot be inserted on
}
OUTPUTS
{
VideoOut1   V1    EXTERNAL
VideoOut2   V1    EXTERNAL
Audio1Out1  A1    EXTERNAL
Audio2Out1  A2    EXTERNAL
Audio3Out1  A3    EXTERNAL
Audio4Out1  A4    EXTERNAL
}
}
```

*FIG.- 22k*

ON-LINE VIDEO EDITING SYSTEM

This is a continuation of application Ser. No. 07/781,481 filed Oct. 21, 1991, now abandoned, which is a continuation-in-part of application Ser. No. 07/684,700 filed Apr. 12, 1991, now abandoned.

FIELD OF THE INVENTION

The invention relates to systems for processing video tape, and more particularly to on-line systems for editing video tape.

BACKGROUND OF THE INVENTION

Editing systems are used in video tape productions to combine selected video scenes into a desired sequence. A video editor (hereafter "editor") communicates with and synchronizes one or more video tape recorders ("VTRs") and peripheral devices to allow editing accurate within a single video field or frame. A user communicates with the editor using a keyboard, and the editor communicates with the user via a monitor that displays information.

In film editing, the person editing can position film segments to be spiced together in close proximity to decide which frames of the segments should be spliced together to make a smooth transition. But this editing method has hitherto not been possible with video tape. When editing video tape, the operator must perform repetitive forward and backward motion of the video tape in the tape machine, called "jogging", to find the precise edit points while observing the video images from the tape on a monitor. The required control of the video tape machine is difficult to achieve, the editing is time-consuming, and requires subject judgment on the part of the operator, which judgment is gained only after much editing experience.

"Off-line" editing systems are relatively unsophisticated, and are most suitable for reviewing source tapes, and creating relatively straightforward editing effects such as "cuts" and "dissolves". Off-line editors generate an intermediate work tape whose frames are marked according to an accompanying edit decision list ("EDL") that documents what future video changes are desired. By contrast, "on-line" editing systems are sophisticated, and are used to make post-production changes, including those based upon the work tape and EDL from an off-line editor. On-line editing systems must provide video editor interface to a wide variety of interface accessories, and the cost charged for the use of such a facility (or "suite") often far exceeds what is charged for using an off-line system. The output from an on-line editing system is a final video master tape and an EDL documenting, at a minimum, the most recent generation of changes made to the master tape.

Originally editors interfaced only with multiple VTRs, and later with switchers as well. A switcher is a peripheral device having multiple input and output signal ports and one or more command ports. Video signals at the various input ports are fed to various output ports depending upon the commands presented to the command ports by the editor.

A "cut" is the simplest editing task and is accomplished with an editor and two VTRs: VTR A holds video scenes to be cut into the video tape on VTR B. The editor starts each VTR in the playback mode and at precisely the correct frame, commands VTR B to enter the record mode, thereby recording the desired material from VTR A. It is not a trivial task for the editor to control and synchronize all VTRs and peripheral devices to within a single frame during an edit, since one second of video contains 30 individual frames or 60 fields.

In a more complicated "dissolve" transition, the editor must precisely control three VTRs and a production switcher (a device capable of gradually mixing two video sources). VTRs A and B contain video scenes to be dissolved one to the other. The video outputs of VTRs A and B are connected to inputs on the production switcher, with the switcher output being connected to the record input of VTR C. The editor synchronizes all three VTRs and, at precisely the proper frame, activates the switcher, allowing VTR C to record the desired visual effect. Troublesome in perfecting the dissolve effect was the fact that the command port of the production switcher did not "look like" a VTR to the editor.

As newer devices such as special effects boxes appeared, editors were forced to adopt still another interface approach, namely a general purpose interface ("GPI"). Rather than transmit a command through a serial communications port, a GPI trigger pulse was transmitted from the editor to command a given function within a newer device. In essence, the GPI pulse performed a relay closure function for the remote device. For example, a special effects box might have three GPI input ports: a pulse (or relay closure) at the first port would "start" whatever the effect was, a pulse (or relay closure) provided to the second port would "stop" the effect, while a pulse (or relay closure) provided to the third port would "reverse" the effect.

Thus on-line editors grew more sophisticated as switchers evolved, and as more complicated transition-enabling accessory devices emerged. Soon editors were required to interface and control devices which allowed video wipes, flips, tumbles, the ability to key selected portions of one image onto another image, and characters to be generated on screen. The desired effects were programmed on the various special effects devices and operated under control from the editor in response to GPI pulses. The presence of these new accessory devices allowing more complex visual effects required greater performance from the editor. At the same time, there was a recurring problem of how to make the new devices "look like" a VTR to the editor for interface purposes. In essence, the design and performance of editors has historically been constrained by the de facto requirement that any interfaced peripheral device "look like" a VTR to the editor. While existing on-line editors can simultaneously control up to approximately 16 devices through serial ports, only one of the devices may be a video switcher.

The manufacturer of a VTR, switcher or other peripheral device provides a protocol instruction manual telling the user what editor control signals command what device functions. However the protocol for one manufacturer's VTR or device might be totally unlike the protocol for the same function on another manufacturer's VTR or device. Further, published protocol commands usually do not make full use of the peripheral device's capabilities, and frequently the VTR or device hardware might be updated by the manufacturer, thus making the published protocol partially obsolete.

The video industry has attempted to ameliorate the interface problem by adopting a few common protocols as standards, often with one peripheral device "emulating" the protocol requirements of another device. This emulation process was somewhat analogous to what has occurred with computer printer manufacturers, where the published escape and command codes for new printers often cause the printer to emulate industry standardized printers. However just as new printers often offered more flexibility and features than the older printers they emulated, new video peripheral devices frequently were capable of greater and more flexible performance than what was defined by their interface protocol. For example, the published protocol for a new digital disk recorder, a random access device, would list commands essentially emulating the performance of a VTR, a linear access device. As a result of this emasculated protocol, users were deprived of the many new features unique to a random access device. While a thorough understanding of the inner workings of the VTR or peripheral device would allow a user greater flexibility in obtaining maximum performance, the fact is that most video editor users are artistically rather than technically inclined.

A user could of course write software to better interface to a new device, thus allowing an editor to make maximum use of the new device's capabilities. However creating customized interface software is extremely time consuming and requires considerable expertise. For example, a customized software interface for a VTR (an established device whose capabilities are well understood) could take upwards of three man months to write, assuming that the VTR hardware and protocol manual were first fully understood. Even if the expense of a custom interface were undertaken, using a VTR from a different manufacturer would require rewriting the software. Thus, in practice, when a new peripheral device came to market, its manufacturer typically chose to adopt a standardized emulation rather than to bear the burden of writing a customized interface. As a result, the full capability of many new peripheral devices goes unrealized because the devices cannot fully and adequately communicate with the editor without a customized interface.

This lack of a universal approach for interfacing has continued to plague the industry. The problem is further compounded because users like to achieve video effects using tried and true techniques and combinations of equipment. However if a certain piece of equipment is temporarily unavailable to a user (the equipment may have broken, for example), the user may be unaware that all is not necessarily lost. The desired effect may still be achieved, perhaps by using what equipment is available and making multiple tape passes. Existing on-line editing systems are simply incapable of being told by the user what the desired effect is, and then making editing decisions for the user, based upon a knowledge of what equipment is at hand and a knowledge of the internal workings of that equipment.

As noted, both on-line and off-line editing systems generate an edit decision list or EDL. In existing on-line systems, the EDL is a complex collection of timecode numbers and cryptic designations for keying and dissolving operations. The timecode numbers give the precise time and frame number where events occur on the finished tape, as well as "in" and "out" times at which a given video source was put onto the finished tape. The operation designations simply state that at a given time frame, the editor issued a given command, "RECORD" for example, however what the visual effect resulting from the command cannot generally be ascertained.

At best a conventional EDL is a one dimensional historical time record of the most currently issued commands that resulted in changes made to the finished video tape. Although the output of an on-line editing system is video, it is surprising but true that existing EDLs contain no video image information. As a result, it is difficult for a user to examine an EDL and be able to predict what the visual image on screen will be at any given frame or time. In fact, where various video sources were superimposed or "layered" upon one another at different times, present EDLs make it almost impossible to predict the final image.

Also detrimental is the fact that the net effect of information contained in any portion of an EDL depends upon earlier occurring events. After a user completes intermediate edits and settles upon a finalized edit, prior art editor systems generate a "clean" EDL that removes all timecode overlaps and gaps, and produces a seamless EDL with a continuous timecode. As a result, information pertaining to the intermediate effects, including information pertaining to overlapped edit portions is irrevocably lost in existing EDLs.

The above limitations in existing systems prevent a user from going back and substantially re-editing the final tape to recover scenes intermediate to the final tape. For example, because conventional EDLs are flat, and only support a single video layer, they cannot adequately document the history of a layered image, and cannot "un-layer" or "re-layer" images, to create a different effect.

Also limiting is the fact that prior art editors are capable of storing only a few thousand lines or so of editing decisions. The EDL is further constrained because detailed information from the editor as to what various peripheral devices were doing at a given point is essentially non-existent. As noted, commonly the only information the editor conveys to the EDL is that a trigger pulse was sent at a certain time to a GPI to command an accessory device. Exactly what function the trigger pulse commanded is neither readily discernable nor easily reconstructed. Thus, lost and gone forever is an historical record of all the intermediate changes made with the on-line editor in arriving at the video images now on the tape. These hardware and software limitations within the editor prevent a user from readily going back and unlayering video, or deleting effects and recovering images formed intermediate to the final image.

Existing editing systems are also deficient in at least two other aspects: they do not allow for the simultaneous control of two or more edits or edit layers, and they do not allow multiple users on remote editing consoles to simultaneously edit on a single editing machine. While the video monitor used with existing systems can display a single set of parameters advising of the status of the editor, applicants are aware of but one existing system capable of a windowed display showing the current edit and a zoom image of a portion of that edit. However at present no system provides the capability to display two windows simultaneously, each displaying a separate edit or, if desired, one window being under control of a first on-line editor while the second window is under control of a second on-line editor.

Finally, editing systems require a user to keep track of numerous video tape sources, typically over certain frame ranges. Existing digital counters and light emitting diode (LED) bar graphs provide information only as to the tape's direction and speed. No information relating to the absolute position of a segment of video within the full tape is provided. Present editing systems do not provide a simple mechanical device capable of offering the accuracy of digital measurement, the ease of use of an analog device, while presenting tape source information in a relative and in an absolute fashion.

In summary, known on-line editors lack a true generic approach to the twin problems of readily achieving an interface with VTRs or peripheral devices, while simultaneously obtaining maximum performance and flexibility from the interfaced equipment. Further, known on-line editors lack the ability to control more than one video switcher, or simultaneously control through serial ports more than about 16 peripheral devices.

Further, existing on-line editors are unable to store all intermediate images and complete accessory device interface information. Such editors are unable to generate an EDL of unlimited length that is capable of providing a full and detailed historical record of all events resulting in the finished tape. As a result, known editors do not allow a user to instantly generate the final image corresponding to any point in the EDL, or to even predict what the image at any given time will be. Finally, existing editors lack the ability to control multiple simultaneous edits, the ability to permit multiple users to remotely make simultaneous edits on a single editor, and also lack motorized slide-type controls to provide absolute and relative information in a format that can be readily understood.

SUMMARY OF THE INVENTION

Accordingly it is an object of the invention to provide an on-line editing system capable of interfacing in a universal manner with VTRs and peripheral accessories such that user instructions to the editor are independent of the manufacturer and model number of the accessories.

It is also an object of the invention to provide an on-line editing system with an interface that is capable of receiving user instructions and determining which of the available VTRs and peripheral accessories should be used in which manner to produce the results desired by the user.

It is a further object of the invention to provide an on-line editor with an EDL that is virtual (e.g., capable of being unlimited in size subject to available storage media).

It is a further object of the invention to provide an EDL that includes audio and video information for all edit points, including pictorial, graphical and numerical display information, and is capable of displaying a still image for any point within the EDL.

It is a further object of the invention to provide an EDL capable of supporting complex time interdependencies, thereby allowing edit timing relationships to be expressed in relative (as well as absolute) terms.

It is a further object of the invention to provide an on-line editor with an EDL that can maintain a complete history capable of distinguishing and recognizing linear and layered edits, cuts, dissolves, superimposition keys, mattes and fills.

It is a further object of the invention to provide an on-line editor system and EDL permitting a user to reconstruct intermediate video images, and to unlayer or re-layer images from the final video tape.

It is a further object of the invention to create a new EDL format capable of storing timecode, picture and audio information so that the EDL so created can be output from an on-line editor according to the present invention, and as such, be used as input to an on-line editor capable of reading said format, thus allowing such on-line editor to make use of said timecode, pictures and audio information.

It is a further object of the invention to provide an on-line video editing system capable of receiving as first input set-up data representing the memory contents of a controlled video device, as a second input data representing the video output of the controlled video device, and capable of allowing a user to flexibly modify the set-up data parameters and associate the parameters with captured framestored image data for later recall.

It is a further object of the invention to provide an on-line video editing system capable of receiving as first input a conventional EDL from an off-line editor, as a second input picture information from said off-line editor's picture storage medium, and capable of creating therefrom an EDL allowing the user of the on-line system to transfer all timecode, picture and audio from the off-line edit session into the on-line edit session.

It is a further object of the invention to provide an on-line editor capable of operation with one or more similar on-line editors, such that each editor may control substantially any device in an editing suite without rewiring the suite.

It is a further object of the invention to provide an on-line editor with the capability to control on a field-by-field basis essentially any device parameter for a controlled device within the edit suite, and further to maintain proper time synchronization when editing despite the passage of audio and/or video signals through devices contributing varying amounts of time delay.

It is a still further object of the invention to permit a user to temporarily store video images on a video cache without regard to where on the cache the image is stored, and to allow the user to automatically and transparently invoke recall of the image from the cache simply by referring to the original video source.

It is a further object of the invention to provide an edit decision list capable of automatically creating submasters that represent how intermediate visual effects are constructed, and that may be used as building blocks to reproduce an image that might normally require more than a single pass of the relevant source material; further such an edit decision list should be capable of tracing the origin of source material used to create multi-generational programs and permit the user to know how to recreate the multi-generational program, and also how to generate a first generation version of such program.

It is a still further object of the invention to distribute processing commands from the editor in a synchronized manner.

It is a still further object of the invention to provide an editing system with a motorized control that automatically reflects the state of the VTR under control and is capable of providing absolute position control.

It is a still further object of the invention to provide an on-line editor capable of controlling more than one video switcher, and capable of simultaneously controlling through serial ports more than 16 peripheral devices.

It is an object of the invention to provide a system and method for precise editing of video images for inclusion in, or exclusion from, an edited videotape which will simulate the positioning of film images in close proximity for inclusion in, or exclusion from, an edited film.

It is another object of the invention to provide a system and method for precise editing of video images for inclusion in, or exclusion from, an edited videotape which does not require forward and backward motion of a video tape machine to make the edit.

It is a further object of the invention to provide an editor capable of recognizing what devices are available in the edit suite, and marshalling those devices in an optimal fashion to accomplish any given task.

It is a still further object of the invention to provide an on-line editor system capable of handling multiple users or multiple simultaneous edits.

It is yet a further object of the invention to provide a console control and keyboard having user definable "soft" controls, permitting a user to personalize or otherwise instantly reprogram the command function of any key or control, as well as customize the appearance of visual menus presented to the user.

A system according to the present invention provides an on-line editor having a central processing unit ("CPU")

board and a plurality of communications processor boards with interface software, and further includes a video subsystem having a framestore, and also includes an audio board.

Applicants' interface software permits the editor to simultaneously interface, in a universal fashion, using serial communications ports with up to 48 controlled video devices such as recorders, switchers, etc. In addition to controlling these 48 devices (all of which may be switchers), applicants' editor can control an additional 48 devices requiring GPI control pulses.

The hardware and software comprising an editor according to the present invention permits substantially all devices for a site with one or more edit suites remain permanently hardwired to one or more editors, each editor retaining the ability to control any such device. This flexibility minimizes the need for expensive routers and substantially eliminates the time otherwise needed to rewire the editing suite to accommodate various effects and the like.

The CPU board preferably includes a software library having a data or text file for each peripheral device with which the editor may be used. (Additional files may be added at a later date for devices for which a file does not already exist within the library.) A given text file contains information relating to the specific commands for a controlled video device, and information relating to the internal functions (or internal architecture) of that device. The text file structure is such that the internal workings of the device are mapped into the data file. Preferably a text file format is used, permitting the contents of each file to be readily modified, even by a user unfamiliar with computer programming.

A user, by means of a keyboard for example, need only instruct the editor to issue a command to the device, for example the command PLAY to a video tape recorder, whereupon the text file will specify how to automatically translate the PLAY command into a command signal having the proper format for the device. The interface software further allows a user to ask the editor, preferably by means of user understandable text files, to perform a desired edit, to "WIPE A/B" for example. Upon receipt of this request, the editor can in essence design the editing suite and determine what available devices should be commanded in what sequence to produce the desired edit effect. Preferably each video controlled or other peripheral device will contain its own imbedded text file. This procedure would allow the editor to issue a "REQUEST FOR TEXT FILE" command to the device whereupon, upon identifying the device, the proper commands to operate the device could be downloaded into the CPU board.

Applicants' EDL software provides for a scheduling table available on each communications processor to allow the prioritizing of commands, and the execution of commands at a later time and/or repeatedly. The scheduling of commands and related housekeeping provided by the scheduling table results in a smoother flow of data from the editor, minimizing the likelihood of data overflow (or bottlenecks) at any given time.

The present invention provides the CPU board with a tree-like hierarchical EDL database that is Unlimited in size and is virtual with respect to time. Applicants' EDL software creates a unique "node" for every edit step, and provides a complete historical record enabling a user to later determine exactly what occurred at every frame during an editing session. At every editing step, the EDL generates and stores identification of each source media, offset within the media, the number of edit revisions, the nature of the edit, and so forth. As a result of this total and unambiguous record, the EDL allows a user to "un-layer" or "re-layer" layered video effects, or to undo any other effect, in essence, to turn back the clock and recreate the original video before editing, or before a particular editing stage.

In addition to storing conventional timecode information, applicants system stores and permits EDL information to be presented in a variety of formats, including graphic and visual presentations. For example, the editor is able to retrieve and display a user identified framestored head or tail image from a desired edit clip. A motorized control allows the user to move to a desired frame within a source media, either relatively or absolutely, simply by moving an indicator bar on the editor control panel. If the bar is moved to the left, for example, the source media rewinds, if moved to the right, the tape winds. The left extreme of the sliding indicator can be made to correspond to the beginning of the entire tape or the beginning of a clip therein, with the right extreme of the indicator corresponding to the tape end or to the segment end, as the user desires. Further, as the tape moves under control of the editor, the indicator bar moves correspondingly, to provide a visual representation of where within the tape or clip the user is at any given moment.

The hardware and software structure of the editor system provides the capability to simultaneously control two or more edits or edit layers, and allows multiple users on remote consoles to simultaneously edit on a single on-line editor. Applicants' system is also capable of receiving, as input, a conventional EDL from an off-line editor and receiving the video information commonly dumped to disk storage by an off-line editor, and generating therefrom an EDL capable of presenting video images, thereby allowing an off-line editor to communicate picture information to applicants' on-line editor.

Other objects, features and advantages of the invention will appear from the following description in which the preferred embodiments have been set forth in detail, in conjunction with the accompanying drawings.

BRIEF DESCRIPTION OF THE DRAWINGS

FIG. 2A shows a prior art editor interfaced with a VTR;

FIG. 2B is a block diagram of the interface between the prior art editor and VTR shown in FIG. 2A;

FIG. 4 is a scheduling table according to the present invention;

FIG. 6 is an example of an EDL generated by a prior art editor;

FIGS. 11A, 11B, 11C are an information model showing the hierarchical structure of applicants' EDL software;

FIGS. 12A–12C schematically illustrate how applicants' EDL forms a hierarchical structure in the presence of layering;

FIG. 14A is an informational model of applicants' key board configuration, while FIG. 14B is a data flow representation of FIG. 14A;

FIGS. 22A–22K provide a listing of an exemplary text file for a Sony BVW-75 recorder.

FIG. 31 is a flowchart type diagram of an embodiment of the method according to the present invention for universally interfacing a first device such as an on-line editor to a second device to allow a user of the first device to functionally control the second device with inputs to the first device independent of a specific signal protocol requirement of the second device to cause the functional command to be executed by the seond device.

DETAILED DESCRIPTION OF THE PREFERRED EMBODIMENTS

Figure 1:
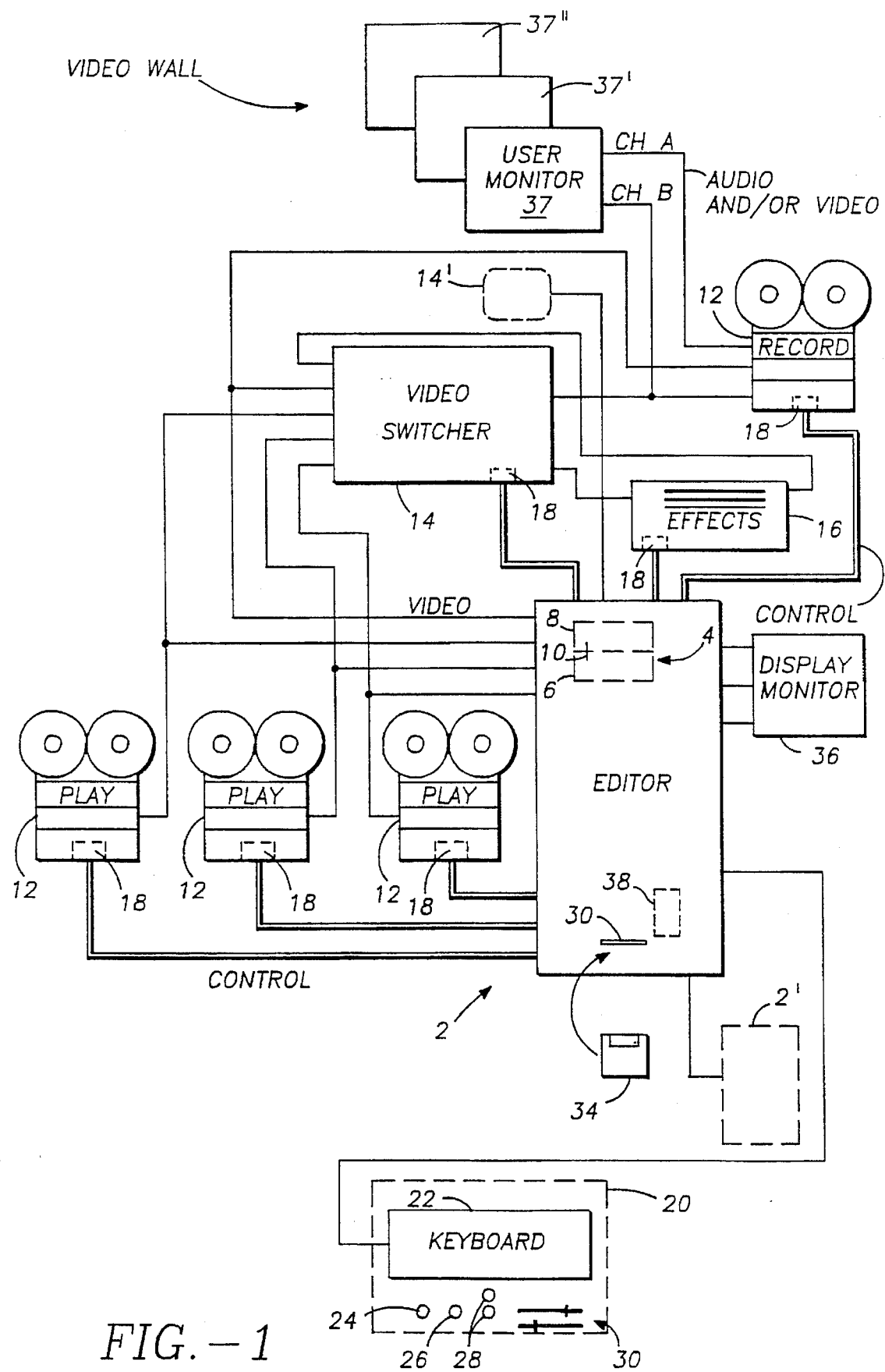
FIG. 1 shows a generalized editing system according to the present invention.

FIG. 1 shows a typical on-line editing system according to the present invention as including an on-line editor 2, a universal interface 4 (which includes a host processor 6, a communications processor 8, and related software 10), one or more devices for storing video signals such as video tape recorders (VTRs) 12, and assorted peripheral accessory devices ("devices") such as video switchers 14, 14', and a special effects box 16. It is to be understood that an editing system according to the present invention may include other controlled video devices in addition to or in lieu of the VTRs 12, switchers 14, and box 16 shown. Other controlled video devices could include a digital disk recorder, a character generator, a timebase corrector, a still store, and even an audio switcher, and may include more than one of each device. In fact, the video editor disclosed herein is capable of simultaneously controlling up to 48 devices through serial communication ports, all of which devices may be video switchers 14, 14'. In addition, the editor disclosed herein can control an additional 48 devices using GPI trigger pulses.

The VTRs and devices are each capable of doing various functions and each contain their own interface 18 which in turn include electronic circuitry and software which allow the various VTRs and devices to perform functions upon command from the editor 2.

The editor 2 also communicates with a control panel 20 that allows a user to issue commands to the editor. Control panel 20 preferably includes user input devices such as a keyboard 22, a trackball 24, a shuttle control 26, optical encoders 28 and applicants' new motorized control indicators 30. The editor 2 includes a disk drive 32 allowing an edit decision list (EDL) to be input or output using, for example, a diskette 34. A monitor 36 connects to the editor 2 for displaying video images and other graphic information for the user. The multitasking capabilities of the present information permit monitor 36 to display two or more edits simultaneously, and even allows one of the two edits to be under control of another editor 2' connected to network with editor 2. In the present invention, editor 2 is capable of generating a virtual EDL 38 having unlimited length and containing video as well as device control information.

The manufacturer of each device (e.g., VTRs 12, switchers 14, 14', etc.) connected to the editor 2 publishes a manual that states what protocol commands must be presented to the interface internal to that device to command the performance of a given function. For example if VTR 12 is a Sony model BVH 2000, the Sony protocol manual will give the command signal that must be presented to the interface 18 of that VTR 12 to cause the VTR to enter the RECORD mode. However a VTR from a different manufacturer, an Ampex VPR-3 for example, will typically have a different protocol command sequence and require a different signal at the VTR interface 18 for a given function, such as RECORD. Thus, in the prior art, merely substituting one VTR model for another can create interface problems for the user.

It is necessary to now describe that state of the existing art to better understand the capabilities of the present invention. FIG. 2A shows a prior art editor 40 interfacing with a device such as a VTR 12. The editor 40 has an interface 42 that includes a host processor 44, a communications processor 46, and related software 48. As the following description will demonstrate, the prior art interface 42 is essentially a device-specific interface, e.g., an interface that is specific for a given brand and model of VTR or other device.

FIG. 2B is a block diagram showing details of the interfacing elements. In the prior art, the host and communications processor 44, 46 must each contain every protocol command required to command the various functions published for the VTR 12 (or other device to be controlled). In FIG. 2B, the communications processor 46 includes a hard-wired look-up table 50 that provides a one-to-one mapping providing a protocol format translation for each command function of the VTR 12. The lookup table 50 is essentially dedicated to the particular brand and model of VTR 12. In essence, lookup table 50 translates a "high level" command ("PLAY" for example) issued to the editor into a "low level" machine understandable command going through the host processor 44 in the particular format required for the interface 18 within the VTR 12.

For example, if the PLAY command is issued by the editor 40 as a format signal (2), but the protocol manual for VTR 12 advises that PLAY must be commanded by a format signal (23), the lookup table 50 will have been constructed to perform the necessary (2) to (23) translation. The protocol output from the communications processor 46 is shown in FIG. 2B as being a 4-byte wide command 51. This command 51 includes the byte count (BC), start message (STX), and transport (Tran) information in addition to the specific command ordering VTR 12 to enter the PLAY mode (Play 23). If the manufacturer of the VTR 12 later updated the machine, perhaps adding new commands such as a command Foo to the hardware, the protocol information contained in the host and communications processors 44, 46 would each have to be updated, a timely and technically demanding task.

Also it must be emphasized that if a different brand or model VTR 12 is connected to the prior art editor 40, the look-up table 50 would have to be changed.

Figure 3A:
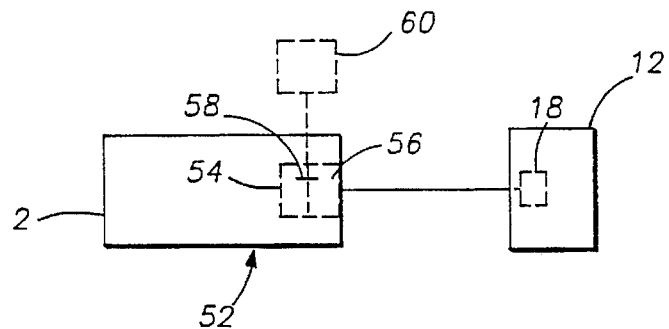
FIG. 3A shows an editor according to the present invention interfaced with a VTR.
Figure 3B:
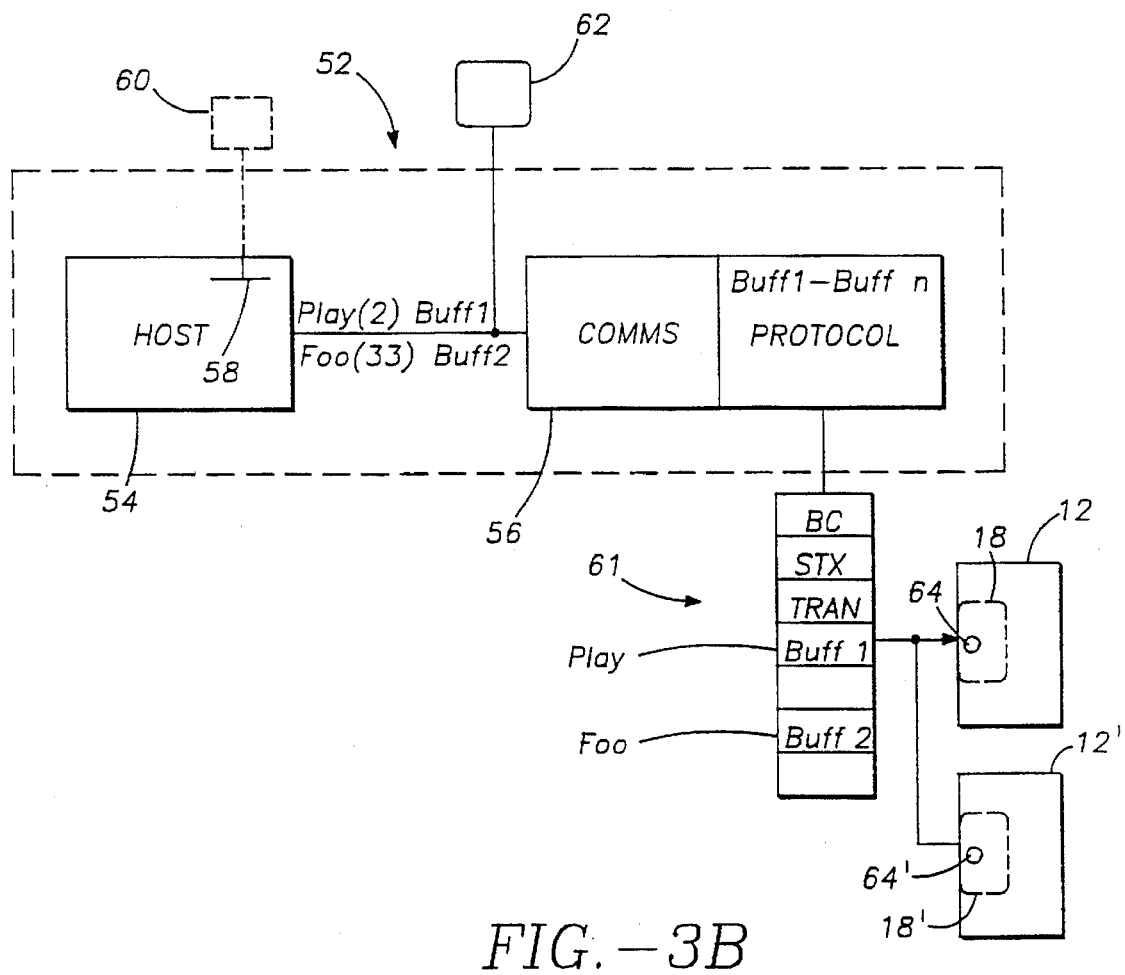
FIG. 3B is a block diagram of the interface between the editor and VTR shown in FIG. 3A.

In contrast to the prior art, FIGS. 3A and 3B show the interface 52 used in the present invention. In FIG. 3A, an editor 2 according to the present invention includes a host processor 52 (an Intel 960CA, for example), a communications processor 54 (such as a Z80), and a software data file (shown as 56) whose contents may be readily modified by user input (shown as 60). The data file 56 contains two types of information: data relating to specific commands for the VTR 12 (or other device under command of the editor 2), and data relating to the internal functions of the VTR 12 (or other device), such as how signals within the VTR are routed. In essence these data result in a mapping of the full hardware capabilities of the VTR 12 into the data file 56. While FIGS. 3A and 3B illustrate a data or text file 56 embedded within the editor 2, alternatively the text file 56 would be downloaded from the various peripheral devices (if they were so equipped), or could even be entered manually into the editor 2 by the user.

While the data file may be in various codes or formats, in the preferred embodiment the data file 56 is a high level text file that is understandable to a non-technical user. Hereafter the term "text file" will be used, although it is for the convenience of the user (and not a prerequisite of the present invention) that data file 56 may be written to be user understandable. With reference to FIG. 3B, if a user desires to command VTR 12 to PLAY, the user issues the high level command PLAY. A text file 56 accessible to the host processor 54 will then be used to specify how to automatically translate the user command ("PLAY") into a command 61 having the proper format for the VTR 12.

The configuration shown in FIG. 3B provides many advantages over the prior art method of interface shown in FIG. 2B. As noted, in the prior art, if the manufacturer of VTR 12 later added a new and previously undefined function Foo to the hardware, it was necessary to modify the software in the host and the communications processors 44, 46 to reflect this change. However in the present invention, a user by means of input 60 (a keyboard, for example) can modify the text file 58 providing for the newly added function Foo. Further, because the text file 58 is preferably in a format understandable to a human, no special expertise is required to make the modification.

Suppose a user wants to create the video effect wipe from composite 1 to composite 2, i.e., to create a multiple layer image that transitions from a layered image (composite 1) to another layered image (composite 2) for example in a left-to-right direction. In the prior art, a user would have to first figure out how the effect should be accomplished (i.e., program a video switcher to perform each key and the wipe, and then trigger the switcher to perform just that effect). Once the switcher has been so programmed, the editing system in essence is "frozen" and can only perform that effect in that fashion. Often the user knows one way and one way only to accomplish the desired effect. Such a user may be thwarted if a single piece of equipment necessary is unavailable, notwithstanding that the remaining equipment might still be capable of creating the effect using a different procedure, using multiple tape passes for example.

By contrast, the present invention allows a user to create the above effect simply by issuing the user understandable high level command "WIPE FROM COMPOSITE 1 TO COMPOSITE 2" to the editor 2, the user having previously defined composite 1 and composite 2, e.g., in the edit decision list 38 (EDL) contained within editor 2. The editor 2 will examine a preferably stored library of text files 58 defining the characteristics and protocol requirements of the various peripheral devices 12, 14, etc. and will cause the proper commands to issue from the editor 2 to the necessary devices at the appropriate times. It is significant to note that the single command "WIPE FROM COMPOSITE 1 TO COMPOSITE 2" simply does not exist for the various pieces of equipment being controlled, yet the editor 2 because of its text file capability allows even a lay user to create this complicated visual effect. Equally significant, a user can instruct the editor 2 to "WIPE FROM COMPOSITE 1 TO COMPOSITE 2" whereupon the editor 2 will advise the user what combinations and sequences of available equipment (VTRs, switchers, etc.) should be used to create the effect. In short, the editor 2 can make technical decisions for a user, allowing the user to be artistically rather than technically creative.

The configuration of FIG. 3B offers several other advantages as well. If desired, each piece of peripheral equipment (VTRs, switchers, etc.) interfaced to an editor 2 according to the present invention could include imbedded text file information 64 within its interface 18 automatically identifying that piece of equipment and its full capabilities to the editor 2. For example, assume that VTR 12 was replaced with a different brand machine, VTR 12' whose interface 18' included an imbedded text file 64'. In the present invention, the user would merely issue a high level REQUEST FOR TEXT FILE command whereupon editor 2 and data file 58 would automatically cause the proper commands to be downloaded to properly operate VTR 12'. The imbedded data 64' in the peripheral device 12' would in essence allow a "handshaking" identification function, somewhat similar to the manner in which two different modems initially identify themselves to one another to determine baud rate and any other common protocol. If the VTR 12' did not include an imbedded data file, using text files the user could identify the brand and model for VTR B to the host processor 54, whereupon the processor 54 would know how to communicate with VTR 12' by virtue of a stored library of text files for various devices. Alternatively, the processor 54 might be programmed to attempt to communicate with VTR 12' (or other device) using a variety of protocols until sufficient "handshaking" occurred, whereupon the device would have been identified to the editor 2. If no previously written text file concerning the device was available, the user could simply add an appropriate text file into the processor 54 manually.

The textfile and device modeling aspect of the present invention allows field-by-field control of essentially any device parameter for a device under control of editor 2. Typically, a controlled device, upon triggered input, causes an image to move as dictated by the device's internal programming, typically according to an algorithm within the device. For example, commanding "run" normally causes a digital effects device to perform the currently set-up effect. In essence, the device's internal structure and programming can produce a new image for every video field. A prior art editor basically accepts the effect parameter transitions that were programmed into controlled devices at time of manufacture.

However the present invention permits modification of device parameters, including parameters that determine the position of an image within a device, on a field-by-field basis. As a result, the image coming from a controlled device can be completely controlled in different ways under command of editor 2. Because the present invention can readily communicate a large amount of data on a field-by-field basis. Applicants' text file for a given device may not only specify an algorithm not included within the device, but the algorithm may be modified field-by-field.

The communications between the host and communications processors 54, 56 permits the creation of scheduling tables (shown as 62) which, among other tasks, are capable of layering protocol commands according to priority. The editor 2 preferably includes four communications processor boards 104, each board preferably being able to simultaneously control 12 serial ports. (This gives the present system the ability to simultaneously serially control 48 devices in addition to 8 GPI controlled devices.) Each communications processor board 104, 104' includes a scheduling table 62 applicable to devices interfacing to that particular board 104, 104'.

In the present invention, protocol commands can be assigned priorities, with some commands considered more important than others, and with protocol commands of equal priority being held within a common buffer within the editor 2. In FIG. 4, for example, the PLAY command is given the highest priority ("0") and PLAY and any other layer 1 commands are grouped (or buffered) together. However within any given buffer group, the present invention recognizes that relative priorities may exist. Thus, in the event of any conflict within editor 2, the PLAY command will issue before any other command of lower priority.

Commands from the CPU board 102 which enter an individual communications processor 104 (or "communications "channel") are sorted into the schedule table 62 according first to delay, and then to priority. When the time comes for a command to be sent to the peripheral device (e.g., after 99 frames have passed for the PLAY command in FIG. 4, whereupon the PLAY delay has decremented to zero), the command leaves the scheduler table to be grouped together with other commands at the same protocol layer into the appropriate protocol output buffer (preferably 8 such buffers being available), such as buffer 1 in FIG. 3B. The buffers are assembled by the communication processor boards 104 into the correct protocol layer order and sent to the device.

FIG. 4 shows the contents of a typical scheduling table 62 prepared by an editor 2 according to the present invention. The first table column shows by how many fields (if any) execution of a given command should be deferred. For example, while editor 2 is shown as having issued the PLAY command "now", execution of this command is to be deferred for 99 fields hence. The second column advises whether a given command is to be repeated for every field (i.e., "sticky bit"=1) or whether it is a one-shot command ("sticky" bit=0). The third and fourth columns demonstrate the prioritizing ability of the present invention. The fifth column represents "housekeeping" data used by the editor 2 to supervise the interface process, while the sixth column provides confirmation that commands were actually sent from the editor 2 to the VTR 12 or other device under control.

It must be appreciated that scheduling table 62 has no knowledge of specific commands, all information pertaining to specific commands coming from the text file 58 within the host processor 54 in the editor 2. This ability to schedule commands minimizes problems relating to data overflow, or "bottlenecks" that can occur in prior art systems. The present invention spreads out the amount of data, allowing the host processor 54 to send commands to a communications processor channel 104, where the command resides until the proper time for its execution. This flexibility allows low priority status messages, for example, to reside in the communications processor board 104 until the relative absence of more pressing commands permits the communications channel to automatically make inquiry, for example, as to the status of a device (e.g., is VTR #12 turned on and rewound). By contrast, in the prior art the scheduling flexibility demonstrated in FIG. 4 was simply not available because of the requirement for dedicated hardwired protocol mapping for each specific function.

In the prior art, EDLs are especially deficient in providing an historical record where layered images have been produced. Assume that the prior art editor of FIG. 2A is used to control several source VTRs and a switcher to produce a final tape using a layering technique. VTR A has source tape showing a mountain landscape, VTR B has source tape showing an automobile, and VTR C has source tape showing a telephone number. These images are to be combined, perhaps for a television commercial, showing the car appearing in front of the landscape, and during the last 10 seconds of the commercial the telephone number is to appear across the lower portion of the image.

Figure 5:
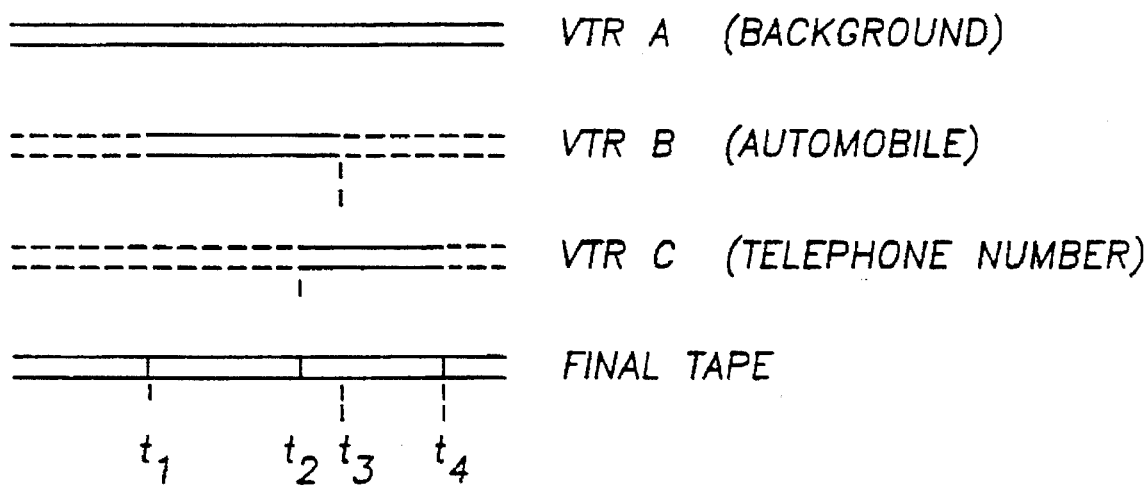
FIG. 5 shows schematically the steps required to layer three images.

FIG. 5 shows schematically the various source tapes (VTR A, B, C) used to create the final tape. Of significance in FIG. 5 is the "overlap" between the onset of VTR C (occurring at time t2) and the tail end of the material on VTR B (occurring at time t3). In the final tape shown, the telephone number on VTR C begins at time $t_2$, which is before the end of the video on VTR B. However because their structure requires prior art EDLs to be contiguous, the information available on a prior art EDL will show events occurring at $t_1$, $t_2$ and $t_4$. The overlap which occurs between time $t_2$ and time $t_3$ is not readily apparent from the EDL, and once the EDL is "cleaned" this information is not historically available for later use.

By contrast, applicants' system is capable of making a historical record of all events occurring in the production of the final tape. Applicants' EDL is able to provide a rich source of information to a user, including, for example, at what frame into the material on VTR B and at what time did $t_1$ occur, the duration of the recording from VTR B (i.e., when did $t_3$ occur), at what frame and at what time was the material from VTR C recorded onto the final tape (i.e., when did $t_2$ occur), and at what frame and time did recording from VTR C cease (i.e., when did $t_4$ occur).

Traditionally, editors have used ripple to insert a new edit between segments in an existing edit decision list. The ripple slides the following edits down the timeline by the duration of the new edit. When inserting an edit into the list, the user must indicate "insert with ripple" or "insert without ripple". Where the list is really a set of discrete subprograms, e.g., acts in a movie, only a part of the list needs to be rippled on insertion. Some prior art editing systems permit the user to insert the edit and then select a range of edits and ripple only these. While serviceable, this prior art mechanism is awkward. Further, the mechanism breaks down with an edit decision list representing a multilayered program.

A variation on ripple relates to edits that are layers, e.g., keys. Often the program in-point of the layer is marked relative to some underlying material. If this underlying material itself moves as a result of a ripple, the user must take care to ripple all of the layers that were marked over this material. At best this prior art approach is cumbersome, and completely fails to represent the relationship between the layer and the background that the user had in mind.

Another example of the deficiency of prior art systems involves overlaying or "dropping in" segments over existing material, e.g., skiing scenes interspersed into an interview with a skier. In many instances the material to be dropped in does not affect all of the channels on the program, and in fact is marked against channels that it does not effect. In the skiing example, the skiing images are video and are marked against the voice audio channel to coordinate with specific comments in the interview. The new edit for the drop-in must ripple with the voice-audio channel but may be independent of any other video in the program.

Applicants' hierarchical EDL structured (described elsewhere herein) permits the user to specify the relationship of the edit to the rest of the program. The EDL actually contains the relationships that the user has set up, which relationships are automatic ally maintained by editor 2. Essentially for each edit in the EDL, the user specifies the timing relationship of the in-point of the edit, and the behavior of any edits that will follow this edit.

Figure 20:
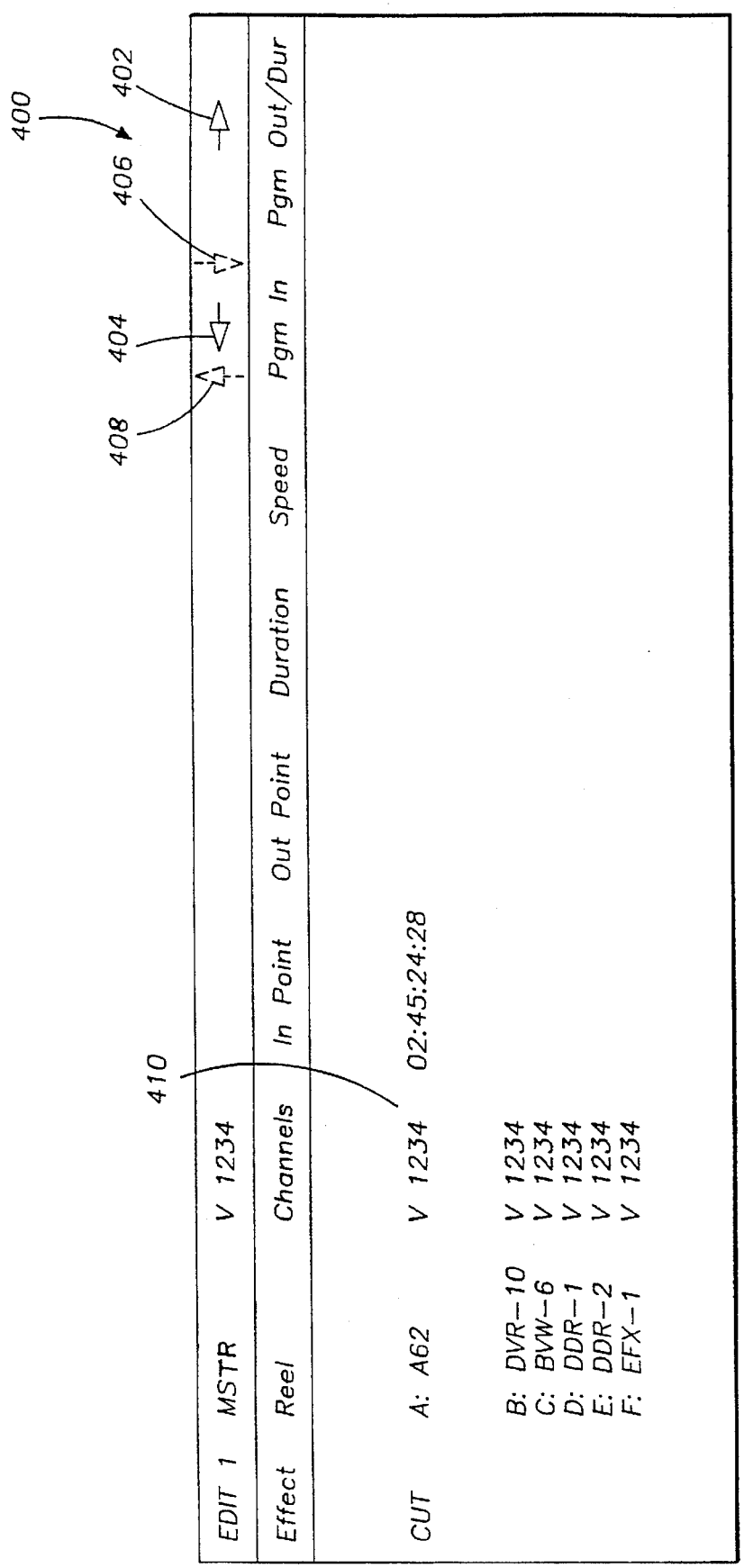
FIG. 20 is a representation of ripple time markers, displayed on the present system. is a representation of a display screen generated in use of the system for editing of video images for inclusion in, or exclusion from, an edited videotape.

These relationships may be graphically indicated, for example, with an arrow pair 400 in FIG. 20. An out-point arrow 402 represents the most common case of "insert with or without ripple". When drawn, arrow 402 indicates that following edits will ripple after this edit, and when blanked that this edit will be dropped in over any underlying material. In the preferred embodiment, the arrow 402 defaults on, but may be toggled on and off by a user of editor 2.

The in-point arrow 404 is preferably always drawn and has three forms to indicate the in-point timing relationship. A left pointing arrow (e.g., arrow 404) indicates that this edit will ripple against any preceding edit. In the preferred embodiment this is the default mode and represents the most common case for simple cuts-and-dissolves editing.

A downward-pointing arrow 406 (shown in phantom) indicates that this edit was marked against some background context and must ripple with that context whenever the context moves within the EDL. Preferably this is implemented as the default case for layers and drop-ins, marked against some point on an existing program timeline.

An upward-pointing arrow 408 (shown in phantom) indicates that this edit was marked at an absolute time on the program timeline, independent of other edits in the EDL, and should never ripple. While less commonly used, this is useful, for example, for titles that must come in at a particular point in a program, regardless of what video is underneath.

Finally, for the in-point arrow 404, a channel name 410 is shown to indicate more specifically how the relationship is constructed. Preferably the default mode is for an edit to be marked against the same channels it uses and affects: a video edit is marked relative to video material. However applicants' system permits the user to set this channel to describe the sort of relationship required for the above-described skier interview drop-in example.

In short, unlike prior art systems, the present invention permits the user to describe complex and powerful timing relationships using simple graphical tools. The present invention performs the work of maintaining these timing relationships for the user, eliminating the need for after-the-fact ripple tools.

Even though they are limited in their data content, prior art EDLs are not easily read. FIG. 6 shows a typical prior art EDL, presented in the commonly used CMX format, although other formats are also available. The EDL is commonly stored on a computer floppy diskette for possible later use as input should further revisions to the image be required. The EDL may also be displayed on a video monitor connected to the editor. As FIG. 6 demonstrates, all of the edit information is displayed as timecode numbers. For example the rather cryptic second line of FIG. 6 states that a GPI trigger pulse was sent to a device (labelled by the user as DFX and perhaps referring to an effects box) to record in point (RI) plus 15:16, e.g., at 15 seconds plus 16 frames (+00:00:15:16). The next line advises that a GPI trigger pulse was sent to a Grass Valley Company switcher capable of fading to black (FTB), the pulse being sent at the record in point plus 22:00, i.e., 22 seconds plus zero frames.

The various timecode numbers are themselves recorded into the various video tapes. The first line in EDL provides timecode information showing, for example, that the source tape in and out times for these events was 1 hour, 16 minutes, 45 seconds and 20 frames, and 1 hour, 17 minutes, 9 seconds and 4 frames respectively. Further, the first line advises that the output record tape input was at 1 hour, 4 minutes, 45 seconds and 21 frames, and 1 hour, 5 minutes, 9 seconds and 5 frames.

The EDL shown in FIG. 6 is commonly referred to as a "dirty EDL" because it does not reflect contiguous in and out timecodes. Since even a prior art EDL might be used at a later time to try to reconstruct the final visual effect, there was no point in retaining overlap information in such an EDL. For example, it would be pointless for a user to spend time trying to recreate an event occurring at the beginning of an EDL only to discover later that the effect was recorded over by something else. Therefore "dirty EDLs" are routinely processed with off-the-shelf software to produce a "clean EDL", namely an EDL permitting no timecode overlaps. For example, with reference to FIG. 5, a $t_2$–$t_3$ "overlap" results because the onset of recording VTR B at time $t_2$ occurred before the time $t_3$ that recording ceased from VTR B.

As confusing and ambiguous as this overlap might be in a dirty EDL, the resultant clean EDL simply removes all overlaps, producing a seamless, contiguous time in, time out record, somewhat analogous to the way the final tape in FIG. 5 shows continuity. For example, in FIG. 5 if VTR B contained an image of an automobile, and VTR C contained a telephone number, the cleaned EDL will eliminate the $t_2$–$t_3$ overlap, and thus cannot produce the image of the telephone number superimposed over the car during that time interval. In the prior art, it is therefore not unusual for an EDL generated from a edit session involving layers to remain "dirty". However a dirty EDL is more difficult to read than a "clean" EDL, and further, recreating the steps in an early portion of the EDL might prove to be fruitless as a later portion of the EDL might cause the earlier portion to be over recorded, a happening not immediately apparent upon reading the EDL.

It is important to appreciate that FIG. 5 reflects only the timecode for the various VTRs. If the effect being "documented" was a multi-layer effect, most of the information needed to know what was recorded when and atop what is simply not present. The prior art EDL reflects the issuance of general purpose interface ("GPI") triggers to various devices, but the EDL neither knows nor documents what the triggered device was actually doing, what the device actually contributed to the edit, or what data is actually relevant to the action being performed. Finally, even though the prior art EDL is limited in content, a monitor displaying the EDL of FIG. 6 offers little more than a screen full of numbers.

By contrast to the flat or one-dimensional prior art EDL, the software within the present invention creates a tree-like EDL database containing a full historical record documenting every step of the editing process. Applicants' EDL data base allows a user to later know exactly what occurred during an editing, and (if desired) to undo editing effects to recover earlier stages of the editing process. A use of the present system can, for example, be provided with all information needed to recreate the visual effect shown graphically in FIG. 5, including the ability to unlayer one or more video layers.

Figure 7:
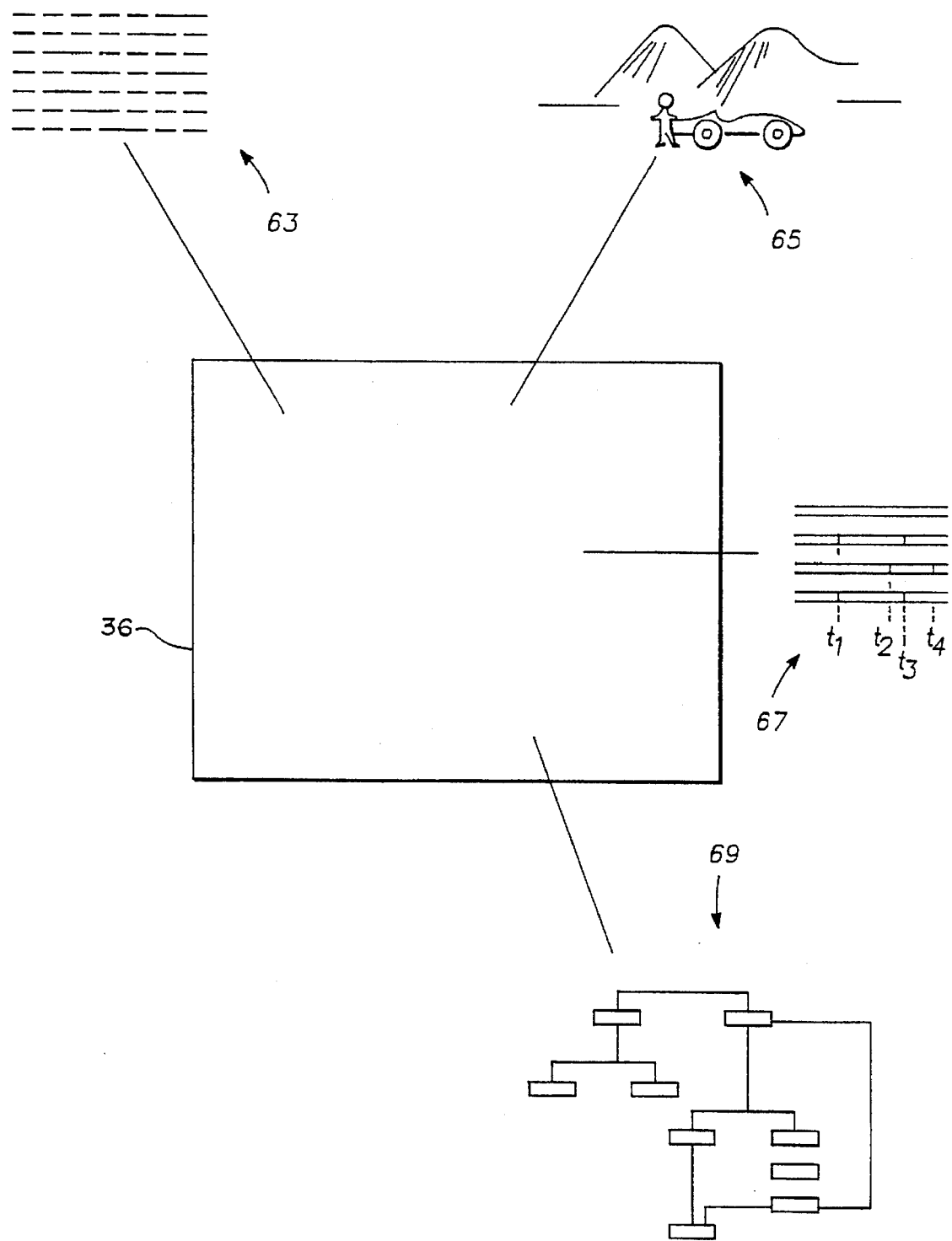
FIG. 7 is an example of the types of visual presentations available from applicants' EDL.

FIG. 7 shows by way of illustration some of the displays available (for example on monitor 36 in FIG. 9) to a user of the present system. A user might direct the present invention (using commands issued from the control panel 20 for example) to display a timecode oriented presentation 63 which presentation the user may elect to display in the somewhat limited format of a prior art EDL. The present invention allows a user to call upon the EDL data base to present a still image 65 corresponding to a given point in an edit sequence. Applicants' motorized control 30 enables a user to advance or reverse a video source until the desired image 65 is displayed using information available from the video sub-system within editor 2. Among the many modes or presentation to the user is a time line presentation 67 similar to what is shown in FIG. 5. In addition, applicants' EDL database allows a tree-like representation 69 to be presented, visually depicting in block form the various editing stages in question. (A more detailed description concerning the tree-like EDL database structure accompanies the description of FIGS. 11A-11C herein.)

Before launching into an in depth description of the editor 2, the motorized control 30 shown in FIG. 1 will be described with reference to FIG. 8. Device 30 is preferably used in the present invention to display and to control absolute and relative positions within a video tape reel. Assume that VTR 12 holds a source tape 68 containing 30 minutes of video of which 10 seconds or 240 frames, occurring somewhere in the let us say the first third of the tape, are of special interest to the user who perhaps wishes to use the 10 second segment for a special video effect. The user would like to rapidly view the source tape 68 and having identified where therein the 10 second segment lies, be able to literally "zero" in on that segment.

In the prior art, the source tape 68 is displayed and digital information identifying the frames or absolute time corresponding to the beginning and end of the 10 second segment is noted. The user must then enter this numerical information into the editor, commanding the VTR 12 to rewind to the beginning of the 10 second segment.

Figure 8:
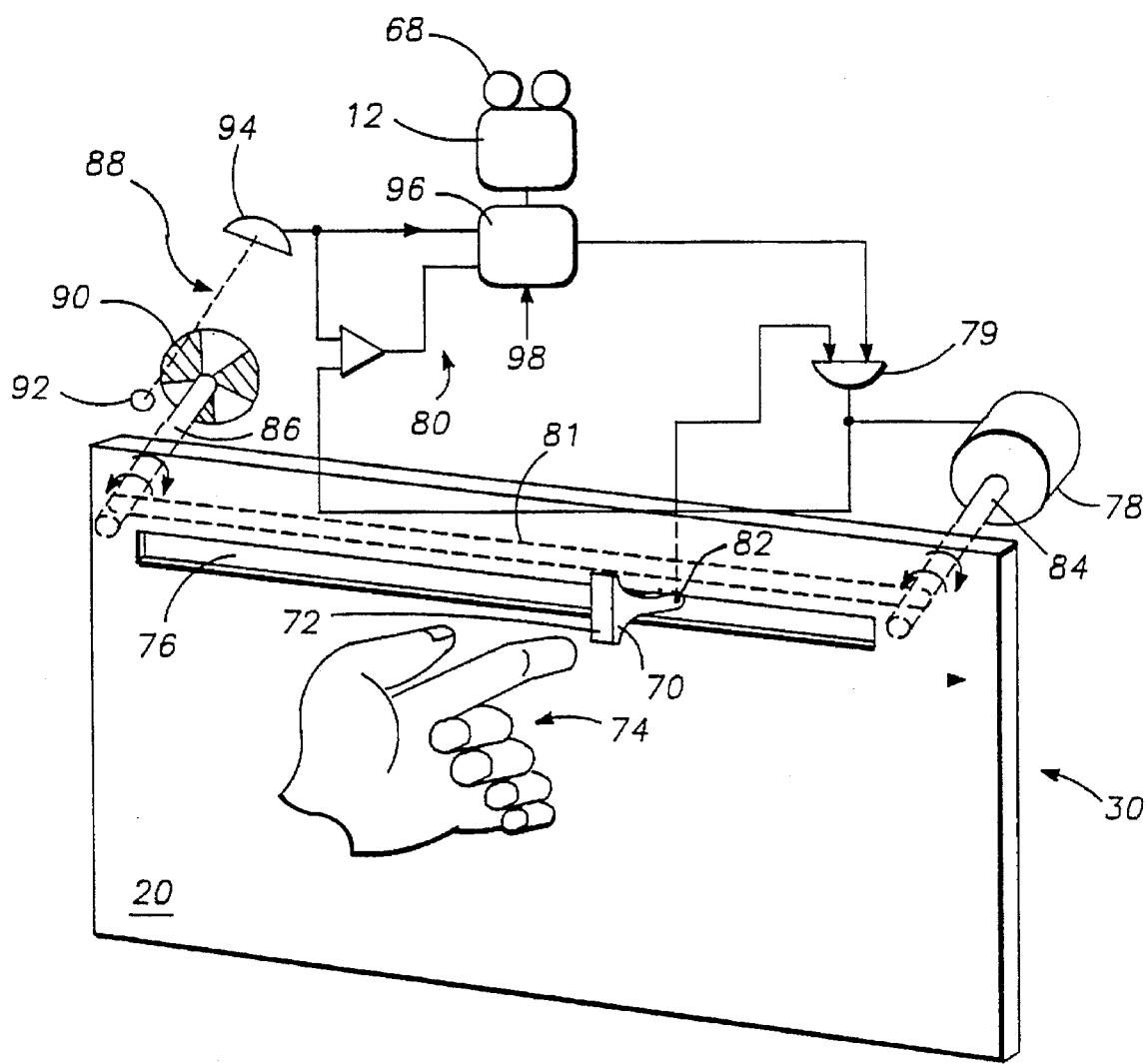
FIG. 8 is a generalized perspective view of a motorized slider control according to the present invention.

By contrast, the simple control 30 of FIG. 8 allows a user to both control and display positional information as to the segment of tape 68 passing over the heads (not shown) of the VTR 12. The control 30 includes a sliding indicator bar 70 equipped with a sensor 72 that signals physical contact with a user's hand 74. In the preferred embodiment, the control panel 20 includes a slot 76 through which the indicator bar 70 protrudes such that it is capable of sliding left and right (or up and down if the slot is rotated) within the slot 76. The position of the indicator bar 70 can be determined by a drive motor 78 or by the user's hand 74. The sensor 72 and a sense logic means 79 operate such that if the motor 78 is causing the bar 70 to slide when the user's hand 74 touches the bar 70, the motor 70 is disabled, allowing the user to slide the bar 70 left or right as desired. A servo loop, shown generally as 80, provides feedback between the motor 78 and the optical encoder 88 such that unintended vibrations of the control panel 20 do not cause the indicator bar 70 to command movement of the tape 68. Such unintended vibratory motions typically would be characterized by the absence of the user's hand 74 from the bar 70, and often exhibit a rapid left-right-left-right type motion.

In FIG. 8, a pulley cable 81 passes through a rear portion 82 of the bar 70 and loops about the shaft 84 of the drive motor 78, and about the shaft 86 of a rotation encoder such as optical encoder 88. Encoder 88 includes a vaned disk 90 that rotates with rotation of shaft 86. A light emitting diode (LED) 92 and a light detector 92 are located on opposite sides of the disk 90. As the disk shaft 86 rotates, intermittent pulses of light are received by detector 94 corresponding to the direction and rate of rotation of the disk 90. Such encoders 88 are commercially available, with a HP HEDS 5500 unit being used in the preferred embodiment.

Rotation of disk 90 results either when the user slides the bar 70 left or right within the slot 76, or when the bar 70 is moved left or right by the drive motor 78. Movement caused by the drive motor 78 results when positional signals from the VTR 12 pass through circuit means 96 commanding the drive motor 78 to rotate clockwise or counterclockwise to reposition the indicator bar 70 according to whether the tape 68 is being transported forward or in reverse. The output of the encoder 88 is also connected to circuit means 96 which digitally determines the relative movement of the indicator bar 70, regardless of whether such movement was directed by the control motor 78 in response to movement of the tape 68, or in response to a sliding motion from the user's hand 74. As noted, a sense logic means 79 gives priority to repositioning from the user's hand 74 over repositioning from the drive motor 78, preventing a tug-of-war situation wherein the user is fighting the drive motor 78.

In practice, a user can command circuit means 96 to scale the encoder output to provide absolute or relative positional information as to the tape 68 in the VTR 12. Thus, the user can direct that when the indicator 70 is at the left-most position within the slot 76, the source tape 68 is either at the absolute start of the entire reel of tape, or is at the relative start of a segment of any length therein, such as a 10 second segment. Depending upon the user's selection, the rightmost position of the indicator bar 70 can be made to corresponding to the absolute end of the source tape 68 or to the end of a segment of any desired length therein, such as the 10 second segment desired.

As the reel of tape 68 winds forward or backward, the location of the indicator bar 70 will move likewise. For example, when the bar 70 is say 25% distant from its left-most position within the slot 76, the tape 68 is either 25% of the way from its absolute start in the reel, or 25% of the way through a given segment (depending upon the user's election shown by input 98 to the circuit means 96). As the tape 68 continues to move over the heads within the VTR 12, the indicator bar 70 moves left or right depending upon whether the tape 68 is travelling in a forward or reverse direction. While FIG. 8 presents a slot 76 permitting a straight-line motion of the bar 72, it will be appreciated that the path traversed by the bar 72 could, if desired, be other than a straight-line, semi-circular, for example. Further, while the motor shaft 84 and the encoder shaft 86 are shown in relative close proximity to panel 20, it is understood that they may be located away from the panel 20 if means are provided to transmit rotational movement to or from the motor 78 and encoder 88 to the pulley belt 81.

Figure 9:
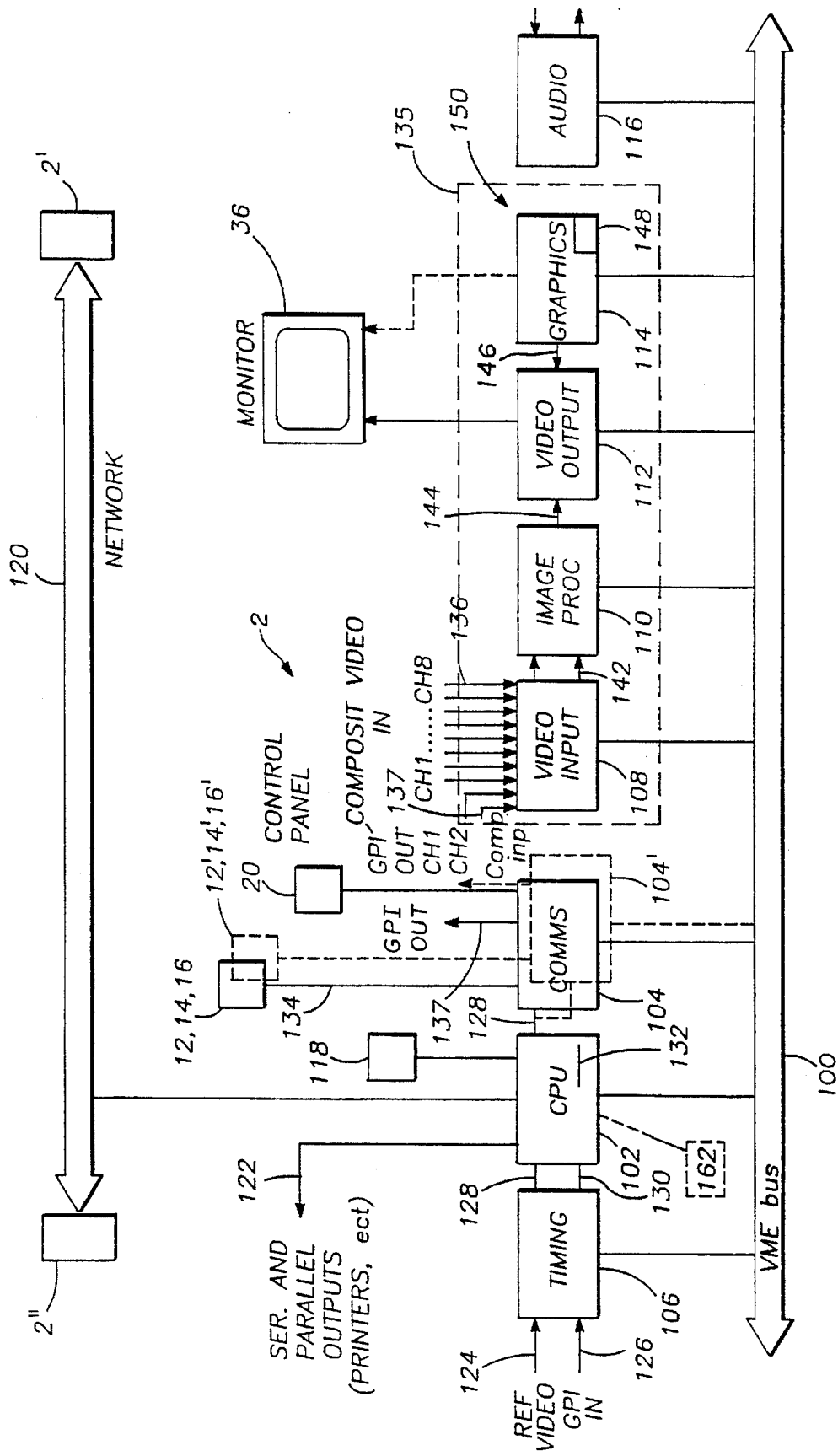
FIG. 9 is a block diagram of an on-line editing system according to the present invention.

Turning now to FIG. 9, the block elements comprising the present invention will be described. The present system includes a control panel 20 (previously described with respect to FIG. 1), a preferably high resolution monitor 36, and a main chassis containing the elements comprising the editor 2. The editor 2 preferably includes a VME bus system 100 permitting communication between a CPU board 102, a plurality of communications boards 104, 104', a timing board 106, a video input board 108, an imaging processing board 110, a video output board 112, a graphics board 114, and an audio board 116.

The CPU board 102 communicates with a memory storage system (disk storage 118 for example), with a network 120, and also provides serial and parallel interface capability 122 for printers and the like. The network 120 permits additional on-line editors 2', 2", etc. to communicate with the present invention. The editor 2 includes a number of communications boards 104, four for example, each board including the communications processor 56 referred to in FIG. 3B and providing 12 channels 134 capable of simultaneous serial control of 12 devices, in addition to providing 12 GPI outputs 137. The various devices being controlled (e.g., VTRs 12, 12', video switchers 14, 14', effects boxes 16 and the like) connect to the editor 2 via the communications boards 104, where each communications channel 134 includes its own memory and Z80 processor chip. The individual communications processor board 104 have the capability to provide either SMPTE (Society of Motion Picture and Television Engineers) communications or RS-232 communications, depending upon the requirements of the peripheral devices communicating with the board 104.

Figure 10:
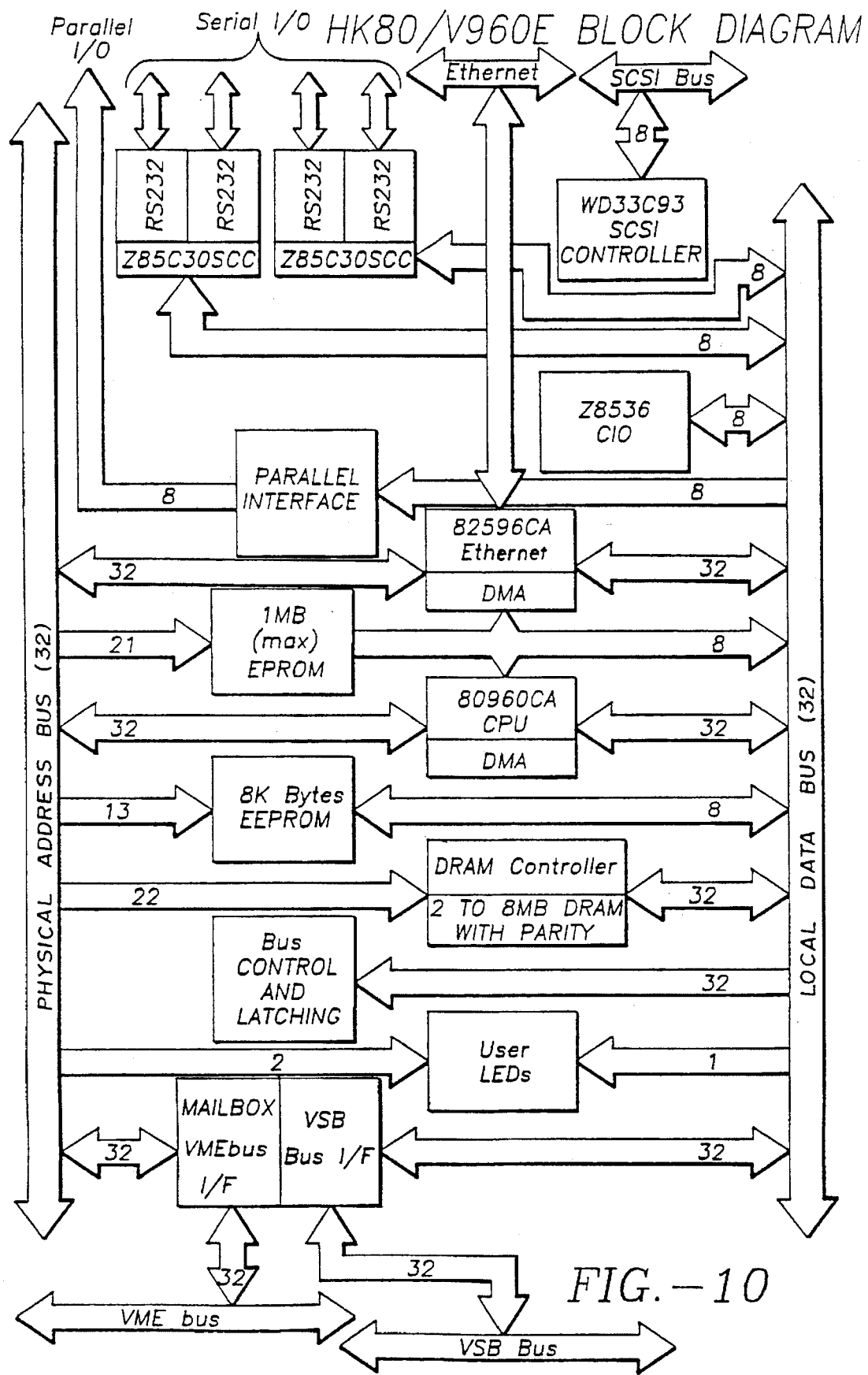
FIG. 10 is a block diagram of a protype CPU board 102.

In a protype embodiment, the CPU board 102 was an off-the-shelf VME processor card, namely a Heurikon HK0/V960E with an Intel 960CA RISC based processor, although other CPU board designs capable of providing similar functions could also be used. A copy of the block diagram from the Heurikon specification sheet for this CPU board appears as FIG. 10A, with further functional details available from Heurikon Corp., whose address is 3201 Lanham Drive, Madison, Wis. 53713. In the presently preferred embodiment, CPU board 102 provides the central controlling processor for the on-line editing system.

The timing board 106 receives reference video 124 from a source generator (not shown), and GPI 126 inputs from devices that must provide their timing information through a GPI port, and generates therefrom a bus interrupt for every reference field, thus establishing a processing reference timebase 128. The timing board 106 also provides the CPU 102 with information 130 as to what reference video color field is current.

The communications processor boards 104 receive the field timebase 128 and use this signal to synchronize communications processor channel activity to the video fields. The CPU board 102 also communicates with various storage media (hard, floppy and optical disks, tape drives, etc. shown generally as 118), with the network 120 used to talk to other editors 2', 2", etc. and other network compatible devices. The CPU board 102 preferably includes an ethernet chip permitting network 120 to function, and permitting editor 2 to operate with two or more windows, one of which windows may be used to operate a device or software compatible with the MIT X11 protocol. The ethernet ability is also available for any peripheral device requiring ethernet communications. The CPU board 102 also provides various parallel and serial printer and terminal interfaces 122.

As will be described further, software (shown generally as element 132) running on the CPU board 102 provides a user interface, storage and network interfaces, as well as high level edit functionality and EDL database management. Portions of this software are applicants' own invention, namely the universal interface software (including device hierarchy), the editor control mapping software, and the EDL. These three software components are described more fully in this application and a full source code listing for each is attached hereto as Appendices 1, 2 and 3 (Appendices are not to be printed and simply placed in the file wrapper for reference).

The present invention also uses commercially available software components including VxWorks version 4.0.2 real time operating system, available from Wind River Systems, Inc. whose address is 1351 Ocean Avenue, Emeryville, Calif. 94068. VxWorks provides the real time kernel for the present system, and provides a basic operating system, networking support, intertask communications, and includes a library of generic subroutines. The present system also uses a software package entitled X11-R4, available from M.I.T., Cambridge, Mass. which provides the basic window system employed, and a software package entitled OSF/MOTIF, available from Open Software Foundation, located at 11 Cambridge Center, Cambridge, Mass. 02142, is layered atop the X11-R4 to provide additional windowing functions. Additionally, applicants have written a variety of generic software subroutines to support scanning of input text files to extract their content, formatting of output text streams, support of generic data structures such as trees and lists, and debugging support.

Although applicants' support subroutines are generic by nature, out of an abundance of caution applicants have included full source code listings of these routines as part of Appendix 1, attached hereto and incorporated herein by reference. The bulk of these library subroutines are "tabbed" as LIB in Appendix 1 and provide, among other functions, generic list support, file input/output, file scanning, etc. Table 2 herein is essentially a Table of Contents for Appendix 1.

Appendix 1 also includes a full source code listing of the following additional software developed by applicants germane to the present invention. These programs are tabbed within Appendix 1 as follows:

KBD: functions which handle the keyboard configuration, mapping, scanning, etc.;

INCLUDE: these include files, and data structures used by all files;

WIN: these are routines which interface with the commercially available X11 Windows software referred to above;

ACTION: these are routines for dealing with the E_ACTION nodes described in connection with FIGS. 11A–11C and FIG. 13;

COM: these routines handle communications between the Intel 960 CPU or equivalent chip in applicants' CPU processor board 102 and the Z80 CPU or equivalent chips present in applicants' communications processor boards 104;

START UP: these routines start the application, e.g., initiate tasks, etc.;

TIMECODE: these are timecode conversion utilities;

USER: these are user command handling routines;

VIDEO: these are routines to initialize and control the video sub-system 135;

Z80 COMMS: this is the Z80 communications code;

Z80 KBD: this is code which resides in the keyboard 22 Z80 processor and the code for the Z80 processor which talks to the keyboard;

EDL_MODEL: this is code to support applicants' EDL;

DEV_MODEL: this is code to support applicants' device model.

As shown by Table 2, Appendix 1 also includes additional software developed by applicants, namely the software containing the configuration files, device specification files, keyboard configurations, etc. The text files contained in this Appendix 2 will be described more fully later in this application.

The communications processor board 104 shown in FIG. 9 will now be described. In the preferred embodiment, four communications processor boards 104, 104' may be present in the preferred system, with each board providing 12 channels 134, 134' capable of simultaneous serial control of peripheral devices, and each board also providing 12 GPI outputs 137 for devices requiring such control. Z80 processor chips are employed, although other processor devices capable of performing similarly may be used instead. The communications processor boards 104 also include GPI circuitry for controlling external devices that require a contact closure rather than a serial interface. As will be described further herein, software 132 for each communications processor channel is downloaded from the disk 128 via the CPU board 102.

Some additional background is necessary before describing applicants' interconnections from the communications processor board 104 to the various external devices 12, 14, etc. under control. External devices (VTRs, switchers, etc.) normally are controlled either from their own panel controls (push buttons, for example) or by an editor via their remote control port. However the device control functions available at the control port are usually a subset of the functions available at the device front panel controls. In addition, the device commands available at the remote control port have throughput limitations and are treated by the device as having lesser priority than the commands issued from the device panel. For example, if an device received a command from its panel control and also received a command remotely through its control port, the panel issued command would govern.

Applicants' electrical interconnections from the communications processor boards 104 to the remote devices circumvents the above-described command limitations. Applicants' communications processor channels are preferably electrically connected to allow for either point-to-point control of the external devices, or to allow control in a loop-through mode permitting transparent control by breaking into an external machine's keyboard control cable. Several advantages are realized by such communications processor channel connection flexibility. The above-described preferred method of connection is realized by cutting the connections from the device's own panel controls and routing the connections through editor 2 in a manner transparent to the device. In such a loop-through connection, the device responds to commands regardless of whether they are issued from the device's own panel controls, or are issued by editor 2. In fact, the device literally does not know and does not care where the command comes from. As a result, editor 2 can remotely control the device without any of the limitations that normally characterize remote control operations.

Applicants' communications processor boards 104 include an input connection through which the remote device's keyboard or control panel is wired, and an output connection from editor 2 back to the remote device's keyboard or control panel. As a result of these provisions, editor 2 can control the remote device just as if the keyboard 22 or other controls on panel 20 were physically the original controls mounted on the remote device. Applicants are not aware of this capability existing on prior art on-line editors.

Figure 15:
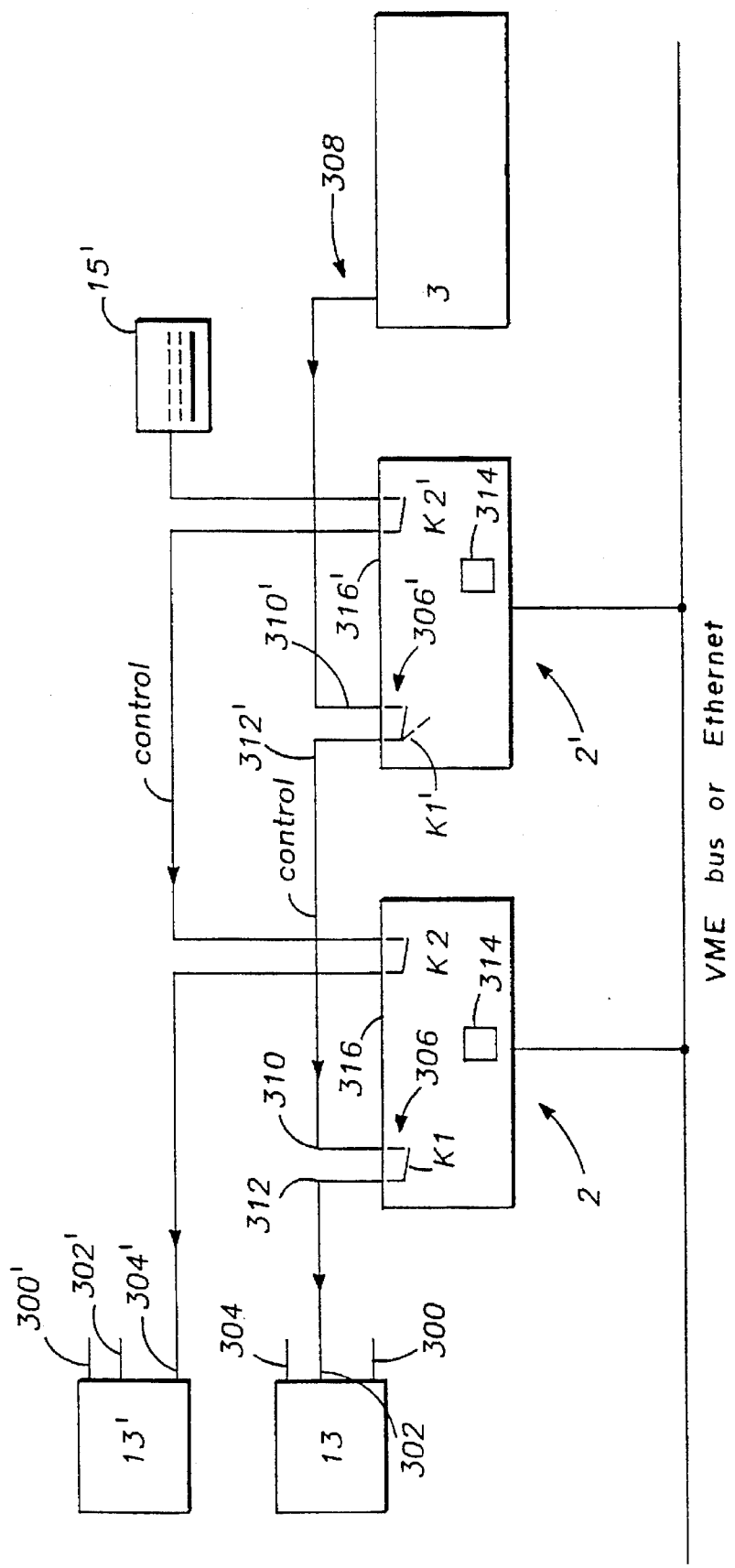
FIG. 15 depicts multiple editors according to the present invention coupled to control any device in an editing suite.

The present invention allows all devices in an editing suite to be connected at all times to all editors 2, according to the present invention. This capability allows the suite to remain permanently hardwired, while providing full control flexibility as to the resources available. Further, this capability is attained using the standard control ports available on the existing devices. While conventional RS-422 routers can also provide interconnect flexibility, such routers can cost over $30,000 each. FIG. 15 depicts the above-described interconnect capability, wherein two editors 2, 2' (each according to the present invention) are connected to two different devices 13, 13'. FIG. 15 also depicts a prior art editor 3 that may also be coupled in loop-through mode to control a device 13. Either device 13, 13' could of course be a recorder, switcher, an effects box, or the like, and while two devices 13, 13' are shown, as many as 48 devices may be connected to editors 2, 2'.

Each device, e.g., 13, 13', typically provides one or more SMPTE input control ports 300, 302, 300', 302', and at least one keyboard input control port 304, 304'. Device 13, for example, is shown coupled to a control output port 306 on editor 2, to a control output port 306' on editor 2', and to a control output port 308 on a prior art editor 3. Relay contacts, indicated by K1, are shown shorting together the input 310 and output 312 pins on editor 2's port 306, and similarly relay contacts K1' are connected across port 306' on editor 2'. With contacts K1, K1' closed (as depicted), a straight loop-through connection is made allowing, for example, device 13 to be controlled by editor 2, or by editor 2' or by editor 3.

Optionally editors 2, 2' include resource management software 314, 314' that prevents editor 2, for example, from opening contacts K1 when editor 2' is controlling device 13. Essentially when a relay contact $K_i$ is closed, the editor wherein contact $K_i$ is located releases control over the resource, or device, coupled to the relevant control port. Thus, when editor 2' controls device 13, contacts K1' in editor 2 are open (shown in phantom in FIG. 15), but contacts K1 in editor 2 are closed. As shown by FIG. 15, the keyboard 15' for a device 13' may also be looped through output control ports 316, 316' (across which relay contacts K2, K2' respectively are coupled) on editors 2, 2'.

Because the present invention can efficiently manage all resources within the edit suite, simultaneous edits are made possible. For example, a prior art editor typically uses a switcher device both to accomplish special effects and to accomplish simple cuts. While other devices might also accomplish these tasks, prior art editors typically are too inflexible to use other devices. By contrast, because applicants' system recognizes that, for example, a router can be used to select a source material, editor 2 can simultaneously perform one effect with a router while using a switcher for another effect. In essence, the present invention makes more flexible use of the resources at hand, permitting more than one resource to be used simultaneously as opposed to being inflexibly committed to using several resources to accomplish a task in a conventional fashion.

In short, the ability to permanently hardwire a plurality of devices to one or more editors 2, according to the present invention, is advantageous. Further, because the present invention includes a hierarchically structured information model that allows editor 2 to access and control the full capabilities of each device, maximum device usage is readily attained without wasting time to reconnect the devices within the editing suite.

The CPU board 102 controls the video subsystem 135 which includes the video input board 108, the image processing (or "crunching") board 110, the video output board 112, and the graphics board 114.

The video subsystem 135 enables the present invention to provide user text display, video storage, recall and display. Preferably the video input board 108 receives the video input channels in either composite 136 or component 137 format. The video board 108 then decodes and digitizes this input information 136, 137 to provide two digital video streams 140, 142 to the image processor board 110. In the preferred embodiment, the video input board 108 can select from eight composite inputs 136, or two component inputs 137.

The digitized video 140, 142 is fed from the video input board 108 to the image processor board 110 where it is re-sized to a number of possible output size formats. Preferably the image board 110 can store images in Y;, R-Y;, B-Y component analog format using on-board RAM, which RAM can be uploaded or downloaded to the disk 118 via the CPU board 102. The re-sized video 144 from the image board 110 goes via the video output board 112 to be displayed on the user monitor 36. The display on monitor 36 will assist the user in selection of video timecodes, source selections, etc. In the preferred embodiment the video output board 112 permits placement of the re-sized pictures anywhere on the monitor 36, under control of the CPU board 102.

Preferably the video output board 112 includes RAM for storage of pictures in the RGB format, and is capable of uploading and downloading these pictures via the CPU board 102 to the disk 118. A second input 146 to the video output board 112 receives display data from the graphics board 114. The video output board 112 combines the two video inputs 144, 146 to produce the full user display seen, for example, on the user monitor 36. This allows an integrated user display with both text and live or still video pictures driven by a RAM digital to analog converter (RAMDAC), such as a Brooktree BT463 RAMDAC, located on the video output board 112.

The graphics board 114 produces the text display data in an on-card frame store under control of a local processor, such as an Intel 80960, closely coupled to an on-card framestore. The graphics processor card 114 and framestore 148 together comprise a complete display processor 150 that receives display commands from the CPU board 102 via the VME bus 100. Preferably the graphics board 114 includes a RAMDAC (such as the Brooktree BT458) which permits the board to be used as a text only display. This capability allows the present system to be configured without a video subsystem live channel capability by removing the video input board 108, the image processor board 110, and the video output board 112.

Applicants' EDL permits the use of a preferably fast storage medium, such as a video RAM disk, to be used as a temporary "scratch" or "cache" device. Because cache storage is typically much faster than, for example, a tape recorder, faster image access is available. For example, a user of the present invention can specify "cache A" (using, for example, keyboard 22, with the result that a desired segment of video from a source A will be recorded to a cache. (Typically each cache can hold 50 to 100 seconds of video).

Applicants' EDL permits any subsequent reference to "A" to invoke, automatically and transparently to the user, the images now stored on the cache. Applicants' EDL does not burden the user with keeping track of where within a cache an image may be stored, this information being tracked automatically by the EDL. In essence, applicants' tree-like EDL structure permits the edit segments to be virtual, with editor 2 managing the media for the user, allowing the user to concentrate on less mechanical chores.

If a user wanted to create an effect using three segments A, B, C, applicants' invention permits the desired segments of video to be copied to one or more caches. Thus, if A, B, C are on the same reel of video tape, a single video tape recorder could be used to copy each segment into cache. Thereafter, any user EDL references to the relevant segments of A, B, C automatically invoke the cache(s) that store the images. The user need not be concerned with where within a cache or caches the images are recorded. Further, because applicants' system 2 knows what devices are present in the suite and can access these devices by software command, typically no suite rewiring is needed. The end result is that the user quickly and relatively effortlessly and with little likelihood for human error can create a desired effect using cache devices.

By contrast, a prior art EDL would not recognize that references to the relevant segments of A, B, C should automatically and transparently invoke a cache (assuming that a cache were used). Instead, the user (rather than the prior art editing system) must manage the media. The user must laboriously and painstakingly create an EDL stating what segments of A, B, C were recorded in what segments of cache, a chore requiring many keystrokes at a keyboard. Further, a prior art system would typically require rewiring, or at least the presence of several, typically expensive, router devices.

The resource management capability inherent in the present invention permit a user to specify a device as a layer backup recording medium, e.g., a device 12 in FIGS. 1 or 3A. Every time an edit is made, editor 2 will cause the edit to be recorded upon the layer backup recording medium, in addition to the system primary recording medium (e.g., another device 12). Thus, each edit onto the layer backup device is recorded to a new location on the backup medium. This advantageously provides a user with a ready source of intermediate layers should, for example, further work on an intermediate layer be required. Applicants' EDL automatically knows where to find these intermediate layer images (e.g., on the layer backup recording device, and where thereon). By contrast, with a prior art editor, a user wishing to create a record of intermediate layers must record them on a device and then keep a log (typically on a piece of paper) of what was recorded where. Unfortunately, all too often in the prior art, the paper log becomes lost, or takes too long to create with the result that intermediate images tend either not to be recorded, or are recorded but not thereafter readily retrievable because the user cannot recall their whereabouts.

In the preferred embodiment an audio board 116 provides the ability to record stereo audio in an on-board RAM for later playback upon control of the CPU card 102. The audio card board 116 preferably includes circuitry memorizing the intervention required from the CPU board 102 when in record or play mode. If the required audio storage exceeds the on-board RAM capacity, audio may be recorded to disk 118 via the CPU board 102, while allowing the on-board RAM to operate as a flow-through buffer.

In addition to receiving an EDL as input and performing various editing functions, applicants' system of FIG. 9 has other capabilities as well. During an edit session, the present invention allows a user to save, for later recall, a "picture" of a given set-up, for example a wipe or key, a switch transition, and the like. During the edit, the user can record data representing the contents of the internal memory within the controlled device, and can also record the video output from the controlled device. For example, if the controlled device is a VTR 14, its video output can be connected as input 136, 137 to the video input board 108 to allow creation of a framestored image within the video sub-system 135. Applicants' system in essence attaches the set-up data to the framestored image to provide the user with a palette of images for possible later use. Upon being input to applicants' system, these parameters are scanned and the data provided as VALUES 209 parameters (to be described) which describe the current parameters of the controlled device. A user may easily modify these data, whereupon applicants' software modify the parameters in question and issue the proper command message to the device.

By contrast, in the prior art, the set-up data within a controlled device was in a format that was both totally unintelligible to the user, and not allowing user parameter changes to be easily accomplished. The user of a prior art system could, however, blindly feed the data back into the editor to reproduce whatever the effect the data represented. In addition, a user of a prior art system would label the diskette or other storage record of the set-up data with a name (i.e., set-up #4, wipe-effect #17), and hopefully remember at some later date what visual image was represented by, say, set-up #4. In the present system, however, the set-up data is made available to the user in an understandable format allowing parameter changes to be easily made. Further, the set-up data is associated not merely with a name, but with a visual representation of the actual video effect. A user can actually see, for example on monitor 36, what the visual effect created by a given set-up produced. There is no need to remember what "set-up #17" was.

Further, applicants' system is capable of receiving as a first input a conventional EDL from an off-line editor, and receiving as a second input picture information from an off-line editor's picture storage medium, and producing therefrom a visual image corresponding to the type EDL. In some off-line editors, picture information (and audio information) is available, which information is often dumped to a diskette and stored for later re-use on the same editor. This information is not available as input to a conventional on-line editor, or even as input to another off-line editor not substantially the same as the producing off-line editor. However in the present invention, the EDL with its timecode information, and picture and audio information available as outputs from some off-line editors may be transported, on a diskette for example, to be used as input to an on-line editor according to the present system. As a result, the present system is able to receive as input all timecode, picture and audio information available from the off-line edit session.

Figure 11A:
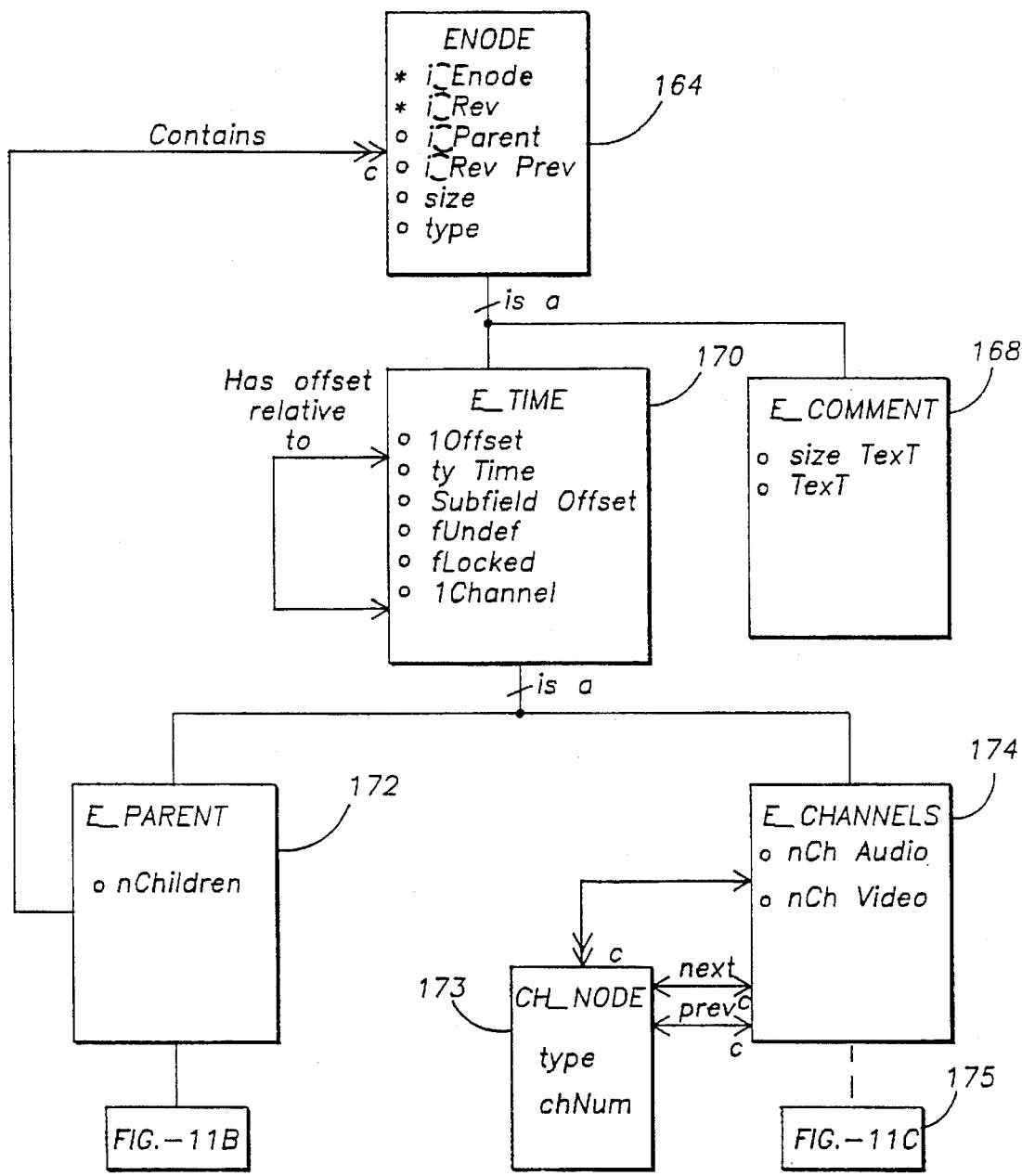
Figure 11B:
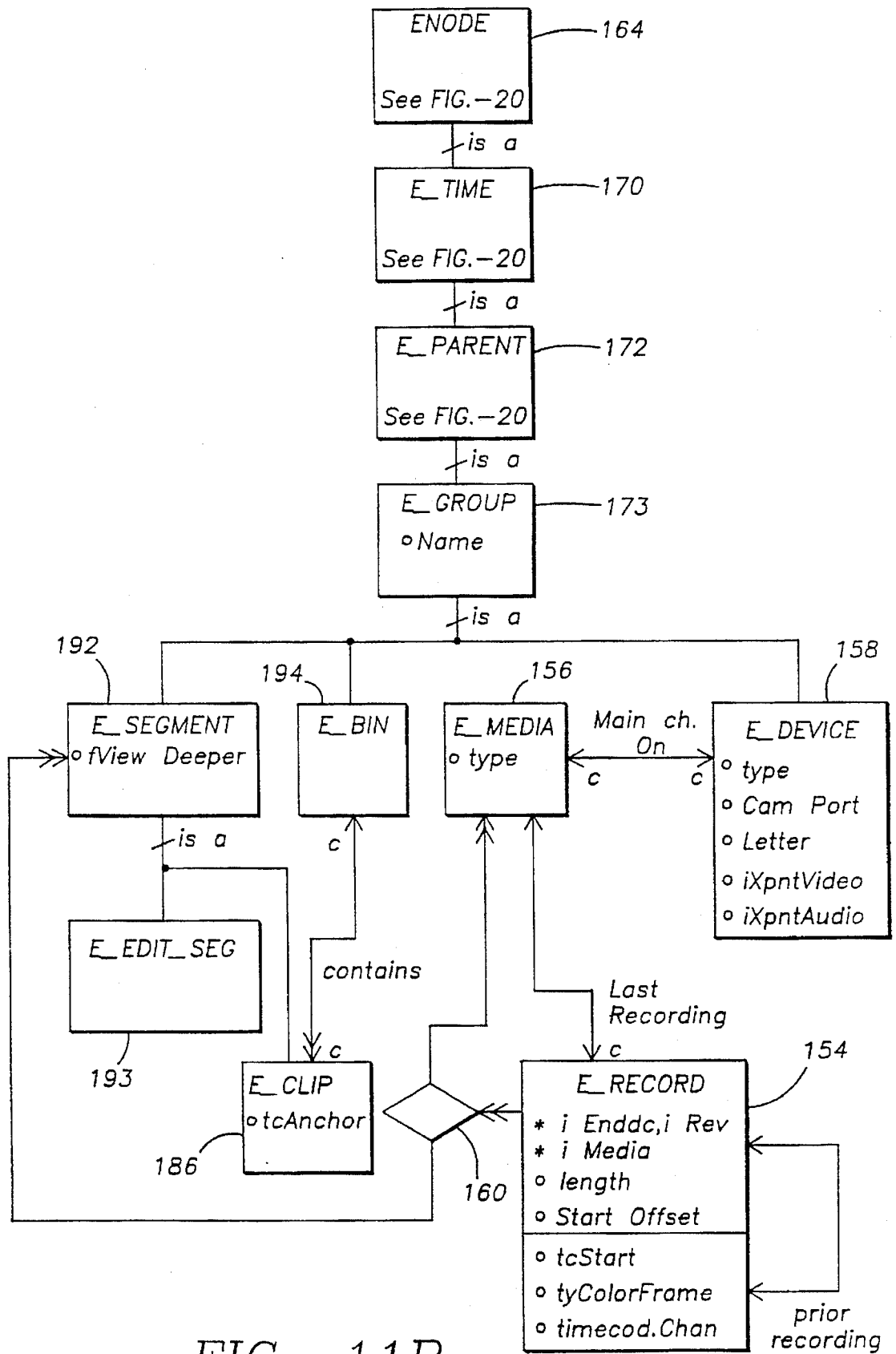

As mentioned, an on-line editor 2 according to the present invention is capable of creating a virtual EDL of unlimited length, which is able to maintain a complete history of the edit session permitting, for example, a user to "un-layer" edits that include multiple layers. Turning now to FIGS. 11A-11C, an information model, wherein the various boxes indicate data objects (referred to herein also as nodes or nodal lists), the arrows indicate relationships between data objects (with multiple arrow heads meaning one or more in the relationship), "c" means conditionally, i.e., 0 or more. An "*" before an entry in FIG. 11 means the entry is an identifying attribute, i.e., information useful to locate the object. A "o" signifies an attribute, e.g., a data value for the object. FIGS. 11A, 11B, and 11C then represent the hierarchical database-like structure and analysis of such an EDL. The nature of this structure is such that attribute information within a box will pass down and be inherited by the information in descending boxes that are lower in the hierarchy.

As will be described, with every editing change, applicants' EDL software within editor 2 creates a "node" or list of information providing historical data to later permit recognition of what edit was created where, when and how. FIGS. 11A-11C will serve as a guide to understanding applicants' EDL software that permits the CPU board 102 to accomplish this task. Appendix 1 (attached hereto and incorporated by reference herein) is a complete source code listing of this software.

Those skilled in the art will recognize that the listing in Appendix 1 includes some functions in addition to those shown graphically in FIGS. 11A-11C. Such additional functions are primarily used for routine "housekeeping" tasks within the EDL program. In some portions of the listing, slightly different nomenclature may be used for the same functions shown graphically in FIGS. 11A-11C. Any such nomenclature differences merely reflect labelling changes made within the listing but not yet made to FIGS. 11A-11C due to the constraints of time.

The general hierarchical approach used in FIGS. 11A-11C and in the EDL software is that an EDL is a list of nodes, each of which itself can contain a list of nodes. For example, within an EDL there might be acts, and within acts there might be scenes, and within the scenes there might be edits. One node list may includes scenes and edits, while another node list may have edits only (i.e., a group of edits may be combined to produce a scene). In the present invention, the EDL will assign and track a unique nodal identification for each event: e.g., each act, each scene, each edit.

In the prior art, the EDL consisted only of a flat (e.g., one-dimensional) list of edits showing video source in and out times and a timecode. There could be no higher or lower levels because prior art EDLs dealt with only one tape and therefore had no need to store information relating to media source, or where within media information was recorded. There was no concept of assigning node designations, and no revision identifying data was logged. Applicants' EDL software, on the other hand, is capable of an arbitrarily complex hierarchy of edits, including edits of higher and lower levels. By contrast, the highest, lowest, and only level in the prior art is an EDL, because a prior art EDL consisted only of a "flat" list of edits.

The uppermost level in FIG. 11A is E_NODE 164, which box contains, via a tree-like hierarchical structure, all information needed to reconstruct a node in an editing session. Box 164 contains, for example, the identification number of the node in question, identification number of the revision (if any) and also advises which node (if any) is a parent to this node (i.e., whether this node is a subset or member of a higher level list). This box 164 also contains the previous revision number (i.e., revision 2) and byte size and type of the node (where type is a number advising what type of E_NODE we are dealing with). Applicants' EDL software can locate every E_NODE, whether it is in memory or on disk, upon specification of an E_NODE number and revision number.

The E_NODE 164 is the base class from which all other E_NODE objects inherit their attributes. The first level of this inheritance consists of E_COMMENT 168 and E_TIME 170. E_COMMENT 168 descends from and therefore inherits the attributes of the E_NODE 164. Thus E_COMMENT 168 has an E_NODE number, a revision number, a parent, a previous revision, a size and a type. E_COMMENT 168 provides a further attribute, namely any comment text the user might wish to insert, typically as a reminder label for the benefit of the user (e.g., "Coke commercial, take 3").

The E_TIME 170 node inherits the attributes of the E_NODE 164 and adds time information thereto. Time information in applicants' EDL is specified in terms of offset relative to other nodes in the EDL. Thus the arrow from E_TIME 170 to itself indicates the E_NODE to which a particular E_NODE is relative in time. The principal time relationships used are relative to a parent and relative to prior sibling(s). By contrast, in the prior art EDL, all time references were required to be absolute and be referenced to the timecode. This rigid requirement in the prior art created numerous headaches when an edit was deleted from a tape, because the next following edit on the tape was required to be advanced in time to fill the hole. However in applicants' EDL, every E_TIME 170 relative reference is ultimately referenced to an E_CLIP 186, whose timecode anchor can be used to calculate the absolute timecode on demand. Thus there is no need for a user to change time values as in the prior art to "fill" time holes.

Continuing downward from list 170 in FIG. 11A, the E_PARENT 172 list is the node that supports the concept of having sub-nodes. Not all nodes, however, will be a parent because some nodes will always be at the lowest hierarchical level. The connection between node lists 164 and 172 reflects that the E_Parent node 172 inherits all the attributes of the E_Time 170 node and the E_Node 164. As indicated in FIG. 11A as shown in FIG. 11B, an E_GROUP box 173 (and nodes dependent therefrom) depends from E_PARENT 172. The E_GROUP box 173 will be described shortly with reference to FIG. 11B.

As shown in FIG. 11A, an E_CHANNELS node 174 and CH_NODE 173 enable the present invention to track different video and audio channel data by providing information as to what editing event occurred previously and what editing event follows. For each channel of information, Node 174 tracks the channel number, and whether audio or video information is involved. If a user creates an edit by first cutting to reel #7, then dissolving to reel #2, etc., E_CHANNELS node 174 provides the directional information enabling the EDL to know what is occurring and what has occurred. As indicated in FIG. 11A by element 175 (shown in FIG. 11C) there are nodes dependent from node 174, which nodes will be described shortly with reference to FIG. 11C.

Because an unlimited number of audio and video channels can be supported by box 174, applicants' EDL structure permits the present invention to control a plurality of different video segments essentially simultaneously to produce, for example, a "video wall." A video wall is a plurality of video monitors, typically arranged in a matrix, where all monitors can display in a synchronous relationship the same image, or can be combined to display subportions of a larger image that appears when the matrix is viewed as a whole, or can be combined to depict, for example, a single or multiple scrolling image. Other effects are also possible. A video wall is depicted generally in FIG. 1 by the plurality of user monitors 37, 37', 37", etc. Editor 2 controls several audio and/or video channels to devices 12, 14, etc. to display such a video wall. By contrast, in the prior art if N user monitors 37, 37', etc. are used in a video wall, N prior art EDLs must be generated. Thus, while the present invention flexibly and relatively simply can create and control a video wall, a prior art editor cannot.

Turning now to FIG. 11B, nodes 164, 170 and 172 have already been described. The E_GROUP node 173 depends from node 172 and exists only if the E_PARENT node 172 has been named (e.g., "Edit 1"). Depending from node 173 are nodes 192 E_SEGMENT, 194 E_BIN, 156 E_MEDIA and E_DEVICE 158.

The E_SEGMENT node 192 descends from the E_PARENT box 172 and permits the user to expand or contract a view of the EDL. Thus, with reference for example to FIG. 7, the tree-like depiction 69 could be contracted or expanded. If the tree 69 depicted say three scenes and the user now wished to concentrate on but one of the scenes, node 192 permits the user to contract the structure accordingly.

FIG. 11B shows nodes E_EDIT_SEG 193 and E_CLIP 186 depending from node 192. Node 193 denotes the lowest level of video in a product, e.g., an edit segment containing a single effect and specifying a single video source used in that effect. Node 193 is analogous to a prior art edit line, but is more useful because it coordinates with applicants' hierarchial EDL. However information at node 193 is available to a user familiar with prior art EDLs, and as such provides a familiar interface to such users.

Node 186 E_CLIP contains all information needed to reconstruct the output video tape after on an-line editing session, and includes a timecode anchor to which all offsets on E_CLIP 186 are referred. Thus each E_CLIP 186 is assigned and retains its own unique timecode which allows identification of specific fields or frames of video tape. As shown in FIG. 11B, node 194 E_BIN contains zero or more E_CLIP 186, as a mechanism for the user to organize the user's clips.

Node E_BIN 194 also depends from E_PARENT 172 and is provided to the editor user, much the way a directory is available to a computer user, to allow more than one clip at a time to be dealt with in an organized fashion. The contents of E_BIN 194 may be selectively viewed by the user in a window on the display monitor 36 on a clip-by-clip basis. Different views of each clip are available, including preferably the "head" and/or the "tail" frames of a clip (i.e., the first and last frames). When the on-line editor 2 is equipped with the slider mechanism 30 discussed in FIG. 8, the clip frame displayed on the monitor 36 will change as the user slides the indicator bar 70 left or right (i.e., causes the source media to be transported backward or forward). Together, E_BIN 194 and E_CLIP 186 replicate the structure at the top of the hierarchical database tree represented in FIGS. 11A–11C, and allow applicants' EDL database to provide the user with a representation of this tree-like structure, depicted as element 69 in FIG. 7.

Media and device information is available to E_NODE 164 via boxes 156 E_MEDIA and 158 E_DEVICE. Boxes 156 and 158 might reflect that E_CLIP 186 was recorded on a cassette (cassette #2, as opposed to say a reel of tape, or a framestore), which cassette #2 is mounted on a cassette recorder #17. The diamond shaped box 160 indicates that the E_RECORD box 154 (see FIG. 11C for detail) is capable of functioning much like a correlation table. Given the identifying attributes for an E_CLIP 186 object and given the identifying attributes for an E_MEDIA 156, applicants' virtual EDL software can correlate this information for a particular E_RECORD 154. As best shown in FIG. 11C, information in node E_RECORD 154 is used by applicants' EDL to identify and track any recordings made of the E_CLIP 186, or any portion thereof (i.e., a recording might be one frame, many frames, etc.). The type of information retained in box 154 includes the identifying attributes for the E_CLIP and the media that the E_CLIP was recorded on. Because, as FIG. 11B depicts, E_RECORD 154 depends from E_GROUP 173, E_RECORD inherits the former's attributes and may be virtual, containing history revisions as well as timing and channel information which are attributes of a recording.

Other information within box 154 includes clip offset from the timecode anchor, media offset and duration identify the portion of the clip that was recorded. For example, the media might be a one hour tape which has two different half-hour clips recorded thereon. The media offset advises where within the one hour tape each recording took place, while the duration identifies the portion of the clip that was recorded.

With further reference to FIG. 11C, E_SYNC_PT 190 depends from E_CHANNELS 174 and provides timing information relating to the action, including speed and frame offset. Co-equal with box 190 is E_ACTION 180. The E_ACTION box 180 and the E_TRAN box 182, dependent therefrom, provide the E_CHANNELS box 174 with information as to the type of an edit transition action in question, including when it began, its duration, and when the edit ceases. The E_TRAN_TO box 184 provides the EDL database with information identifying the transition image and where the image went. If the transition edit calls for a key, the E_TRAN_TO box 184 will so note in the E_KEY box 188, placing a record in the E_CLIP box 186 enabling a user to later know what image was used to create the hole for the key and what clip (E_CLIP 186) represents the edit after the transition.

The E_RAW_MSG 178 box provides the facility to send an arbitrary byte sequence to a device, and as such is primarily a debugging feature of applicants' software. Co-equal E_TRIGGER 179 inherits the attributes of E_CHANNELS 174. When a trigger occurs on a specific channel (e.g., a GPI trigger on a specific audio or video channel), E_TRIGGER 170 lets the user specify what effect the trigger should accomplish during the edit. For example, if the trigger is needed for a video effect, box 170 permits the trigger information to be kept with the video information in the event the video and audio information are split during an edit session. Where the trigger is, for example, to an effects device, E_TRIGGER 170 also provides parameter information detailing the type of effect, the rotation, the perspective, the rate of image size change, and so forth.

The E_LAYER 176 box descends from and thus inherits the attributes of the E_CHANNEL node 174. The E_LAYER node 176 will either cover or uncover another layer of video, with full nodal information as to every layer being retained. As a result, applicants' EDL software is able to track and retain a record of this information, allowing a user to later "un-layer" or "re-layer" an image, using the historical node information retained in the CPU board 102. The ability to store this E_LAYER 176 information allows a user to later go back and strip off layers to recreate intermediate or original visual effects. By contrast, in the prior art, if three edits were recorded on the same section of media, the EDL had no knowledge as to which source was recorded first, second and third. This lack of information made it impossible for a user to learn from the EDL what image was last recorded, and thus still present on the media. As a result, the prior art had no capability to later recreate intermediate edit levels, or unlayer or re-layer edits. However applicants' EDL permits different media to be recorded with different offsets (i.e., record on tape #1 at 1 hour offset, and record on tape #2 at 3 minutes offset), and also maintains a full historical record of what occurred at every point or node in the edit session.

As an example of layers, assume a user has an EDL requesting creation of a video image that will show a car standing in front of a background. The image of the car against the portion of the background immediately behind defines a "key". The layer image of the car in front of the background is created by keying the image of the car as an upper layer with the image of the background being a lower layer. (Were it otherwise, the background would appear in front of the car). This example is but a single layer edit, an edit type which even prior art EDLs were capable of handling. However because they were flat and not hierarchical, prior art EDLs were totally unable to deal with two or more layers, i.e., another layer overlying the car perhaps containing a telephone number to call for sales information. All a prior art EDL would show after a two layer edit session would be times in, times out as shown in FIG. 6.

FIGS. 12A, 12B and 12C will now be described so that the reader might fully appreciate the steps involved in a multi-level edit session involving layers. FIG. 12A is a time bar representation wherein video sources from three sources VTR A, VTR B, VTR C are shown. Let VTR A contain the background video, perhaps mountain scenery, the material from VTR A to run from time $t_0$ to time $t_5$. This background represents one layer of image. At time $t_1$, material from source VTR B (perhaps an image of a car) will be keyed (e.g. superimposed over), such that the car appears in front of the background. The car image, which represents an additional layer, will be recorded on the final output tape (not represented) from time $t_1$ to time $t_3$, e.g., the key extending until time $t_3$. Finally, from time $t_2$ to time $t_4$ an image of a telephone number contained on source VTR C is to appear superimposed (or keyed) over the car (from time $t_2$ to time $t_3$) and then superimposed over the background from time $t_3$ to $t_4$. The telephone number image represents yet another layer of video. Note that at time $t_3$ the key of VTR B ends, but the layer above (e.g., the key to VTR C) continues until time $t_4$.

The present invention advantageously permits a determination from context as to what was the source of prior material involved in, say, a transition involving a key, dissolve, or wipe. Applicants' editor 2 is capable of examining the recorded entry time for the current edit, and learning from the hierarchical EDL what material was active at that time point. Further, this may be done even if multiple layers were active at that time point. In contrast to this flexibility, a prior art editor at best can provide a "tagging" function for a simple source, but not for multiple sources.

References in FIG. 12B and FIG. 12C track the nomenclature used in FIG. 11, with the various boxes indicating E_NODES such as element 164 in FIG. 11. The arrows in FIGS. 12B and 12C denote the "next" link of E_CHANNELS 174, e.g., the arrows showing the sequence of nodes for a given channel. However box 174 in FIGS. 12B and 12C is denoted as an EXIT box rather than an E_CHANNELS box because in the present example box 174 represents a dead end, with no further links to other boxes. Boxes labelled $L_C$ and $L_E$ are E_LAYER 176 nodes, and include an extra linking arrow. A KEY box 188 denotes a key effect, an EXIT 174 box denotes the exit of a layer, a CUT 184 box denotes a cut to a source, an $L_C$ box 176 denotes a cover layer, while a $L_E$ box 176 denotes expose layer. For $L_C$ the arrow denotes the starting node of a layer that will cover the current layer, while for $L_E$ the arrow denotes the end node of the layer which, upon its end, will expose the current layer. While the actual model implemented by applicants' software includes "previous" node links for backward traversal, these links are not shown in FIGS. 12B and 12C in the interest of presenting readable figures.

Some background may be helpful at this point regarding the E_LAYERS 176. These nodes 176 must be linked to the layer that is either being covered or being exposed, and will always have an extra link which connects a lower E_LAYERS 176 to the layer that either covers or exposes it. This extra link will be referred to as a layer link herein.

At any point within an E_CLIP 152, there may be one or more active layers. Each E_LAYER 176 "cover" node denotes the beginning of a new upper layer, and each E_LAYER 176 "expose" node denotes the end of an upper layer. Thus, the traditional concept of "current node in a linked list" must be extended to current node per layer because applicants' "current node" is actually a list of nodes, one per layer.

As will be described regarding FIG. 12C, when changing a node's relative timing offset, applicants' software code (including in Appendix 1) must adjust the E_CHANNEL 174 and the E_LAYER 176 links. Nodes of the type E_LAYER 176 must always have their timing offset equal to zero, and be relative to the node on the upper layer to which their layer link points. Because applicants' software creates a virtual EDL structure, applicants' links use E_NODE 164 and revision number information to determine where a particular E_NODE 164 may be located (e.g., in the CPU RAM, in a hard disk, in a diskette, etc.). By contrast, a more conventional non-virtual link list would use actual pointers as the links.

The E_NODE 164 for the scene depicted in FIGS. 12A–12C has a parent node (not shown), and a first child that is the CUT 184 to VTR A which occurs at time $t_0$. An EXIT node 174 at time $t_5$ denotes the termination of this initial layer (layer 0).

A new layer 1 is then created by inserting a layer cover node $L_C$ 176 between the CUT 184 and the EXIT 174, the insertion occurring at time $t_1$. In typical node fashion, the cover node $L_C$ 176 has two outgoing links: a first link 175 to the next event on the same layer (shown as $L_E$ 176), and a second link 177 to the $KEY_B$ 188 which begins the next layer. The $EXIT_E$ 174' of the key layer (layer 1) points to a layer expose $L_E$ 176 which is inserted between $L_C$ 176 and EXIT 174.

In the example of FIG. 12B, $t_4 > t_3$, as shown in FIG. 12A. Now let us relocate the end of key C such that $t_4 < t_3$. FIG. 12C shows the resultant adjustment to the channel and level links made by applicants' software (please see Appendix 1). With reference to FIG. 12C, note that the node $L_E$ 176' has moved from a position between nodes $L_E$ 176 and EXIT 174, to a position between nodes $L_C$ 176" and EXIT 174'. This repositioning is accomplished by readjusting channel and layer links whenever a node's time is changed. In this example, EXIT node 174" will be the first node checked as it is the node whose timing is changed in our example.

With reference to the "next" and "previous" entries in E_CHANNELS 174 in FIG. 11, for "previous" we compare node KEY 188" with node EXIT 174", and see that no change occurs because node 188" occurs before node 174". "Next" we compare EXIT 174" node with $L_E$ 176' node, and see that no change occurs as node 176' occurs at a time offset of zero relative to node 174". Node $L_E$ 176' is now checked because, being relative to node 174", its timing has changed. As "previous", we now compare the $L_E$ 176 node with the $L_E$ 176' node, and since node $L_E$ 176 now occurs later than node 176', we must adjust the links. The adjustment is made by first extracting node $L_E$ 176', thereby leaving node $L_E$ 176 linked to node EXIT 174. Next we find where to insert the node $L_E$ 176'. The insertion is determined by comparing nodes $L_E$ 176 and $L_E$ 176': node 176 occurs before node 176'. Since nodes 176 and 176' are each of type E_LAYER 176, we must follow the layer link instead of the channel link. We compare node 176' with node 174': node 176' occurs first. Comparing node 176' with node $L_C$ 176", since node 176' occurs after node 176" we have learned where to insert node $L_E$ 176', namely between node $L_C$ 176" and node EXIT 174'. This insertion is shown in FIG. 12C.

The above process is not an algorithm but rather a step-by-step example of how to deal with adjusting links between layers. The mechanics of list insertion and deletion will not be described in further detail as they are well known to those skilled in the art. It should be noted that applicants' EDL is capable of displaying FIG. 12A or FIG. 12B or FIG. 12C to the user, among other potential displays indicated in FIG. 7. In FIG. 11, the E_RAW_MSG node list 178 provides the facility to send an arbitrary byte sequence to a device, and as such is primarily a debugging feature of applicants' software.

The E_ACTION box 180 and the E_TRAN box 182 in FIG. 11 provide the E_CHANNELS box 174 with information as to the type of an edit transition action in question, including when it began, its duration, and when the edit ceases. The E_TRAN_TO box 184 provides the EDL database with information identifying the transition image and where the image went. If the transition edit calls for a key, the E_TRAN_TO box 184 will so note in the E_KEY box 188, placing a record in the E_CLIP box 186 enabling a user to later know what image was used to create the hole for the key and what clip (E_CLIP 186) represents the edit after the transition.

The E_SYNC_POINT box 190 provides timing information relating to the action, including speed and frame offset. The E_SEGMENT box 192 descends from the E_PARENT box 172 and will contain information as to the name of the node. The co-equal level BIN box 194 and E_CLIP box 186 replicate the structure at the top of the hierarchical database tree represented in FIG. 11 by BIN 156 and E_CLIP 160. Applicants' EDL database is in fact capable of providing a user with a representation of this tree-like structure, this representation being depicted as element 69 in FIG. 7.

In operation, when a user records a scene onto a portion of video tape, the EDL software will create and assign a unique edit node or E_NODE 164 reference number and will store identifying information within the CPU board 102. The stored information might reflect, for example, that E_NODE #123 was recorded on tape reel #5 for 7 minutes with zero offset (i.e., the 7 minutes were recorded starting at the beginning of the reel) and has not been revised (rev.=0). If the user later edits this tape, perhaps at 10 frames into the media, the EDL software will create an additional E_NODE, depending from and therefore of lower hierarchy than E_NODE #123. This additional E_NODE will contain information that at offset 10 an edit was made, constituting a first revision, which edit lasted say 2 minutes. Anytime any edit is made, the EDL software creates a new historical E_NODE, while still retaining the earlier parent node and all information contained therein.

When a certain video clip is to be viewed, the user inputs data to the editor 2 (using console 20 for example) identifying the desired clip, whereupon the RECORD node 154 correlates all information available to it and determines whether in fact the desired clip has been recorded (it may perhaps never have been recorded). If the clip has been recorded, the EDL software will send the appropriate device commands to display a desired frame for the user, on monitor 36, for example. If the clip has not been recorded, the EDL software will determine how to build the clip based upon the information in the subnodes of the clip, and will send the appropriate device commands to cause the desired clip to be built and displayed.

Applicants' above-described hierarchical multi-level EDL structure maintains a history of recordings that can be used as "submasters" in later building more complex layered effects. In the present invention, a submaster is an EDL representation of an intermediate visual product or effect, that may be used as an element or building block in constructing an even more complex visual product or effect. Because applicants' EDL provides a full record of how a video segment was built, submasters are automatically generated which permit a user to reproduce a previous session or image that would normally require more than a single pass of the relevant source material. For example if scene 1 dissolves onto scene 2, where both scenes are on a single reel of tape, reel A, applicants' EDL can designate the relevant "dissolve scene 1 to scene 2" edit with the simple and self-explanatory entry: "dissolve A to A". This simple designation, typically entered into editor 2 via keyboard 22, in turn will invoke a submaster that will contain the full record of how the dissolve was created, and will recreate the desired effect automatically (assuming the relevant source material is mounted on an available device).

It is to be understood that the presence of a "dissolve A to A" EDL entry does not mean that the described effect must now be built. There may, for example, be described a video effect involving a "cut" from source C to a "dissolve A to A", where the "dissolve A to A" entry is included merely as a record of how the total effect was built. Unless there is a need to now view the dissolve portion, there is no present need to build it. If, for example, the above effect is to be built, the present invention knows not to build the portion of "dissolve A to A" that occurs in time before source C cuts in.

Note from the above example that the present invention permits the user to specify a desired effect exactly (e.g., "dissolve A to A"), whereupon editor 2 will calculate the steps required to produce that effect. Thus, applicants' EDL will recognize the command "dissolve A to A" even though building the effect in a single pass may be physically impossible because both scenes may be on one medium. However the information within applicants' EDL specifies the effect, and editor 2 translates that specification into actions that are physically possible with the devices at hand, for example with an A64 disk recorder. Thus, the described effect in applicants' EDL is a virtual edit segment EDL describing what the user requires the end result to be (e.g., "dissolve A to A"). Unlike a prior art EDL, there is no requirement that the EDL command be physically capable of single command execution (e.g., "dissolve A to A").

In further contrast, a prior art editor and EDL would not recognize a simple, self-explanatory "dissolve A to A" type EDL command. Instead, the user would have to decipher, as best as possible, a typically cryptic prior art EDL and reprogram and recreate the effect in several passes. At a minimum scene 1 or scene 2 would have to be copied from the single source medium onto a scratch medium. Next the source tape and scratch medium would be activated to create the dissolve. More time is thus involved because the user commands to recreate the dissolve require considerably more keystrokes than entering "dissolve A to A", and allow keystroke error. Further, because a prior art EDL at best is a laborious step-by-step record, an EDL documenting the equivalent of a cut from a source C to a dissolve of A to A would require that the entire "A to A" dissolve be built, notwithstanding that the "A to A" segment that existed before source C cut thereto is irrelevant. Finally, additional time is typically required using a prior art editor to rewire the editing suite, typically using patch cables.

Further, applicants' EDL allows a user to "trace" the origin of source material used to create a multi-generational audio and/or video program. This tracing ability permits the user to generate an EDL that describes not merely how to recreate a multi-generational program, but how to generate a first generation version of the program. The present invention further permits viewing and performing (e.g., executing) such first generational version of the program.

More specifically, it will be appreciated that a second generation program (e.g., a program including a copy of original source material) will be of lower quality than a first generation program, and that a third generation program (e.g., a program including a copy of a copy of original source material) will be of even lower quality. By way of example, if there is a transition to a clip within applicants' EDL, and the clip provides a list of how the clip was built, the present invention can provide the user with an option of viewing a first generation version of the clip, or actually performing (e.g., reconstructing) the first generation version.

At best a prior art EDL might allow (assuming the EDL could be deciphered) reconstruction, but using multi-generational images, for example, perhaps an image of scene 2 recorded atop an image of scene 1 (scene 1 now being second generation). A prior art system might also employ a software program called "TRACE", available from the Grass Valley Group associated with Tektronix of Beverton, Oreg., to try to track back a multigenerational prior art EDL to earlier generation material. However TRACE must be typically be executed outside the editing system. By contrast, the present invention, entirely within the system, can present the program using original source material for scene 1 and for scene 2.

It is to be appreciated that applicants' described method of creating a unique and complete hierarchical database of every edit made during an edit session is applicable to systems other than video editors. Applicants' method could, for example, be implemented to track and log every edit change made within a word processing computer program, permitting a user to "un-edit" (or "unlayer") and recover earlier, intermediate versions of a document. Unlike a keyboard buffer, for example, applicants' method can recreate not simply a list of keystrokes, but the actual intermediate documents that existed at various stages of drafting or editing.

Figure 13:
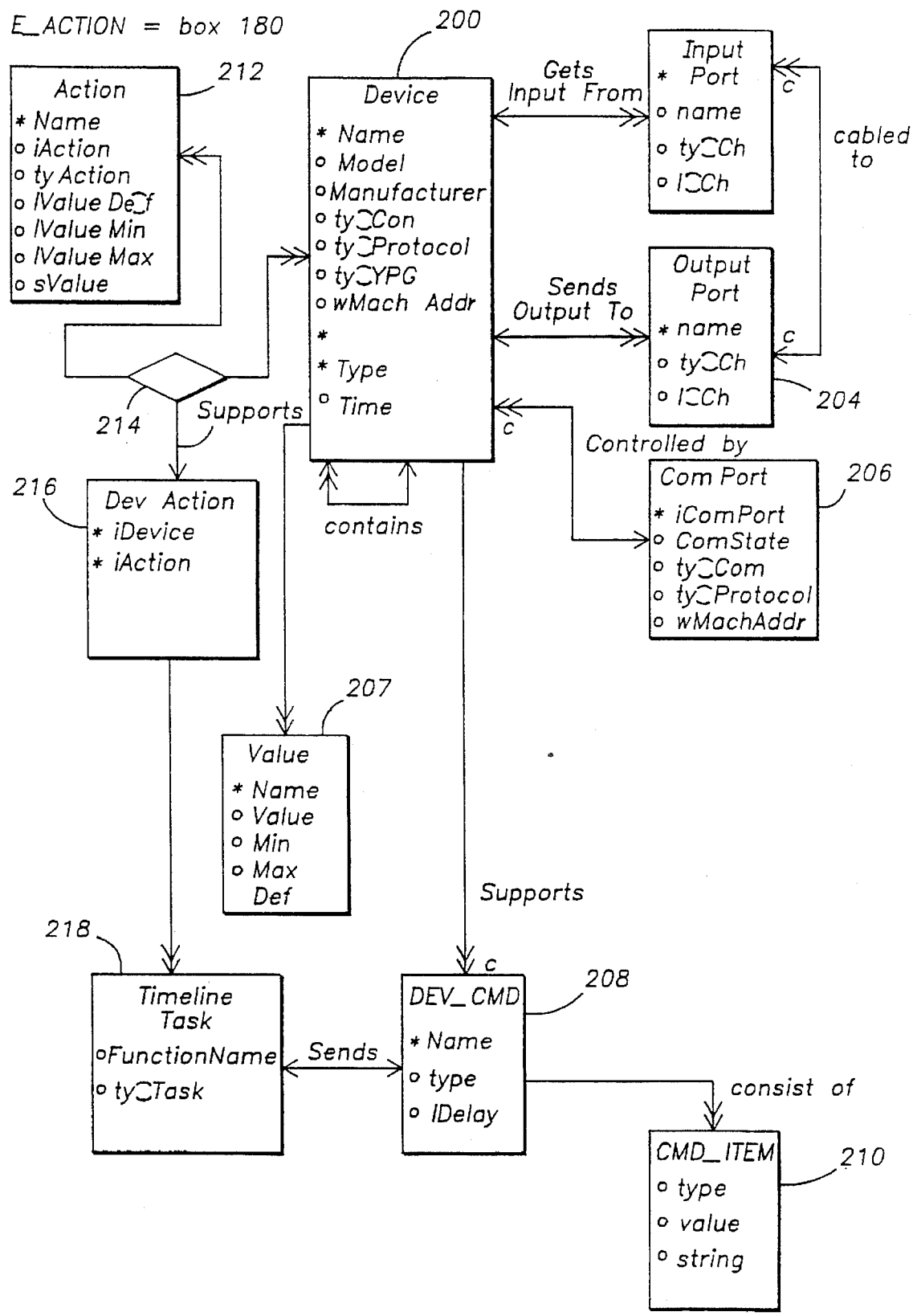
FIG. 13 is an information model showing the hierarchical structure of applicants' universal interface software.

Turning now to FIG. 13, an information model is presented showing the hierarchical database-like structure and analysis used in applicants' universal interface software. A full source code listing of this software is included in Appendix 1, attached hereto and incorporated herein by reference. Because of the interdependency of portions of applicants' software appearing in Appendix 1, applicants have not categorized the listing other than the generalized index tabs provided. Any nomenclature discrepancies between what is used in FIG. 13 and what it shown in Appendix 1 occur only because time prevents applicants from conforming the labels used in the structure of FIG. 13 with what is used in the actual code. It is the function of applicants interface software to permit editor 2 to interface in a universal fashion with any peripheral or video control device.

With references to FIG. 9 and FIG. 13, within the CPU board 102, an informational box DEVICE 200 represents whatever external peripheral device 12, 12', 14, 14', 16, 16' etc. is to be controlled by the editor 2. As such DEVICE 200 contains attributes of the device such as device name (disk recorder 1, for example), device model (A-62, for example), manufacturer (Abekas), type of communications required by the device to establish "handshaking" at a lowest level of communications (e.g., the device manufacturer typically specifies SMPTE, ethernet, or RS-232). DEVICE 200 also contains a single digit identifying the type of protocol required for the device (i.e., identifying the method used for establishing the communication link, and how messages are transmitted, including byte counts, checksums, etc.) and also contains a code identifying the type of device (i.e., whether it is a transporter such as a VTR, or a switcher, signal router, special effects box, etc). Finally since many devices are capable of party-line type communications where two devices share a single communications line, DEVICE 200 also includes information as to each such device's machine address (the address being somewhat analogous to an identifying telephone number on a party-line system).

As will be described later herein, information for the box DEVICE 200 is preferably input from the editor control panel 20 by the user via a specification text or data files, or will already reside in memory 118 or in an external diskette which the user will read into the CPU processor board 102. Preferably a unique specification file will have been created by the manufacturer of the present invention for each known accessory device. However the preferably text file nature of this file will allow a user, even a user with minimal knowledge of computer programming, to create a text file from scratch.

Very significant in the concept of box DEVICE 200 is the ability of applicants' interface logic to model a higher upper level physical device in terms of combinations of lower level virtual devices. For example, assume that the peripheral device desired to be controlled is an Abekas A-62 digital disk recorder. This recently developed device includes two separately controllable video disks and one keyer (a keyer is a type of switcher use to key video signals on top of video signals, as in creating an image of a weatherman standing before a map). As such, the Abekas A-62 really has the attributes of two device types: on one hand it "looks like" a transport device (a recorder) but on the other hand it also "looks like" a switcher.

A prior art on-line editor attempting to control the Abekas A-62 will ignore the switcher aspects of the device, and interface to the A-62 as though it were a transport device only. This compromise interface deprives a prior art editor of being able to control all the capabilities within the A-62. By contrast, applicants' interface software models the A-62 as being three virtual sub-devices (two separate recorders and one switcher) within an upper level (the A-62). As a result, editor 2 is able to control all functions of which the A-62 is capable.

By the same token, if a new device appears on the market, say a product combining three recorders and two switchers, applicants' interface software allows the creation of a DEVICE box 200 containing a software "model" of the new device, namely a device consisting five sub-devices: three recorders and two switchers. Because the data file providing this information as input to DEVICE box 200 is preferably in text file form, e.g., understandable to a user, a user will be able to create his or her own model, or can readily modify one or more existing models. Alternatively, as new devices appear on the market, the manufacturer of the present invention will analyze the device function capabilities and protocol requirements, and in short time will promulgate an appropriate text file. Creation of this file requires knowledge of the protocol requirements and internal functions or architecture of the new device. Such a text file could be embedded in each new device or could be promulgated on diskette for input to CPU board 102. It would be advantageous for the manufacturer of such new devices to embed one of applicants' specification files within their product as so doing would allow the full capabilities of the product to be realized by anyone using the present editor 2.

As seen in FIG. 13, the DEVICE 200 box communicates with an INPUT PORT box 202, an OUTPUT PORT box 204 and a COM PORT box 206. Again, the multiple arrowhead notation means "one or more". For example, the box DEVICE 200 may receive and contain information from many INPUT PORTS 202, and may send information to many OUTPUT PORTS 204. The INPUT/OUTPUT PORTS 202, 204 contain information pertaining to the physical cable connections between editor 2 and the various peripheral devices being controlled. Such information includes the type and number of ports (e.g., how many audio and video ports) and channel assignment thereto. The COM PORT box 206 contains information pertaining to the state of the communications port in use (e.g., which port from which communications processor card 104, 104' in FIG. 9). The COM PORT box 206 also has communications protocol information (for example, whether we are dealing with a Sony, an Ampex, a Grass Valley, etc. protocol) and communications port machine address information. As reflected by the multiple arrow heads going from the COM PORT box 206 to the DEVICE box 200, a single communications port can control more than one device.

It is important to maintain proper time synchronization when editing. Unfortunately as an audio or video signal passes through various devices during an editing session, time delays can readily accumulate. For example a first signal leaving a first recorder might be in perfect time synchronization, but upon then passing through an effects device and then through a second recorder, the signal might be delayed by several frames. If this delayed first signal is then to be combined with a second signal that always has passed through several devices, each of which may contribute a time delay, it becomes increasingly difficult to track and maintain proper synchronization. Further, the delay associated by a device can vary with the device's mode of operation. In addition, delays associated with an audio signal might be very different from delays associated with an accompanying video signal.

However because applicants' above-described device model includes full information as to the internal workings of each device used with an editor, the time delay contribution from each such device is known for all possible modes of device operation. As a result, since applicants' EDL knows the operative signal path at any time, and knows each relevant device's mode and associated delay, it becomes relatively easy for the present invention to properly compensate for time delays. For example, assume that a first video signal has accumulated, say, a delay of two frames, and is to be mixed with a second video signal that has accumulated a delay of one frame. Applicants' time line processing software can compensate the synchronization points by adjusting the requested time codes. In this example, the source device for the first video signal will be caused to roll one frame early relative to the source device for the second video signal. E.g., if the two video signals come respectively from recorders 1 and 2, recorder 1 will be started one frame earlier than recorder 2 to restore relative synchronization.

Editing suites typically use router boxes for controllably making interconnections to devices. A router box typically has many input ports and fewer output ports. Devices connected to a given input port can be controllably directed (or "routed") to a desired output port. Once devices are cabled into a router, the editor is able to command combinations of router interconnections to allow different devices to be connected to other devices. In prior art editing systems, each transport device (e.g., VTR) is assigned a unique "cross point" number which acts a reference to the input port of a switcher to which prior art systems assume the transport is connected. This assumption made in the prior art that a cross point can involve but one transport and one switcher represents a rather inflexible model of the potential device connections with an editing suite. Using this prior art model, a user wishing to access a given transport device must know the specific cross point in question. It might be advantageous to think of the prior art model as resembling a railroad switching yard. The yard master can indeed cause an engine to traverse a path doing from point A to D to X to T. However doing so requires that the yardmaster know what track switches must be engaged at what times. Assuming that the yardmaster has mastered the A-D-X-T task, a whole new problem is presented if the train is now required to go from A-D-B-Z-X-T.

The present invention, by analogy, allows the yardmaster to simply command A-D-X-T, or A-D-B-Z-X-T. Applicants' interface software will handle the necessary details, knowing what commands in what format must be issued at what time to achieve the desired results. The software can read a file containing details of the configuration of the editing suite, a description of how the suite is physically cabled. The box DEVICE 200 provides a model that knows, for example, that the output of a given VTR is routed to a given input of a special effects box, and that the output of the special effects box is routed to a given input of a switcher. As a result, applicants' interface software allows editor 2 to control the routing of video and audio within the editing suite, without requiring any outside action (such as pushing a device control button).

Because applicants' point-to-point model is software based, the model is flexible since it is readily modified with software commands. The present system dynamically controls the routers, keeping track of what transports are currently being routed to which switcher inputs. Any re-routing is accomplished by software command; no reconnecting of cables is required. The present system electronically commands the router to bring in a desired transport, and assign the transport to a given cross point. Such flexible reconfiguration is simply not available with prior art systems. Reconfiguration would require a user to reconfigure the router. However since the prior art editor had no knowledge of what new cabling was accomplished, a user would have to manually control devices (e.g., select a cross point on a router) to bring the devices into the suite. By contrast, a the present invention flexibly allows reconfiguration using software in a manner that allows the editor 2 to be aware of the configuration existing at any moment. All suite control is centralized, for example, at the control panel 20, with no necessity for the user to manually engage device functions.

In the present system, if a user has an EDL requiring, for example, a certain effect possible with devices obtainable via a router, applicants' configuration software will dynamically reconfigure the required router to bring in whatever devices might be required to build the desired visual program. Because the editor 2 "knows" the configuration in the editing suite, and because DEVICE 200 allows virtual modeling of any device, the present system can create configuration models in terms of what devices should be brought into create a given effect. The user can program a desired effect, say WIPE A/B, into the CPU board 102, preferably from the console 20 with a data or text file. For example, a video switcher capable of ten different simultaneous effects (e.g., "dissolve", "wipe", "key") can be modelled as ten virtual effects boxes, each capable of one effect (e.g., a "dissolve" box, a "key" box). The software model may be "layered" such that the software can decide from modeling that the output of an effects box (including the output from a virtual effects box) should be routed to the input of a second effects box (or second virtual effects box), and so forth, to produce whatever effect a user is requested. In this fashion, the present system is able to actually make design decisions for the user. The user can request the editor 2 to produce a certain visual result, whereupon the editor 2, armed with knowledge from the DEVICE box 200 as to what devices are available, can create software models of whatever configurations (if any) will accomplish the desired effect, given the devices present. As a result, the user is free to be artistically creative, rather than technically creative.

Further, a user who traditionally produces a given effect with the same hardware and procedure might not be thwarted upon arriving at the editing suite and learning that a necessary piece of equipment for the procedure is not working. The user would simply input the desired effect whereupon applicants' interface software would advise what procedures and available hardware are capable of producing the effect. The present system, for example, can take an effect having, say, three keys with a wipe underneath, and permit the user to add another key, and simply map the effect onto the switcher. This capability simply does not exist in prior art on-line editing systems. At best, a prior art editor will have a dedicated table of commands to be sent to different effects boxes. However the user has no way to simply re-layout the desired effects, e.g., to specify which effects are to be performed on which devices.

Each DEVICE 200 can support zero or more VALUES 207. When the device specification file is read, the present system creates a VALUE box 207 for each VALUE entry in the device specification file. VALUE parameters include gain, pattern, horizontal position, etc. These values may be "set" by the user and "fetched" when the present system builds device command messages.

Turning now to the DEV_CMD box 208 in FIG. 13, this box retains the information read into the CPU board 102 from the data or (preferably) text file, indicated by element 162 in FIG. 9. It is the text file 162 that informs the interface software and thus the editor 2 what commands a device or virtual sub-device will support. The DEV_CMD box 208 attributes include the name of the command (e.g., PLAY, STOP, WIPE, DISSOLVE, etc.), the type of command (a method of grouping commands within a protocol, as required by the device manufacturer), and delay (how long after the editor 2 sends the command does the command take effect). The contents of the DEV_CMD box 208 are provided to the each communications processor board 104 to load a scheduling table contained within the Z80 processor found on board 104. FIG. 4 shows the contents of a scheduling table.

The DEV_CMD box 208 consists of one or more CMD_ITEM boxes 210. It is the contents of the CMD_ITEM box 210 that describe how to actually build the command in question for a device, i.e., the precise byte structure and format required. For example, the contents if the CMD_ITEM box 210 might pertain to a Sony VCR. If the command PLAY is to be issued to the Sony VCR, there will be two CMD_ITEM boxes 210: the first box containing 20 (hex), and the second box containing 01 (hex).

Each CMD_ITEM box 210 has a type. Simple types include HEX_NUMBER (as in the Sony VCR example above). Other types include FETCH ("values") which will find a VALUE 207 and load it on the stack. Other types support arithmetic and logical stack operations, and a number of special purpose types have been created such as MSB_LSB which pops the top stack item and pushes the most significant bit followed by the least significant bit.

Those skilled in the art will recognize a stack calculator in the applicable source code shown in Appendix 1. Applicants' interface software advantageously provides the CMD_ITEM box 210 contents as input to a stack calculator. Thus the user, via text or data files, is able to create complex and arbitrary commands "on the fly". For example, if a command pertains to the controllable video gain of a switcher, the user can issue the command "GAIN" from the keyboard 22 on the control panel 20. As a result, the GAIN command is built by the stack calculator. Since the stack calculator supports conditional testing, looping, jumping, arithmetic operations and the like, great flexibility is available. By contrast, in the prior art the GAIN command (not unlike many other commands) would be coded in software to access a specific data value. New values and commands could not be added without changing the software, a task not readily accomplished by a user. A lay user could not readily modify these bytes, certainly not within the few seconds it would take someone using the present invention.

The ACTION box 212 corresponds to the E_ACTION 180 box appearing in FIG. 11, and describes the characteristics of a given action. An action might be CHANGE KEY GAIN, RECORD, WIPE PATTERN, DISSOLVE, etc., and the name of the action is an identifying character string. The ACTION box 212 also identifies the type of action, i.e., a switcher transition, a wipe, a dissolve, and further contains maximum and minimum values where applicable (e.g., maximum gain, minimum gain).

The diamond shaped box 214 indicates a function that here correlates an action with a device, i.e., what action does a given device support. Communicating with box 214 is the DEV_ACTION box 216, which provides information as to the device and physical action required, for example, change the effect to dissolve, rotate X, rotate Y, re-size. The TIMELINE TASK box 218 contains information as to what must be done to accomplish a command. For example, if a transport device is to be used, the TIMELINE TASK box 218 will provide information as to the name of a function requiring some physical movement at the device end to accomplish a given task. With reference to the E_SYNC_POINT box 190 shown in FIG. 13, this box 190 advises the editor system to issue a TIMELINE TASK 218 command to prepare the device. For example, before a transport device can be ordered to RECORD, TIMELINE TASK 218 ensures that the servo within the transport has moved to bring the tape into position for recording.

In reviewing the figures and appendix 1, it is understood that more or fewer boxes in FIG. 13, with more or fewer characteristics and attributes, and more or fewer layers of data in the software implementing FIG. 13 may be used without departing from the spirit of the present invention.

As mentioned, applicants' invention advantageously makes use of data or preferably text files. FIG. 22 is an example of an actual text file, namely a text file defining a VTR, a SONY model BVW-75. The relationship between the contents of this text file and the box elements in FIG. 12 is readily apparent. The text file provide the information contained in the DEVICE box 200 in FIG. 12: we are dealing with a TRANSPORT device, a SONY model BVW-75. This device requires SONY protocol in an SMPTE communications format. The device provides one channel of video and four channels of audio. In FIG. 22, entries preceded by a hash mark (#) are comments and are not required. For example, the "# Device Types" commentary refers to the device codes returned by the Sony protocol. The text file shown in FIG. 22 also includes data listed under COMMANDS, which data relates to information provided to DEV_CMD box 208, CMD_ITEM box 210, and TIMELINE TASK box 218 in FIG. 12. The COMMANDS are internally generic to editor 2 in the present invention, and may in fact be customized or compound commands. Information for COMMANDS is originally taken from the protocol manual for the device in question. For example, the command RECORD to editor 2 will be issued as a hex code 20 02 as required by Sony BVW-75 manual. The editor 2 treats the RECORD command as having zero delay and being of message type zero. While this Sony transport device does not require a message type, message type is needed for some protocols such as Ampex. The text file also provides information required by the INPUT PORT box 202, the OUTPUT PORT box 204, and the COM PORT box 206 in FIG. 12. The text file advises editor 2, for example, that this tape recorder has one video input (V1), the video coming from an external source, and four externally supplied audio inputs (A1–A4). Further, this device has two video outputs, each apparently providing the same video signal V1, and four audio outputs (A1–A4).

As noted, Appendix 1 herein includes text files for numerous other peripheral devices, including the above mentioned recorder. It is understood, however, that a text file may be created for any device by analyzing the device and the accompanying protocol and technical manuals, and expressing the device in terms of the parameters set forth in FIG. 13 or in the source code listing of Appendix 1. For example, Appendix 1 includes a text file for an Abekas; switcher model A-82, and demonstrates that this switcher is treated by the present invention as comprising virtual sub-devices. This text file also demonstrates the ease with which VALUES data may be specified and then manipulated by a user.

Turning now to FIGS. 14A and 14B, software within applicants' configuration file (Appendix 1 herein) permits a user to configure the keyboard 22 to suit the user's needs. The layout of the keys on the keyboard 22 may be changed by moving the keycaps and changing the raw key map within the keyboard configuration file (see Appendix 1). Applicants intend to provide automated means for changing this file at a later date.

With reference to FIG. 14A, the same information model approach is employed as has been previously described with respect to FIGS. 11 and 13, and for that reason FIGS. 14A and 14B will now be described in great detail (additional information also being available from Appendix 1). Briefly in mapping raw key codes to command codes, the Raw_

Key_Map 220 maps raw keyboard scan codes into key symbols. The key symbols are essentially character strings which correspond to the label on the key cap. The user can further configure the mapping between a key symbol and the state of the key (e.g., UP, DOWN, SHIFTED or not, CTRL or not, etc.) with the system command to be bound to that key symbol and state. Table 1 attached hereto and incorporated by reference herein is a listing of function calls presently available from applicants' key board mapping.

In the spirit of providing a complete disclosure, applicants enclose and incorporated herein by reference Appendix 2, a source code listing of the logic states of the various PAL or PLD devices provided in their system. PAL devices are liberally employed. Appendix 2 provides full information as to how the PALs are programmed for operation.

The details of the operation of applicants' system disclosed herein will be apparent to one skilled in the art upon reviewing the Appendices, Figures and this specification. Basically, text files for configuration information, device specifications, keyboard mapping and other functions are handled through a library of routines (Appendix 1, "LIB") which are loadable into the main CPU board 102. These routines are able to handle buffered input and token recognition. In essence, the text file is opened and the first token is scanned into the system. The first token will specify what information follows. For example, consider a text file stating:

---
MENU    Test
{
    ITEM 0 ("DispDim"  SET_VALUE  "DisplayDim"  DisplayDim )
}
---

In the above example, the keyword MENU is scanned into the system. Menus follow the syntax:

MENU menu_name {MENU_ITEM [MENU_ITEM ...]} so the system then scans for a menu name, in this case the name is "Test". Next the system looks for a "{" followed by one or more MENU_ITEMS. Each MENU_ITEM is signified by the keyword ITEM and has its own syntax. The character "}" finishes the MENU.

All other configuration files are handled similarly, although those skilled in the art will recognize that other structures might also be used. Applicants' above methodology allows a generic routine, ConfigReadAll(), that can handle any configuration or specification file. The technology used in scanning and identifying tokens is known to those skilled in the art, and will not be described further herein.

Figure 16:
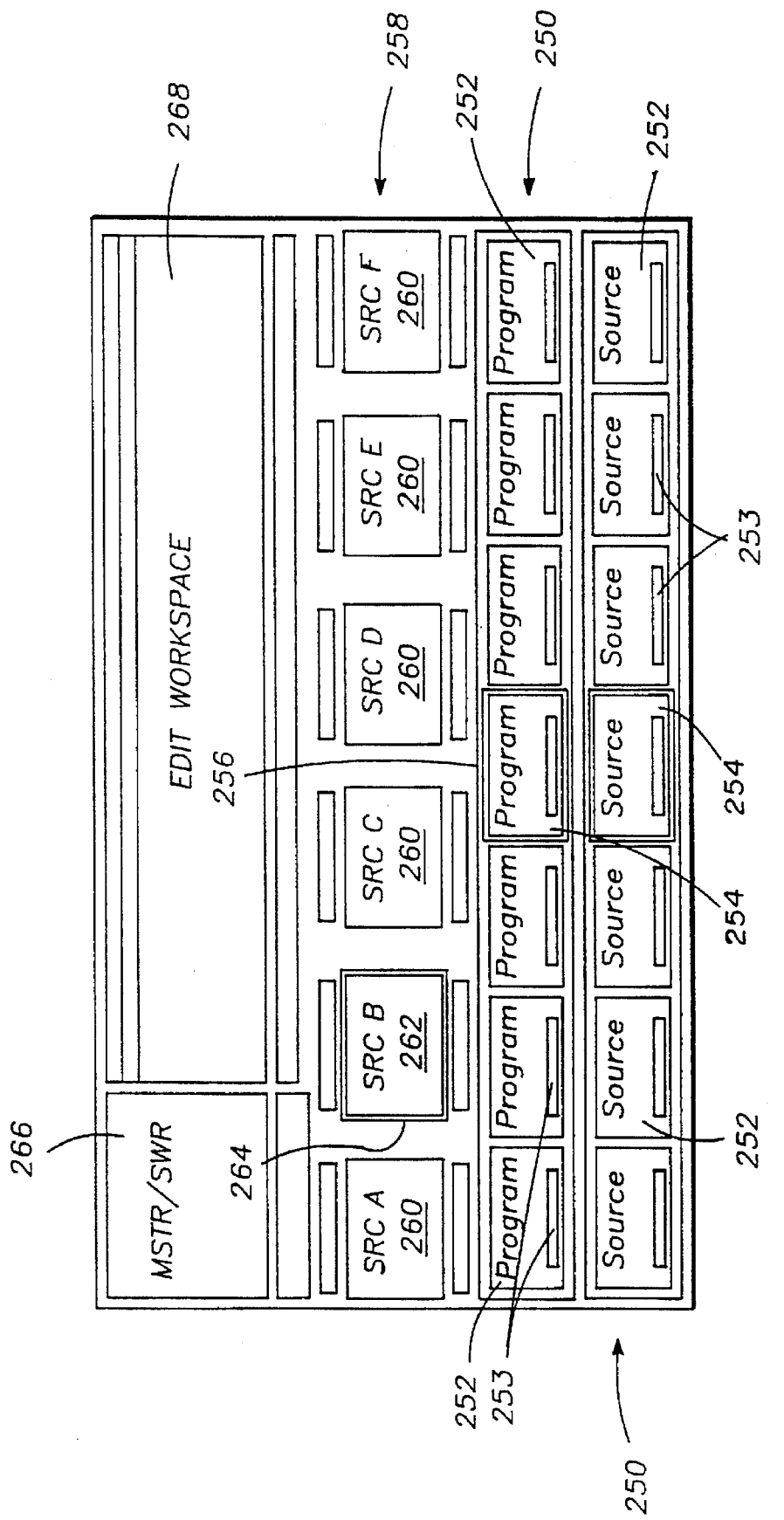
FIGS. 16–18 are a representation of a display screen generated in use of the present system for precise selection of video images for inclusion in, or exclusion from, an edited videotape.

The trim editing function of the system 2 provides an immediate and accurate means of visually searching for a specific edit point, called a "mark." The trim editing function works in conjunction with MARK keys on keyboard 22 by capturing live video on either side of the MARK point. As shown in FIG. 16, a horizontal "clip" 250 of video frames 252 is then displayed that may be scrolled to the left and right to allow quick trimming. Time codes 253 for each frame 252 are displayed below the frame 252. Approximately 16 frames 252 either side of the mark point will be captured for display. Because the video is captured and stored inside the editing system, trimming with the editing function of the system 2 does not require the source video tape recorder to be continuously jogged forward and back. The editing function acquires and caches high quality images, which are timed accurately and stored with an associated time code 253 for each image. This operation gathers and accurate strip of video around any given mark point, which the user then slides back and forth in electronic form like a strip of film for fine tuning of the mark points.

In operation of the trim editing function, live video is fed into image processor board 110 (FIG. 9) on channels A or B (lines 140 or 142) from video input board 108 when either a MARK IN or MARK OUT key is pressed. By "live video" is meant a video feed suitable for showing as a part of a television program, whether the video feed is captured in real time by a video camera, comes from a video tape, is a broadcast feed or a satellite feed. The term "live" is used to describe such a feed to distinguish it from the clips used in the trim editing function for establishing precise edit points. The image processor 110 stores the video images in a memory location that operates like a recirculating shift register. Each time the MARK IN or MARK OUT key is pressed, another group of the video images is stored in another memory location in the same manner. A pair of mark points is then selected for display and fine tune editing. When the mark points are selected, the stored video images corresponding to each mark point are transferred from memory on the image processor board 110 to the video output board 112. The selection of the actual images for display on monitor 36 is made in the image processor.

Initially, a set 250 of seven frames comprising mark point frame 254 and three frames 252 on either side of the mark point 254 are displayed for each mark point, out of a total of 35 frames stored for each mark point. An indicator border 256 surrounds each mark point frame 254. In practice, program material can be viewed in one set 250 of seven frames 252 and 254 and source material viewed in the other set 250 of seven frames. The two sets 250 can then be moved within the 35 frames for their respective mark points to adjust the mark points relative to one another, using the trackball or the PREVIOUS and NEXT keys to scroll along the 35 frames for the mark points. Also shown in the display of FIG. 16 is a line 258 of six source images. Five images 260 are inactive, i.e. a frozen source video frame appears in them, and one image 262, highlighted by border 264, is active, i.e., the source video appearing in it is live. The source represented in the active image 262 is the source from which the frames 252 and 254 in source set 250 originate. Program video is live in master/switcher window 266. The program video in window 266 is the origin of the program set 250 of program frames 252 and 254. An edit workspace window 268 shows edit commands that have been entered in the system 2 during the trim edit before their execution.

Figure 17:
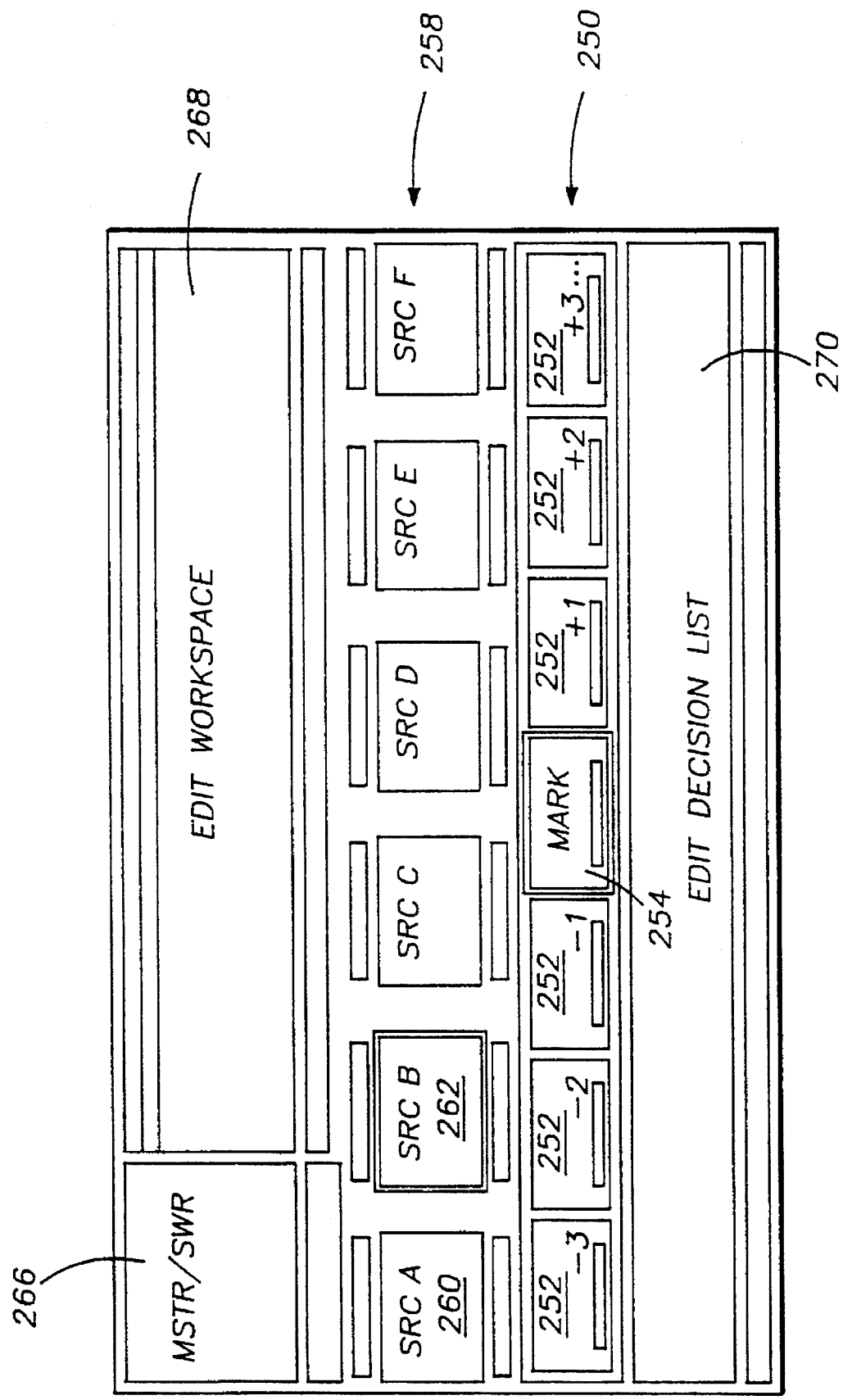

As shown in FIG. 17, a single line of a set 250 of seven frames including a mark point frame 254 and three frames 252 on either side of the mark point frame 252 from one video segment can also be displayed to allow selection of a frame 252 from the segment that shows, for example, a particular position in a pitcher's windup as the MARK IN point. In this version of the trim edit display, the line 258 of source images 260 and 262, the master/switcher window 266 and the edit workspace window 268 have the same significance as in FIG. 16. Once the source MARK IN point has been selected, the source video segment can be joined to a program segment showing the same windup from another location, with a MARK OUT point at the same position in the windup. For establishing the MARK OUT point in the program video, the set 250 of source frames 252 and 254 is replaced by a set 250 of program frames 252 and 254. When the frame sets 250 are displayed sequentially in this manner, an edit decision list window 270, which shows edit commands after they have been executed, is available. Either the FIG. 16 or FIG. 17 versions of the display could be used to select these MARK IN and MARK OUT points.

Figure 18:
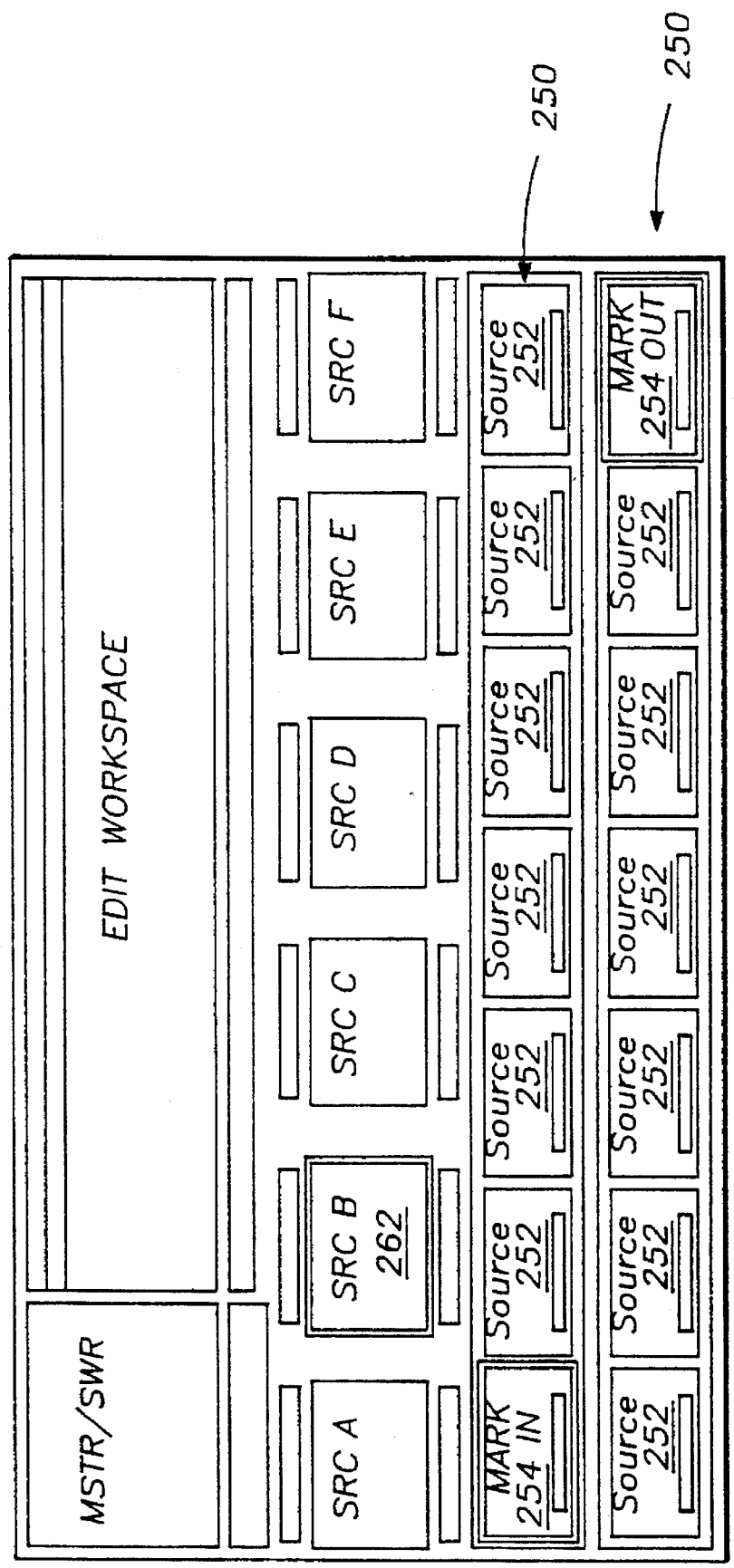

FIG. 18 shows a third trim edit display option, in which the two sets 250 of frames 252 and 254 show the beginning and the end of a source video 262 segment. Because the MARK IN and MARK OUT frames 254 are the beginning and the end of the segment, they are shown at the beginning and the end of their respective frame sets 250. As in FIGS. 16 and 17, different MARK IN and MARK OUT frames 254 can be selected with the FIG. 18 display.

Figure 19:
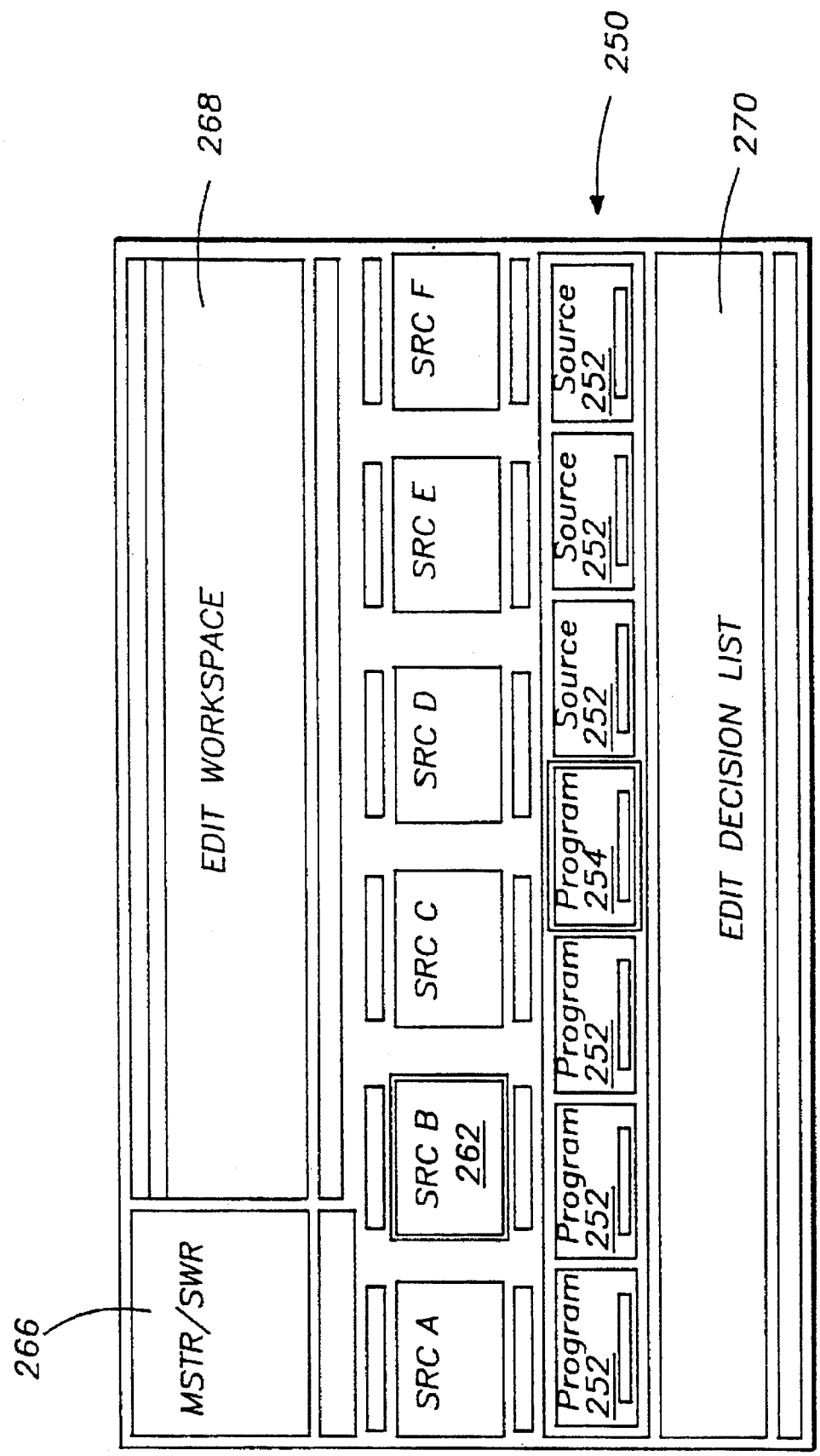
FIG. 19 is a representation of another display screen generated in use of the present system after the precise selection of the video images to prepare the edited video tape.

FIG. 19 shows the display after a proposed trim edit has been established. The seven frames 252 and 254 of a set 250 is divided into, for example, 4 frames 252 and 254 of program and three frames 252 of source in a single line. This display allows careful examination and adjustment, if necessary, of a proposed splice between source video 262 and program video 266. If adjustment is necessary, the source and program video frames can be scrolled as in the FIG. 16 display. When the edit command to execute the splice as shown in edit workspace window 268 is executed, the edit decision list window 270 is updated to show the resulting edit decision list.

FIG. 31 is a flow-chart type diagram of a particular embodiment of the method according to the present invention for universally interfacing a first device such as an on-line editor to a second device to allow a user of the first device to functionally control the second device with inputs to the first device independent of a specific signal protocol requirement of the second device to cause the functional command to be executed by the second device. Various other embodiments of the inventive method, though not specifically illustrated in the figures, are apparent from the accompanying dfescription, and the appurtenant claims.

The following keys are used to provide quick positioning of the sets 250:

START Selects the first or earliest frame 252 in the set 250.

END Selects the last or latest frame 252 in the set 250.

NEXT Steps one frame 252 forward or later in time.

PREV Steps one frame 252 reverse or earlier in time.

CLEAR Restores the original MARK (centers the set 250).

For convenience, the PREV and NEXT keys provide an auto-repeat function. Holding either key will scroll forward or reverse through the set 250.

To exit from the trim editing function of the system 2, the user presses the CANCL key while in the function. To select a new MARK point with the trim editing function, the trackball or position keys are used to view a different frame 252 contained in the set 250. The SELECT key (just above the trackball) is then pressed to select the new MARK point. When a new MARK point is selected using the trim editing function, the original set 250 will still be in memory, i.e., the clip is not recaptured centered around the new MARK point. When the new MARK point is selected, the MARK point is thus no longer centered in the clip. The MARK point is stored in memory by its time code identification along with the corresponding video frame.

Figure 21:
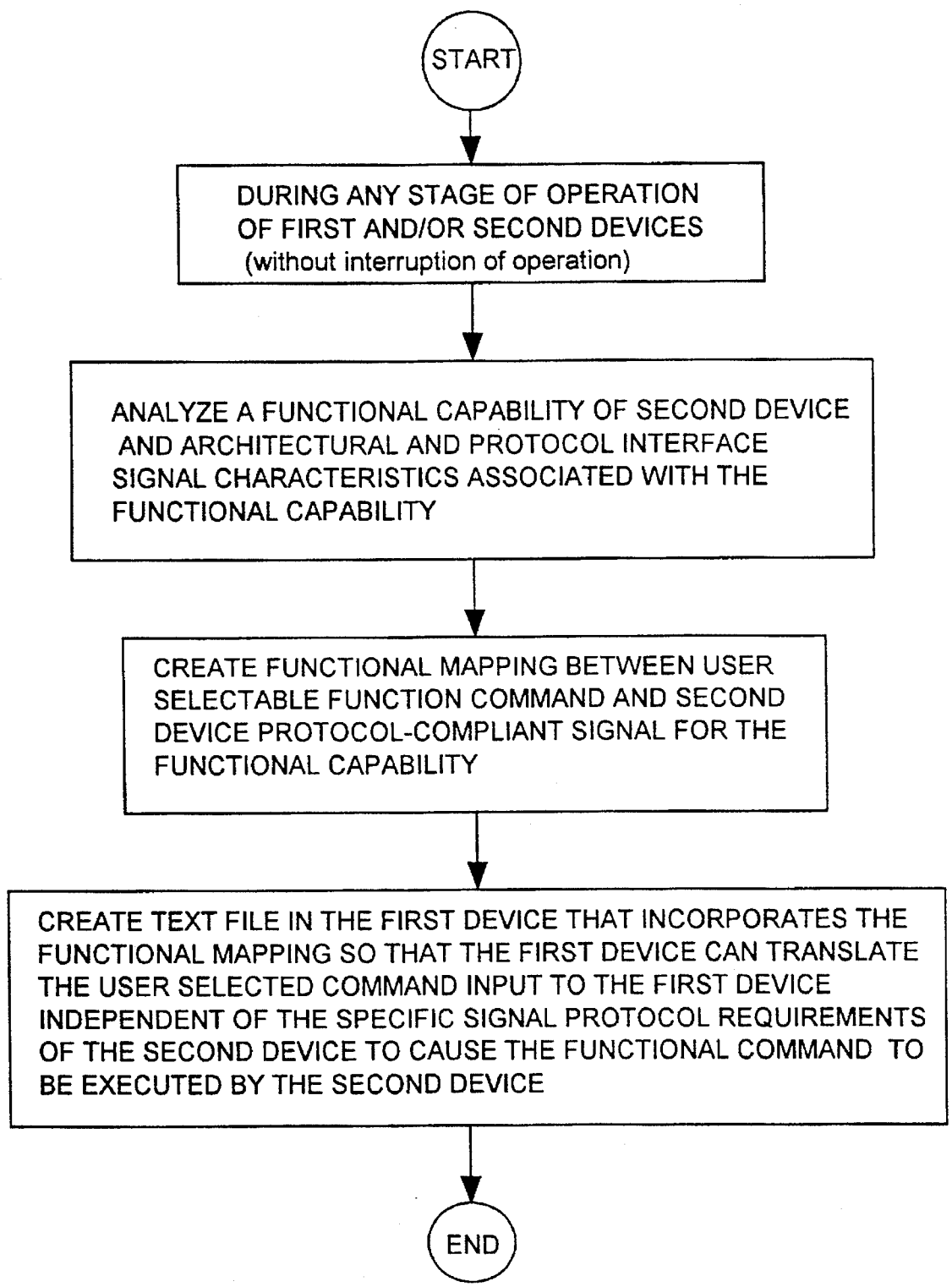
FIG. 21 is a flow-chart type diagram of an embodiment of the method according to the present invention for universally interfacing a first device such as an on-line editor to a second device to allow a user of the first device to functionally control the second device with inputs to the first device independent of a specific signal protocol recrement of the second device to cause the functional command to be executed by the second device.

FIG. 21 is a flow-chart type diagram of a particular embodiment of the method according to the present invention for universally interfacing a first device such as an on-line editor to a second device to allow a user of the first device to functionally control the second device with inputs to the first device independent of a specific signal protocol requirement of the second device to cause the functional command to be executed by the second device. Various other embodiments of the inventive method, though not specifically illustrated in the figures, are apparent from the accompanying description, and the appurtenant claims.

Modifications and variations may be made to the disclosed embodiments without departing from the subject of the invention as defined by the following claims.

What is claimed is:

1. A method of universally interfacing a first device, executably responsive to user selected command signals, to a second device, that upon receipt of data and control signals from the first device is functionally responsive to second device protocol-compliant command signals that uniquely specify each second device functional capability, to allow an external user of the first device to functionally control the second device with inputs to said first device even if a user-selected command is not defined by a unique second device protocol command signal, the method comprising:

during any stage of operation of said first device and said second device without interruption of operation of said first device and said second device:

analyzing at least one functional capability of the second device including analyzing the architectural and protocol interface requirements for said at least one functional capability to identify the particular data and control signals that said second device requires to execute said functional capability;

creating a functional mapping between at least one user selectable function command and at least one second device protocol-compliant signal of said at least one functional capability of the second device;

said functional mapping comprising data identifying user command and at least one second device protocol-compliant signal which when received by said second device results in execution of said identified user command; and creating, within the first device, a text file accessible to the first device, including said functional mapping between said user selectable function and said second device protocol signal for said at least one functional capability, said text file enabling the first device to translate a user selected command input to said first device into at least one second device protocol-compliant signal that causes the second device to perform the user selected function;

said steps of analyzing, creating a functional mapping, and creating a text file permitting the user to input a functional command to the first device, independent of a specific signal protocol requirement of the second device to cause the functional command to be executed by said second device.

2. The method of claim 1, wherein said first device is a video editor.

3. The method of claim 1, wherein said first device is an on-line video editor.

4. The method of claim 1, wherein said second device includes a controlled video device.

5. A method of universally interfacing an on-line editor, executably responsive to at least one user selected command signal, to a plurality of peripheral devices that each upon receipt of data and control signals from the on-line editor is functionally responsive to protocol-compliant command signals unique to each function and to each peripheral device, to allow said user of the on-line editor to functionally control the peripheral devices including controlling complex functions performed by said peripheral devices by a single user selected command signal even if said complex function is not defined by a unique single peripheral device protocol command signal, the method comprising:

analyzing at least one capability of at least one peripheral device including analyzing the architectural and protocol interface requirements for said function to identify the particular data and control signals that said peripheral device requires to execute said function;

creating a functional mapping of at least one user selected command signal to at least one capability of said at least one peripheral device;

creating a text file accessible to the on-line editor, including a functional mapping of at least one function within the on-line editor to a protocol requirement of the peripheral device, said text file enabling the on-line editor to map a user selected command to a signal that causes the peripheral device to perform the user selected function;

providing said text file to the on-line editor;

said mapping allowing the on-line editor to advise the user what combination of available peripheral devices can perform the user selected command signals;

said text file mapping a user selected command to at least one protocol signal that causes available peripheral devices to perform the user selected function;

said method permitting the user input to the on-line editor to be independent of specific protocol requirements of the peripheral devices.

6. A method of interfacing an on-line editor executingly responsive to at least one user selected command signal, to a peripheral device whose internal architecture is representable by at least two virtual sub-devices, each virtual sub-device being functionally responsive at least one function unique to said sub-device upon receipt of data and protocol signals, said peripheral device upon receipt of data and control signals from the on-line editor and performing functions in response thereto, to allow a user of the on-line editor to control at least one function unique to said virtual sub-devices, the method comprising:

analyzing the protocol requirements and said internal architecture of said peripheral device;

creating a model of said peripheral device wherein said peripheral device is represented by a hierarchy including at least two virtual sub-devices;

creating a functional mapping of at least one function unique to at least one virtual sub-device, including any protocol requirements of said at least one virtual sub-device;

creating, from protocol information pertaining to each said virtual sub-device and from said model, a text file that includes information relating to at least one user selected function within the on-line editor, and also includes information relating to said functional mapping of said at least one virtual sub-device and any protocol requirements of said at least one virtual sub-device;

providing said text file to the on-line editor;

causing the on-line editor to examine the contents of said text file and create therefrom a hierarchy of said sub-devices, including for each sub-device, a table correlating functions supported by said sub-device with a list of protocol commands supported by said sub-device;

said functional mapping allowing the on-line editor to advise the user what functions are available on said virtual sub-device;

said text file mapping a user selected command to at least one protocol signal that causes at least one virtual sub-device to perform the user selected function;

said method permitting the user to command functions of said peripheral device by commanding functions of said virtual sub-devices independent of a specific signal protocol requirement of said peripheral device to cause the functional command to be executed by said peripheral device, without being restricted to electing to command functions unique to but one sub-device.

7. The method of claim 5, wherein said peripheral device is a digital disk recorder.

* * * * *